United States Patent
Middelberg et al.

(10) Patent No.: US 11,200,773 B2
(45) Date of Patent: Dec. 14, 2021

(54) SECURE STORAGE AND RETRIEVAL SYSTEMS AND METHODS

(71) Applicant: Bell and Howell, LLC, Durham, NC (US)

(72) Inventors: Neal J. Middelberg, Apex, NC (US); Mark Gerard Paul, Raleigh, NC (US); Craig S. Adcock, Raleigh, NC (US); Richard Johnson, Fuquay Varina, NC (US)

(73) Assignee: Bell and Howell, LLC, Durham, NC (US)

( * ) Notice: Subject to any disclaimer, the term of this patent is extended or adjusted under 35 U.S.C. 154(b) by 269 days.

(21) Appl. No.: 16/442,241

(22) Filed: Jun. 14, 2019

(65) Prior Publication Data

US 2019/0382203 A1 Dec. 19, 2019

Related U.S. Application Data

(60) Provisional application No. 62/685,690, filed on Jun. 15, 2018.

(51) Int. Cl.
| | |
|---|---|
| *G07F 11/62* | (2006.01) |
| *G07F 11/50* | (2006.01) |
| *G07F 11/54* | (2006.01) |
| *B65G 1/137* | (2006.01) |
| *B65G 47/48* | (2006.01) |

(Continued)

(52) U.S. Cl.
CPC ............. *G07F 11/62* (2013.01); *A47B 49/00* (2013.01); *B65G 1/04* (2013.01); *B65G 1/137* (2013.01); *B65G 1/1371* (2013.01); *B65G 47/48* (2013.01); *G05B 19/19* (2013.01); *G07F 11/50* (2013.01);

(Continued)

(58) Field of Classification Search
CPC .......... G07F 11/52; G07F 11/54; G07F 11/62; G07F 11/50
See application file for complete search history.

(56) References Cited

U.S. PATENT DOCUMENTS

| | | | | |
|---|---|---|---|---|
| 6,072,766 A | * | 6/2000 | Konshak | G11B 15/688 369/30.5 |
| 6,974,294 B2 | * | 12/2005 | Pressman | B01D 61/18 211/1.55 |

(Continued)

FOREIGN PATENT DOCUMENTS

| | | |
|---|---|---|
| WO | WO 2018/125745 A1 | 7/2018 |
| WO | WO 2019/241727 A1 | 12/2019 |

OTHER PUBLICATIONS

International Search Report and Written Opinion for Application No. PCT/US2019/037343 dated Oct. 7, 2019.

*Primary Examiner* — Thomas Randazzo
(74) *Attorney, Agent, or Firm* — Jenkins, Wilson, Taylor & Hunt, P.A.

(57) ABSTRACT

A secure storage and retrieval system has a vault with a frame, one or more platters rotatably mounted about the frame, storage bins arranged radially about each of the one or more platters, and mounting surfaces arranged about a perimeter of the vault; and at least one user terminal connected to the vault at one of the mounting surfaces of the vault, the at least one user terminal including an elevator system that vertically moves the plurality of storage bins between any of the one or more platters and an opening formed through an outer shell of the user terminal.

42 Claims, 32 Drawing Sheets

(51) Int. Cl.
*G05B 19/19* (2006.01)
*B65G 1/04* (2006.01)
*A47B 49/00* (2006.01)
*G06F 3/0488* (2013.01)
*G06F 21/31* (2013.01)

(52) U.S. Cl.
CPC ............ G07F 11/54 (2013.01); *G06F 3/0488* (2013.01); *G06F 21/31* (2013.01)

(56) References Cited

U.S. PATENT DOCUMENTS

| | | | |
|---|---|---|---|
| 7,857,161 B2* | 12/2010 | Pinney | G07F 17/0092 221/10 |
| 8,628,289 B1 | 1/2014 | Benedict et al. | |
| 9,355,516 B2* | 5/2016 | Stoffel | G07F 17/12 |
| 9,643,782 B1 | 5/2017 | Hall et al. | |
| 9,645,569 B1 | 5/2017 | Hall et al. | |
| 2006/0254862 A1* | 11/2006 | Hoersten | G07F 11/50 186/52 |
| 2007/0262147 A1* | 11/2007 | Braun | G07F 11/62 235/454 |
| 2008/0128444 A1* | 6/2008 | Schininger | G07F 11/54 221/3 |
| 2013/0117137 A1* | 5/2013 | Klein | G06Q 20/387 705/16 |
| 2013/0253700 A1* | 9/2013 | Carson | G07F 9/006 700/236 |
| 2014/0021253 A1 | 1/2014 | Carson et al. | |
| 2014/0025545 A1* | 1/2014 | Carson | G06Q 30/018 705/29 |
| 2014/0361076 A1 | 12/2014 | Iantorno et al. | |
| 2015/0203297 A1* | 7/2015 | Manning | B65G 1/045 700/218 |
| 2017/0053099 A1 | 2/2017 | Coughlin et al. | |
| 2018/0182189 A1 | 6/2018 | Lakshmi-Ratan et al. | |
| 2019/0392667 A1* | 12/2019 | Naaman | G07F 17/0042 |

* cited by examiner

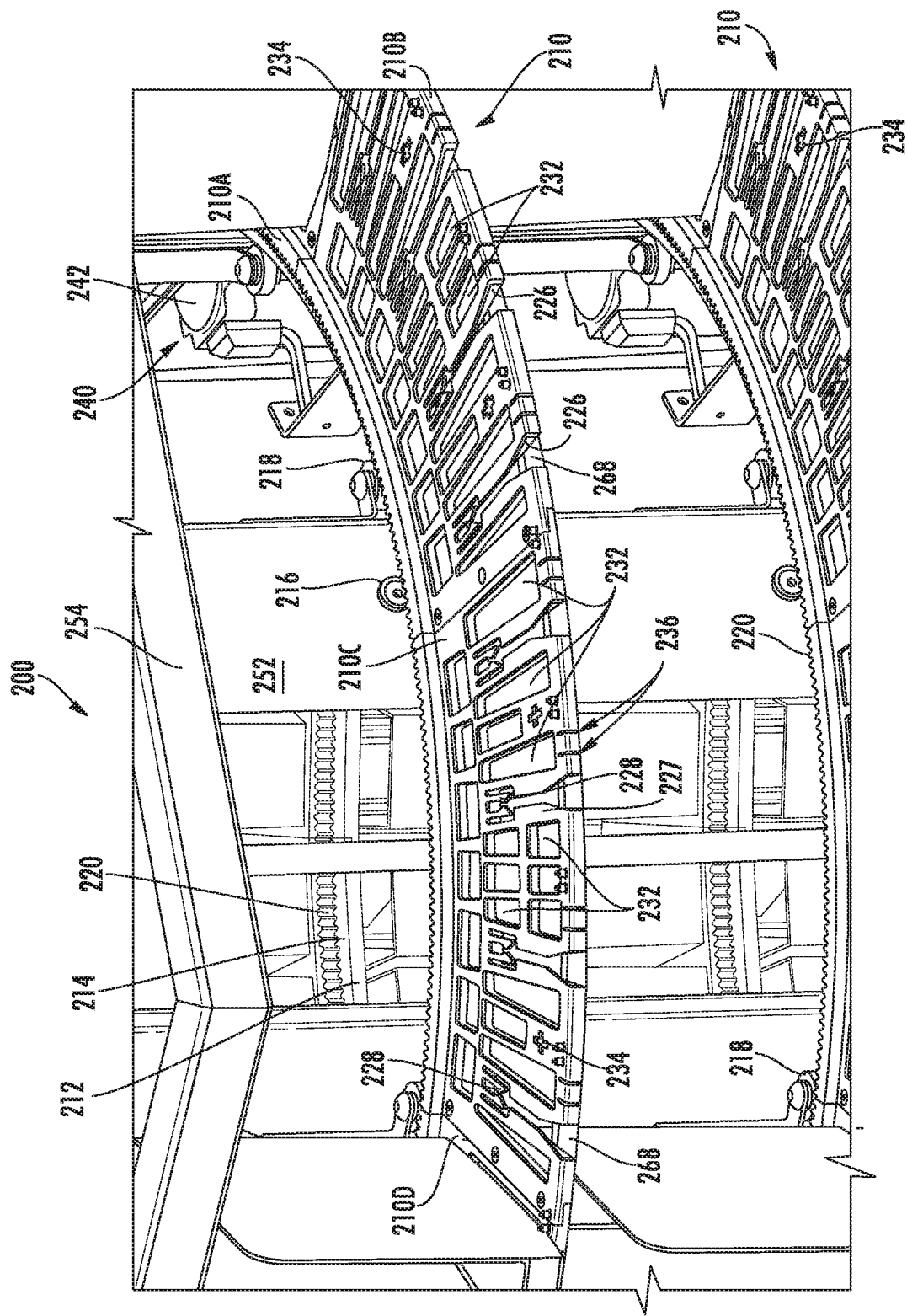

SECURE STORAGE AND RETRIEVAL SYSTEMS AND METHODS

CROSS-REFERENCE TO RELATED APPLICATION

This application claims the benefit of, and claims priority to, U.S. Provisional Patent Application Ser. No. 62/685,690, which was filed on Jun. 15, 2018, the disclosure of which is incorporated herein by reference in its entirety.

BACKGROUND

Pharmacies often fill prescriptions for patients who are not physically present at the pharmacy for immediate receipt of the prescription medication. In some instances, a prescription for one or more prescribed medications may be remotely submitted to a pharmacy by doctors electronically (e.g., via the Internet or an electronic facsimile service) or telephonically (e.g., using a facsimile service or actually calling the pharmacy) so that the pharmacy can fill the prescription and have the prescribed medications ready to dispense to the patient or caregiver upon their arrival at the pharmacy. In some other instances (e.g., when a prescribed medication is of a particular class of medications), a patient or caregiver may need to bring a physical prescription for one or more prescribed medications to the pharmacy to be filled, but returning later rather than waiting at the pharmacy while the prescription is filled. A pharmacy may also have standing prescription orders on file, requiring ongoing refills of prescriptions, as needed, over a period of time. Patients may order refills by calling the pharmacy, by accessing the pharmacy's automated interactive voice response (IVR) telephone system, by accessing the pharmacy's website, or by using any number of mobile device applications. In some instances, refills may even be triggered automatically by the pharmacy computer system.

Storage systems are often used to store prescriptions until patients arrive. Such systems may be referred to as pharmacy "will call" systems. A common will call system is simply an array of shelves behind the pharmacy counter where prescriptions are placed so pharmacy staff can access them when patients arrive. Another such will call system is an array of plastic bags that are filled with the medications and hung from one of a plurality of horizontal rods within the pharmacy. The patient or caregiver to receive the prescribed medication from the pharmacy is typically given notice that the prescribed medication is available by, for example, a phone call, a short message service (SMS) text message, email, or even a notification on a mobile device associated with the patient or caregiver designated as the recipient of the prescribed medication. The patient or caregiver must then arrive at the pharmacy during normal business hours, show proper identification (where necessary) or provide other authentication information (e.g., birth date of the patient), present any prescription insurance coverage that may apply, pay for the prescribed medication, and then receive the designated medication. In some cases, e.g., first time prescriptions, the pharmacist may be required (e.g., by state or federal law) to discuss the medication with the customer, or the customer may want to review their prescription with the pharmacist to understand what interactions are possible with other medications being taken by the patient. Regardless of the reason for this pharmacist consultation, it will need to occur during normal business hours. Busy pharmacies typically have a large number of prescription items in will call. Unfortunately, when there are a large number of prescriptions in will call, time is spent searching for the prescriptions needed to dispense to a patient, thus wasting staff time and increasing patient wait time.

Many such will call systems are readily accessible by anyone physically behind the pharmacy counter, thus introducing the potential for errors and even intentional drug diversion (i.e., theft). For example, prescriptions are sometimes given to the wrong patient due to human error (e.g., misreading a label or otherwise selecting the wrong prescription). There is also a greater risk of theft by pharmacy staff or others if physical access to the will call system is not securely managed.

Thus, there is a need for an improved system of prescription medication storage and retrieval that mitigates risks of human error, theft, or tampering, while also decreasing retrieval time.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

According to a first aspect, a secure storage and retrieval system is provided, the system comprising: a vault comprising a frame; one or more platters mounted about the frame to be independently rotatable about the frame; a plurality of storage bins arranged radially about each of the one or more platters; and a plurality of mounting surfaces arranged about a perimeter of the vault; the system comprising at least one user terminal connected to the vault at one of the mounting surfaces of the vault, the at least one user terminal comprising an elevator system configured to vertically move the plurality of storage bins between any of the one or more platters and an opening formed through an outer shell of the user terminal.

In some embodiments of the system, the frame comprises a base, an upper portion, a lower portion, and a plurality of inner vertical struts extending between and connecting the upper portion to the lower portion.

In some embodiments of the system, the frame is devoid of a central axle.

In some embodiments of the system, the base comprises at least two parallel axial slots on an underside of the base, such that the frame is movable by a pallet jack, a fork truck, or other transport device.

In some embodiments of the system, the plurality of inner vertical struts comprises at least three inner vertical struts.

In some embodiments of the system, the frame has a cross-sectional profile in a shape of a polygon and a number of the plurality of mounting surfaces is equivalent to a number of sides of the polygon.

In some embodiments of the system, the inner vertical struts are spaced apart from each other by an angle of approximately 60 o relative to the longitudinal axis of the frame.

In some embodiments, the system comprises, for each of the platters, a plurality of rollers rotatably attached to the inner vertical struts to support the platter and maintain a gap between an inner edge of the platters and the inner vertical struts.

In some embodiments of the system, the at least one user terminal comprises at least one user interface device for determining an identity of a user authorized to retrieve one or more items stored in one of the storage bins within the vault.

In some embodiments of the system, the one or more platters comprises a plurality of platters.

In some embodiments, the system comprises a rapid retrieval and storage (RRS) terminal attached to the vault at one of the mounting surfaces of the vault, the RRS terminal comprising: an outer shell; an opening formed through the outer shell to allow items to pass through the opening into and/or out of the vault; and a door that is movably arranged within the opening between an open position and a closed position; wherein the opening is at a height of one of the platters, designated as an RRS platter.

In some embodiments of the system, the RRS terminal is separated from the at least one user terminal by a physical barrier.

In some embodiments of the system, only the RRS platter can be accessed through the opening of the RRS terminal.

In some embodiments of the system, the RRS terminal comprises an inventory control device configured to detect and/or verify one or more items passing through the opening of the RRS terminal; and the system is configured to advance the RRS platter, such that a second empty storage bin on the RRS platter is accessible through the opening of the RRS terminal, after an item has been deposited into a first empty storage bin on the RRS platter.

In some embodiments of the system, the at least one user terminal comprises a plurality of user terminals that support simultaneous user induction and retrieval of items within the vault; and the plurality of user terminals are configured to replace occupied storage bins on the RRS platter with empty storage bins from another of the platters as empty storage bins are filled by a user at the RRS terminal.

In some embodiments of the system, the system is configured to optimize an arrangement of storage bins within the vault, prior to items being loaded onto the RRS platter at the RRS terminal, by removing occupied storage bins from the RRS platter and arranging empty storage bins about the RRS terminal in a consecutive manner.

In some embodiments of the system, the RRS terminal comprises one or more user interface devices configured to authenticate an identity of a user at the RRS and/or to scan an item to obtain information about the item before an item is loaded into one of the (e.g., uniquely identified and/or identifiable) storage bins at the RRS terminal and/or after an item is removed from one of the storage bins at the RRS terminal.

In some embodiments, the system comprises, for each of the platters, a drive motor configured to engage with one of the platters to rotate the one of the platters about the frame.

In some embodiments of the system, the system is configured to measure an amount of backlash between each drive motor and a corresponding one of the platters with which each drive motor rotatably engages, the amount of backlash being determined by, for each platter, rotating the platter in a first direction, stopping the platter, rotating the platter in a second direction, measuring a time between torque spikes detected by the drive motor, and adjusting a motion profile of the drive motor to account for the amount of backlash measured.

In some embodiments of the system, the at least one user terminal comprises a trolley system that is movable along a length of an elevator shaft of the elevator system and is configured to remove one of the storage bins from any of the platters, deposit one of the storage bins on any of the platters, and transport one of the storage bins vertically along the elevator shaft to be accessible through the opening of the user terminal.

In some embodiments of the system, the trolley system comprises a base that is movable along the length of the elevator shaft but fixedly arranged in a plane substantially perpendicular to the elevator shaft; and an extension platform that can be extended, relative to the base, towards the platters in a radially inward direction of the platters; wherein the extension platform is configured to engage with one of the storage bins to transfer the storage bin onto or off of the extension platform.

In some embodiments of the system, the extension platform comprises a slot along a length of the extension platform.

In some embodiments of the system, the storage bins comprise a rib and a track, the rib being configured to pass within the slot of the extension platform, such that the track and a bottom of the storage bin are on opposite sides of the extension platform relative to a plane defined by an upper surface of the extension platform.

In some embodiments of the system, the track of the storage bins comprises a plurality of gear teeth; a bin pinion gear comprising a plurality of gear teeth is arranged on the extension platform in a position that, when the extension platform is in a deployed position extended relative to the base, the gear teeth of the bin pinion gear are adjacent to, and mesh with, the gear teeth of the track; and the bin pinion gear is rotatable in a first direction, in which the storage bin is removed from the platter and drawn onto the extension platform, and a second direction, in which the storage bin is ejected from the extension platform and deposited onto the platter.

In some embodiments of the system, the extension platform and the bin pinion gear are driven substantially simultaneously.

In some embodiments of the system, a first of the platters is located in a refrigerated region of the vault so that items stored on the first platter are maintained at a lower temperature than items stored on other platters within the vault.

In some embodiments of the system, each platter comprises a plurality of bin slots formed around the outer circumference thereof, the bin slots comprising a bin tab comprising opposing elastically deformable pincers; each storage bin comprises a rib connected to a bottom surface of the storage bin, a track connected to the rib in a position spaced apart from the bottom surface of the storage bin, and a bump arranged at, or adjacent to, an end of the rib; and the bump has a shape that can be removably retained within a region of the bin tab to prevent the bin slots from being dislodged from the bin slots other than by the storage bins being removed by a trolley system of the at least one user terminal.

In some embodiments, the system comprises one or more of: a secure cart configured to securely transport and load a plurality of items from a restricted access area to the vault; a locker pod attached to the vault, the locker pod comprising a plurality of lockers that are directly accessible by a user from a position outside of the vault; a high capacity pod attached to the vault and configured to receive storage bins from the vault for storage in the high capacity pod and/or to transfer storage bins to the vault to be accessible at one of the user terminals; a power pod attached to the vault and configured to provide redundant power to the system; and an automated storage and retrieval system (ASRS) attached to the vault and comprising a plurality of storage areas internal to the ASRS that are accessible only via a portal external to and separate from the vault.

In some embodiments of the system, the at least one user terminal comprises an imaging device configured to measure a distance between two fiducial markings on the one or more platters to align the one or more platters with at least one user terminal.

In some embodiments, the system comprises an automated item-generating system operably connected to the vault at a mounting surface of the vault, the automated item-generating system being configured to transfer items to the vault for fully automated loading of the items within the vault.

In some embodiments of the system, the user terminal comprises a touchscreen configured to receive input from a user at the user terminal.

In some embodiments of the system, the user terminal comprises a touchscreen to sync and receive input from a personal electronic device (PED) of the user at the user terminal.

In some embodiments of the system, the system is configured to optimize positions of the storage bins within the vault to minimize a processing time for storage and retrieval of one or more items within the vault.

In some embodiments of the system, the at least one user terminal is configured to display a targeted message to a recipient present at one of the at least one user terminals after authenticating an identity of the recipient.

In some embodiments of the system, the system is configured to retrieve supply chain pedigree data and display the supply chain pedigree data to a recipient at one of the at least one user terminals.

In some embodiments, the system comprises a buffer system with a plurality of intermediate storage areas configured to hold and sequentially deposit one or more items into storage bins, which are configured for storage within the vault.

In some embodiments of the system, the buffer system comprises a belt rotatably movable about at least two spindles, the belt having a plurality of paddles arranged thereon extending away from an outer surface thereof, and the plurality of intermediate storage areas being defined by a space between adjacent paddles in a direction of the length of the belt.

In some embodiments of the system, the belt is configured to rotate such that each of the intermediate storage areas is sequentially deposited into a storage bin for storage within the vault.

In some embodiments of the system, the buffer system is configured such that the belt is rotatable in a stepped manner, such that items in only a single intermediate storage area are deposited into a bin for storage within the vault.

In some embodiments of the system, the buffer system comprises a housing with at least one opening formed therein to allow for depositing items within only one of the intermediate storage areas at a time.

In some embodiments of the system, the buffer system comprises a scanner configured to detect information regarding the items being deposited into the intermediate storage areas.

In some embodiments of the system, the information comprises one or more of item identity authentication information, recipient identity information, and/or supply chain information.

In some embodiments of the system, the buffer system is configured such that the belt advances by a distance equivalent to a length of one intermediate storage area after the scanner or the sensor detects that an item has passed through the opening into one of the intermediate storage areas.

In some embodiments of the system, the buffer system comprises a sensor configured to detect when the item is deposited into one of the intermediate storage areas through the opening in the housing.

In some embodiments of the system, the buffer system is configured such that the belt advances by a distance equivalent to a length of one intermediate storage area after the scanner or the sensor detects that an item has passed through the opening into one of the intermediate storage areas.

In some embodiments of the system, the buffer system is configured to generate an error when the scanner or the sensor detects that an item has been deposited into an intermediate storage area without the information about the item having been detected.

In some embodiments of the system, advancing the belt by one intermediate storage area deposits items contained in at least one intermediate storage area to be transferred into a bin for storage within the vault.

In some embodiments of the system, the bin into which the at least one intermediate storage area deposits its contents is not accessible by a user at a user terminal.

In some embodiments, the system comprises an automated item-generating system operably connected to the buffer system and configured to transfer items to the buffer system for fully automated loading of the items within the vault.

In some embodiments of the system, the system is configured to transmit information remotely to diagnose and troubleshoot malfunctions detected by the system. In some such embodiments, the information may be transmitted to a remote location for diagnosis and corrective action to be determined by a human operator at the remote location, the corrective action being transmitted to the system for the corrective action to be performed without the human operator needing to be physically present at, or have physical access to, the system.

According to a second aspect, a method for storing and distributing at least one item within a secure storage and retrieval system is provided, the method comprising: providing a vault comprising a frame (e.g., without a central axle), one or more platters mounted about the frame to be independently rotatable about the frame, a plurality of storage bins arranged radially about each of the one or more platters, and a plurality of mounting surfaces arranged about a perimeter of the vault; identifying a designated storage bin of a plurality of storage bins on a designated platter of the one or more platters within the vault, the designated storage bin containing one or more items associated with the user at the user terminal; removing the designated storage bin from the designated platter and transporting the designated storage bin adjacent to an opening formed through an outer shell of the user terminal; opening a door at the user terminal, such that the one or more items within the designated storage bin are accessible to the user through the opening; closing the door after a predetermined amount of time and/or after detecting that the one or more items were removed from the designated storage bin by the user; transporting the designated storage bin adjacent to one of the one or more platters within the vault; and depositing the designated storage bin onto the one of the one or more of platters within the vault.

In some embodiments of the method, the frame comprises a base, an upper portion, a lower portion, and a plurality of inner vertical struts extending between and connecting the upper portion to the lower portion.

In some embodiments of the method, the frame is devoid of a central axle.

In some embodiments of the method, the base comprises at least two parallel axial slots on an underside of the base, such that the frame is movable by a pallet jack, a fork truck, or other transport device.

In some embodiments of the method, the plurality of inner vertical struts comprises at least three inner vertical struts.

In some embodiments of the method, the frame has a cross-sectional profile in a shape of a polygon and a number of the plurality of inner vertical struts is equivalent to a number of sides of the polygon.

In some embodiments of the method, the inner vertical struts are spaced apart from each other by an angle of approximately 60 o relative to the longitudinal axis of the frame.

In some embodiments, the method comprises rotatably attaching, for each of the platters, a plurality of rollers to the inner vertical struts to support the platter and maintain a gap between an inner edge of the platters and the inner vertical struts.

In some embodiments, the method comprises authenticating an identity of a user at a user terminal connected to the vault at one of the mounting surfaces of the vault.

In some embodiments of the method, the one or more platters comprises a plurality of platters.

In some embodiments, the method comprises attaching a rapid retrieval and storage (RRS) terminal to the vault at one of the mounting surfaces of the vault, the RRS terminal comprising: an outer shell; an opening formed through the outer shell to allow items to pass through the opening into and/or out of the vault; and a door that is movably arranged within the opening between an open position and a closed position; wherein the opening is at a height of one of the platters, designated as an RRS platter.

In some embodiments of the method, the RRS terminal is separated from the at least one user terminal by a physical barrier.

In some embodiments of the method, only the RRS platter can be accessed through the opening of the RRS terminal.

In some embodiments, the method comprises: detecting, using an inventory control device of the RRS terminal, one or more items passing through the opening of the RRS terminal; and advancing, after an item has been deposited into a first empty storage bin on the RRS platter, the RRS platter, such that a second empty storage bin on the RRS platter is accessible through the opening of the RRS terminal.

In some embodiments of the method, the at least one user terminal comprises a plurality of user terminals that support simultaneous user induction and retrieval of items within the vault, the method comprising replacing, using the plurality of user terminals, occupied storage bins on the RRS platter with empty storage bins from another of the platters as empty storage bins are filled by a user at the RRS terminal.

In some embodiments, the method comprises optimizing an arrangement of storage bins within the vault, prior to items being loaded onto the RRS platter at the RRS terminal, by removing occupied storage bins from the RRS platter and arranging empty storage bins about the RRS terminal in a consecutive manner.

In some embodiments, the method comprises: authenticating, using one or more user interface devices of the RRS terminal, an identity of a user at the RRS; and/or scanning an item to obtain information about the item before an item is loaded into one of the (e.g., uniquely identified and/or identifiable) storage bins at the RRS terminal and/or after an item is removed from one of the storage bins at the RRS terminal.

In some embodiments, the method comprises, for each of the platters, a drive motor that engages with one of the platters to rotate the one of the platters about the frame.

In some embodiments, the method comprises measuring an amount of backlash between each drive motor and a corresponding one of the platters with which each drive motor rotatably engages, the amount of backlash being determined by, for each platter, rotating the platter in a first direction, stopping the platter, rotating the platter in a second direction, measuring a time between torque spikes detected by the drive motor, and adjusting a motion profile of the drive motor to account for the amount of backlash measured.

In some embodiments of the method, the at least one user terminal comprises a trolley system that is movable along a length of an elevator shaft of the elevator system and is configured to remove one of the storage bins from any of the platters, deposit one of the storage bins on any of the platters, and transport one of the storage bins vertically along the elevator shaft to be accessible through the opening of the user terminal.

In some embodiments of the method, the trolley system comprises: a base that is movable along the length of the elevator shaft but fixedly arranged in a plane substantially perpendicular to the elevator shaft; and an extension platform that can be extended, relative to the base, towards the platters in a radially inward direction of the platters; wherein the extension platform is configured to engage with one of the storage bins to transfer the storage bin onto or off of the extension platform.

In some embodiments of the method, the extension platform comprises a slot along a length of the extension platform.

In some embodiments of the method, the storage bins comprise a rib and a track, the method comprising inserting the rib within the slot of the extension platform, such that the track and a bottom of the storage bin are on opposite sides of the extension platform relative to a plane defined by an upper surface of the extension platform.

In some embodiments of the method, the track of the storage bins comprises a plurality of gear teeth; a bin pinion gear comprising a plurality of gear teeth is arranged on the extension platform in a position that, when the extension platform is in a deployed position extended relative to the base, the gear teeth of the bin pinion gear are adjacent to, and mesh with, the gear teeth of the track; and the bin pinion gear is rotatable in a first direction, in which the storage bin is removed from the platter and drawn onto the extension platform, and a second direction, in which the storage bin is ejected from the extension platform and deposited onto the platter.

In some embodiments of the method, the extension platform and the bin pinion gear are driven substantially simultaneously.

In some embodiments of the method, a first of the platters is located in a refrigerated region of the vault so that items stored on the first platter are maintained at a lower temperature than items stored on other platters within the vault.

In some embodiments of the method, each platter comprises a plurality of bin slots formed around the outer circumference thereof, the bin slots comprising a bin tab comprising opposing elastically deformable pincers; each storage bin comprises a rib connected to a bottom surface of the storage bin, a track connected to the rib in a position spaced apart from the bottom surface of the storage bin, and a bump arranged at, or adjacent to, an end of the rib; and the bump has a shape that can be removably retained within a region of the bin tab to prevent the bin slots from being dislodged from the bin slots other than by the storage bins being removed by a trolley system of the at least one user terminal.

In some embodiments, the method comprises one or more of: providing a secure cart configured to securely transport and load a plurality of items from a restricted access area to the vault; a locker pod attached to the vault, the locker pod comprising a plurality of lockers that are directly accessible by a user from a position outside of the vault; attaching a high capacity storage pod to the vault to receive storage bins from the vault for storage in the high capacity pod and/or to transfer storage bins to the vault to be accessible at one of the user terminals; attaching a power pod to the vault to provide redundant power to the system; and attaching an automated storage and retrieval system (ASRS) to the vault, the ASRS comprising a plurality of storage areas internal to the ASRS that are accessible only via a portal external to and separate from the vault.

In some embodiments of the method, the at least one user terminal comprises an imaging device configured to measure a distance between two fiducial markings on the one or more platters to align the one or more platters with at least one user terminal.

In some embodiments, the method comprises operably connecting an automated item-generating system to the vault at a mounting surface of the vault to transfer items to the vault for fully automated loading of the items within the vault.

In some embodiments of the method, the user terminal comprises a touchscreen to receive input from a user at the user terminal.

In some embodiments of the method, the user terminal comprises a touchscreen to sync and receive input from a personal electronic device (PED) of the user at the user terminal.

In some embodiments, the method comprises optimizing positions of the storage bins within the vault to minimize a processing time for storage and retrieval of one or more items within the vault.

In some embodiments, the method comprises displaying, on a display of the at least one user terminal, a targeted message to a recipient present at one of the at least one user terminals after authenticating an identity of the recipient.

In some embodiments, the method comprises retrieving supply chain pedigree data and displaying the supply chain pedigree data to a recipient at one of the at least one user terminals.

In some embodiments, the method comprises providing a buffer system with a plurality of intermediate storage areas to hold and sequentially deposit one or more items into storage bins for storage within the vault.

In some embodiments of the method, the buffer system comprises a belt rotatably movable about at least two spindles, the belt having a plurality of paddles arranged thereon extending away from an outer surface thereof, and the plurality of intermediate storage areas being defined by a space between adjacent paddles in a direction of the length of the belt.

In some embodiments, the method comprises rotating the belt such that each of the intermediate storage areas is sequentially deposited into a storage bin for storage within the vault.

In some embodiments of the method, the belt is rotatable in a stepped manner, such that items in only a single intermediate storage area are deposited into a bin for storage within the vault.

In some embodiments of the method, the buffer system comprises a housing with at least one opening formed therein, the method comprising depositing items within only one of the intermediate storage areas at a time.

In some embodiments of the method, the buffer system comprises a scanner, the method comprising detecting, using the scanner of the buffer system, information regarding the items being deposited into the intermediate storage areas.

In some embodiments of the method, the information comprises one or more of item identity authentication information, recipient identity information, and/or supply chain information.

In some embodiments, the method comprises advancing the belt by a distance equivalent to a length of one intermediate storage area after the scanner or the sensor detects that an item has passed through the opening into one of the intermediate storage areas.

In some embodiments of the method, the buffer system comprises a sensor, the method comprising detecting, using the sensor, when the item is deposited into one of the intermediate storage areas through the opening in the housing.

In some embodiments, the method comprises advancing the belt by a distance equivalent to a length of one intermediate storage area after the scanner or the sensor detects that an item has passed through the opening into one of the intermediate storage areas.

In some embodiments, the method comprises generating, at the buffer system and/or in the system, an error when the scanner or the sensor detects that an item has been deposited into an intermediate storage area without the information about the item having been detected.

In some embodiments of the method, advancing the belt by one intermediate storage area deposits items contained in at least one intermediate storage area to be transferred into a bin for storage within the vault.

In some embodiments of the method, the bin into which the at least one intermediate storage area deposits its contents is not accessible by a user at a user terminal.

In some embodiments, the method comprises operably connecting an automated item-generating system to the buffer system to transfer items to the buffer system for fully automated loading of the items within the vault.

In some embodiments, the method comprises: rotating the designated platter on which the designated storage bin is located so that the designated storage bin is aligned with a trolley system of the user terminal; and extending an extension platform of the trolley system such that the designated storage bin can be transferred onto the extension platform.

In some embodiments of the method, the at least one item is a uniquely identified item.

In some embodiments, the method comprises transmitting information remotely to diagnose and troubleshoot malfunctions detected by the system. In some such embodiments, the information may be transmitted to a remote location for diagnosis and corrective action to be determined by a human operator at the remote location, the corrective action being transmitted to the system for the corrective action to be performed without the human operator needing to be physically present at, or have physical access to, the system.

The methods and systems disclosed herein can be combined in any combination and/or sub-combination, adding elements from other systems and/or sub-systems or steps from other methods and/or sub-methods, as the case may be, and/or omitting elements from other systems and/or sub-systems or steps from other methods and/or sub-methods without limitation. Nothing disclosed herein shall be interpreted as limiting in any way the combinations in which the features, structures, steps, etc. may be organized, described, and/or claimed in this or any related applications.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, can be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

Like numbers refer to like elements throughout. In the figures, the thickness of certain lines, layers, components, elements or features can be exaggerated for clarity. Where used, broken lines illustrate optional features or operations unless specified otherwise.

For a more complete understanding of the presently disclosed subject matter, reference is now made to the drawings submitted herewith.

Figure 1:
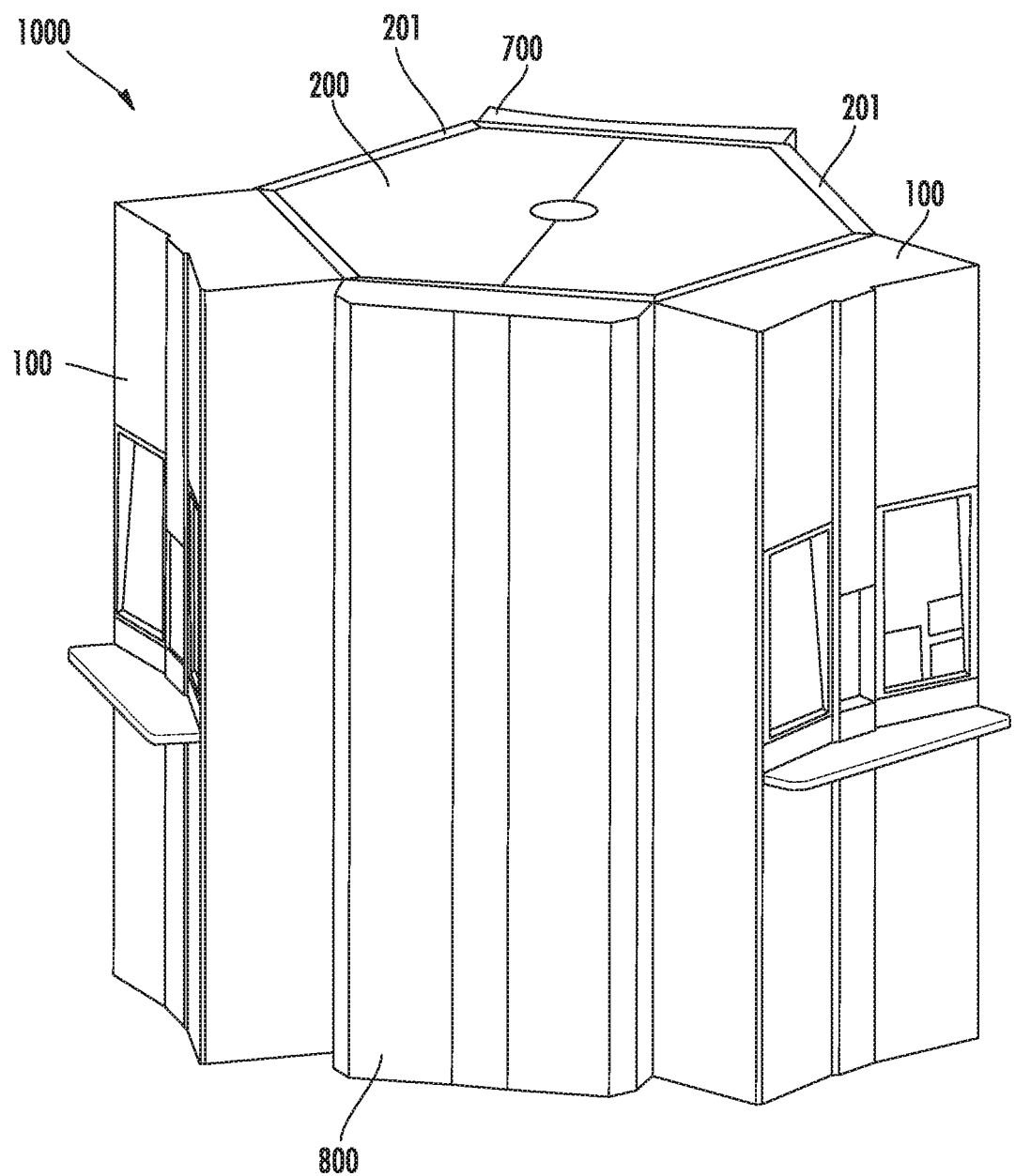

FIG. 1 is a perspective view of an example embodiment of a secure storage and retrieval system.

Figure 2:
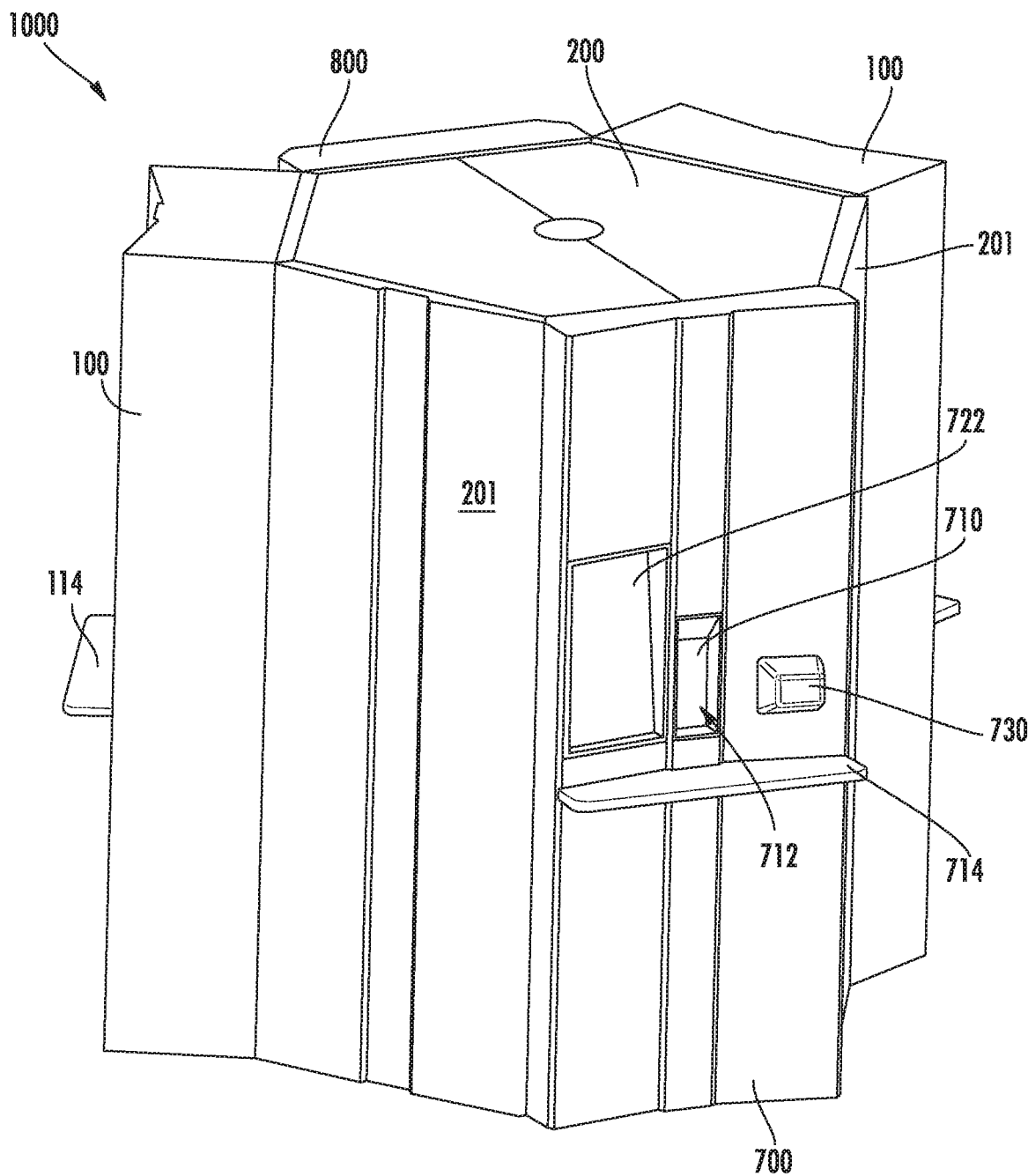

FIG. 2 is a perspective view of the secure storage and retrieval system of FIG.

Figure 3:
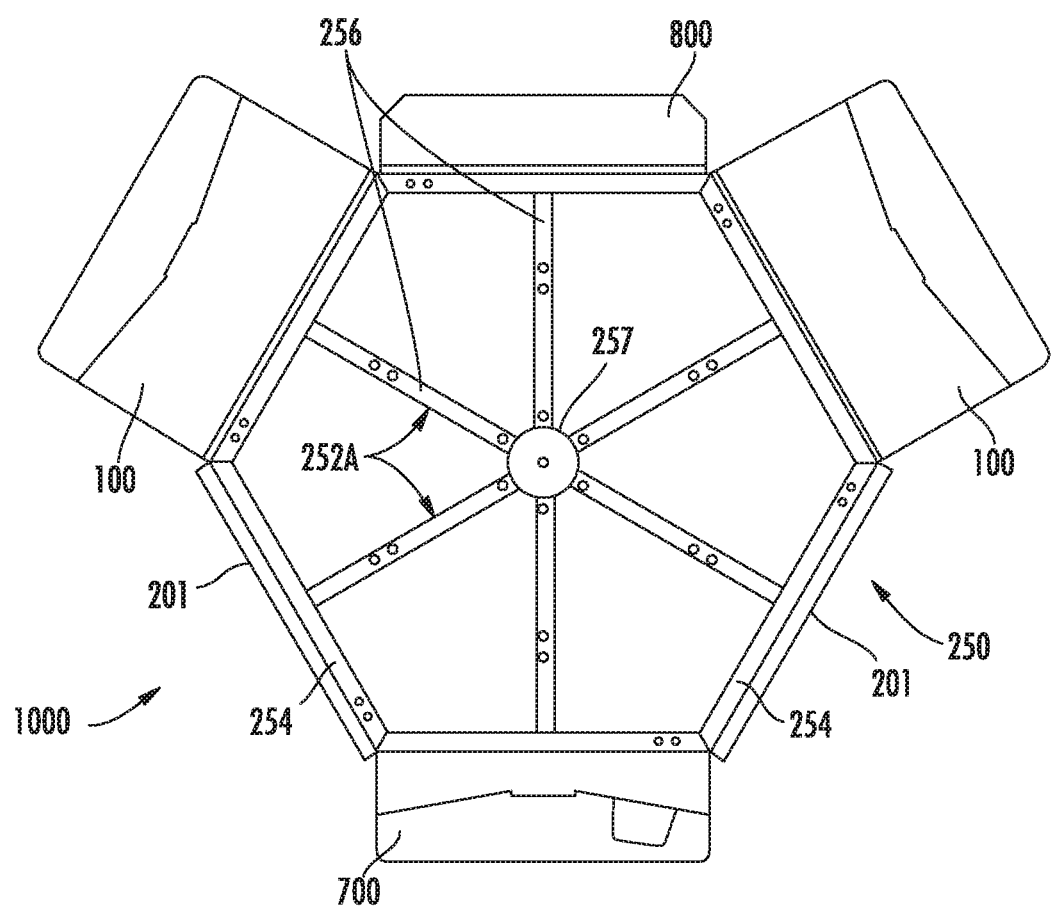

FIG. 3 is a top view of the secure storage and retrieval system of FIG. 1.

Figure 4:
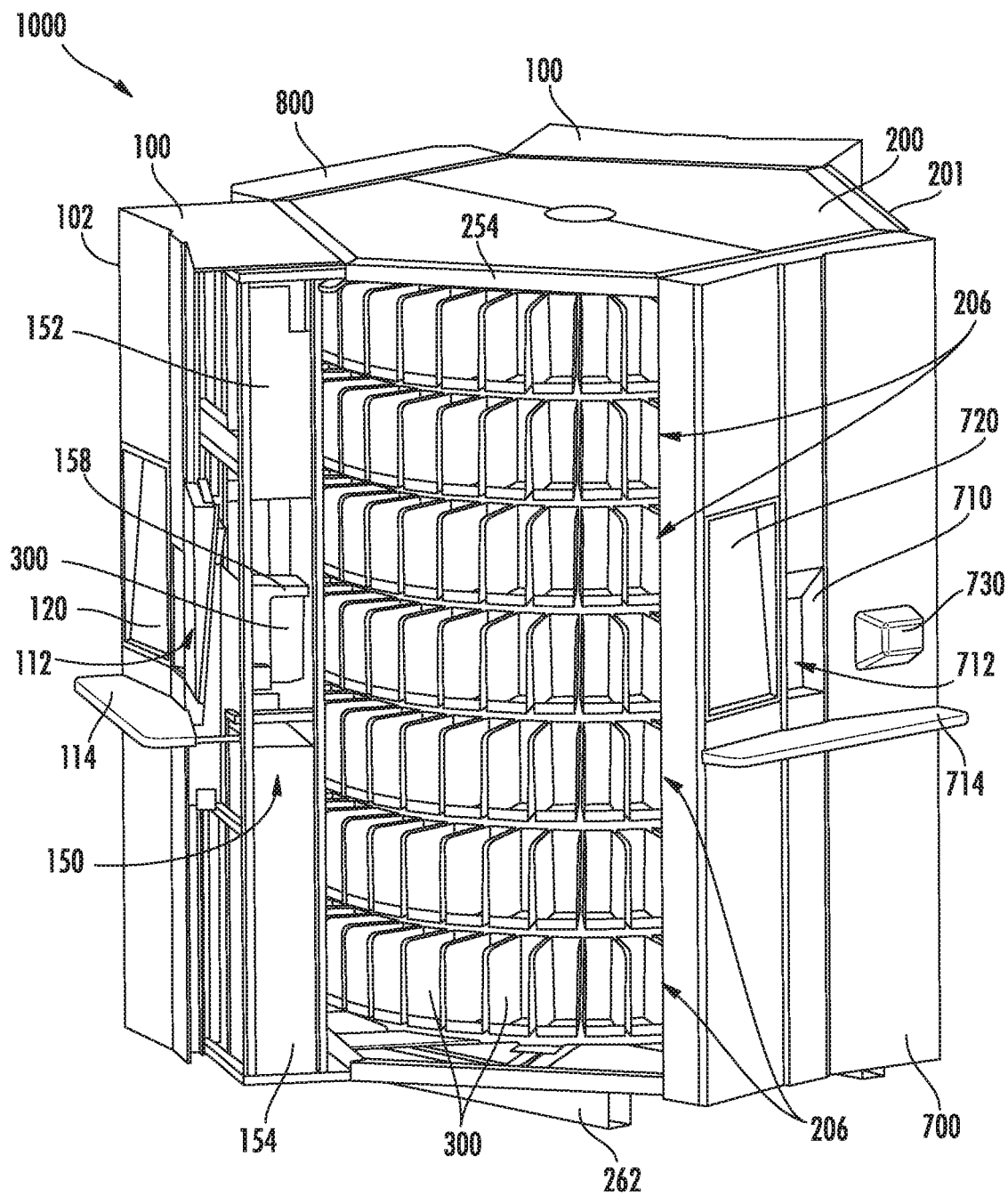

FIG. 4 is a partial internal sectional view of the secure storage and retrieval system of FIG. 1.

Figure 5:
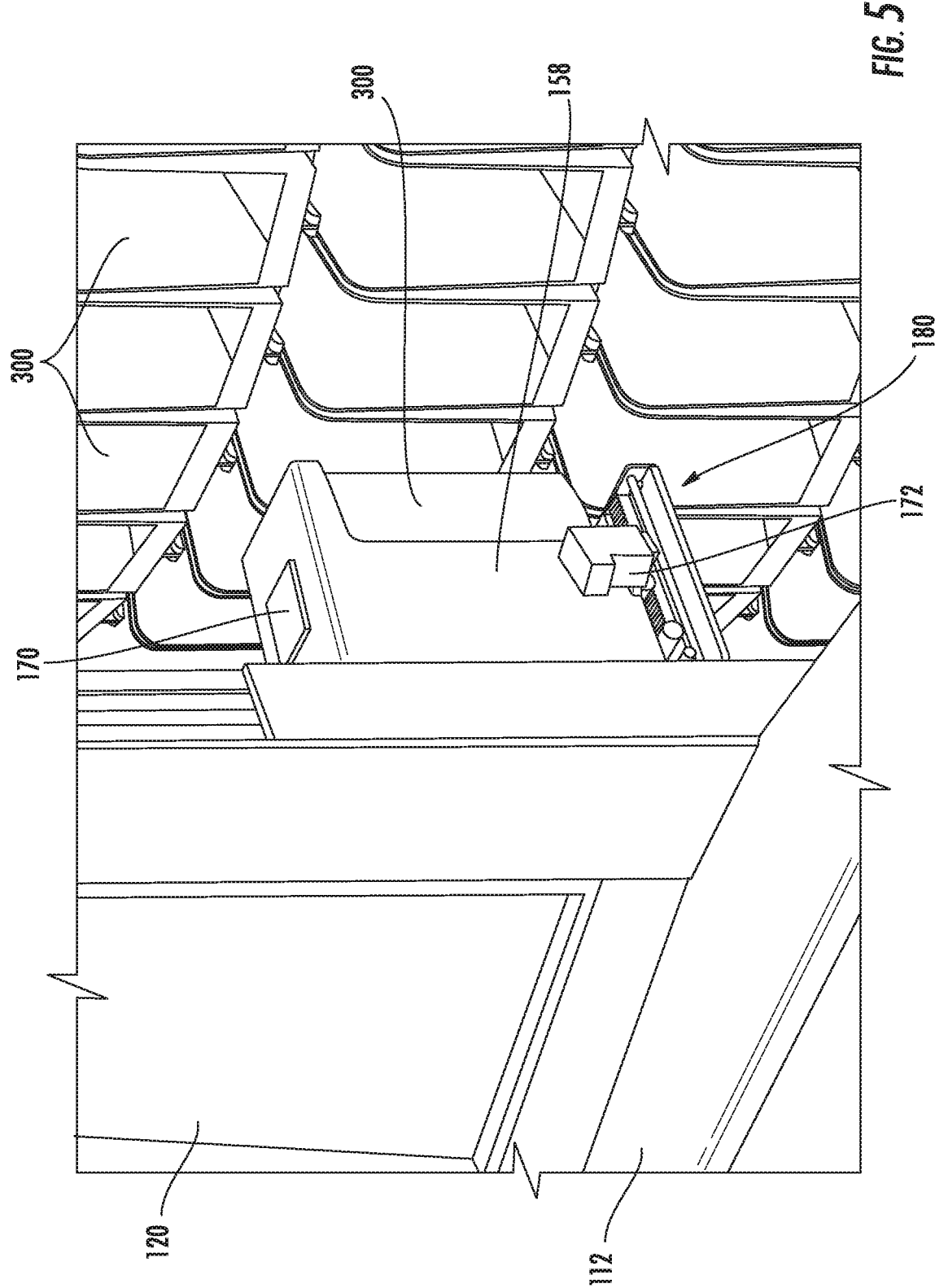

FIG. 5 an internal view of a portion of a user terminal of the secure storage and retrieval system of FIG. 1.

Figure 6:
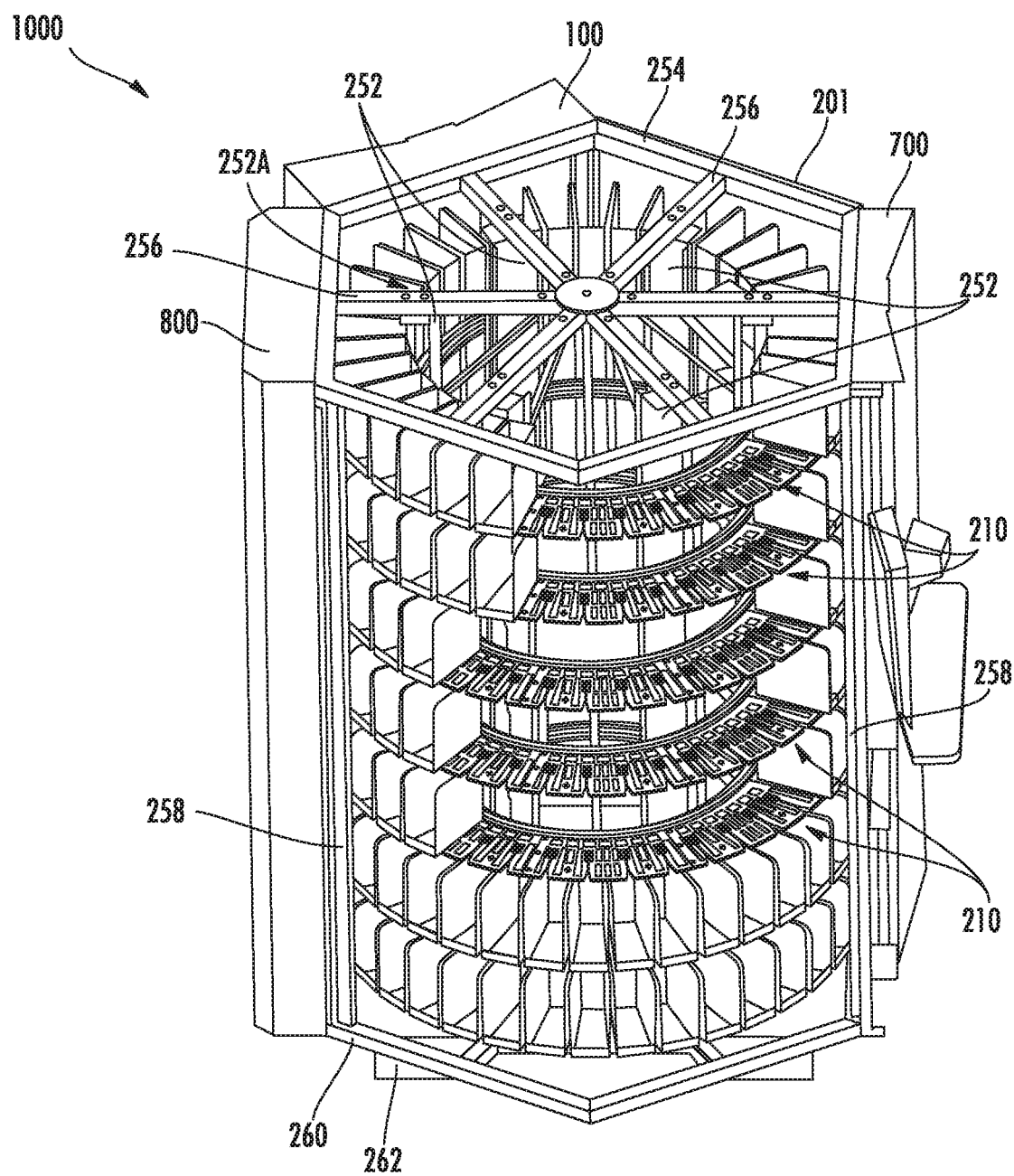

FIG. 6 is a partial internal sectional view of the secure storage and retrieval system of FIG. 1.

Figure 7:
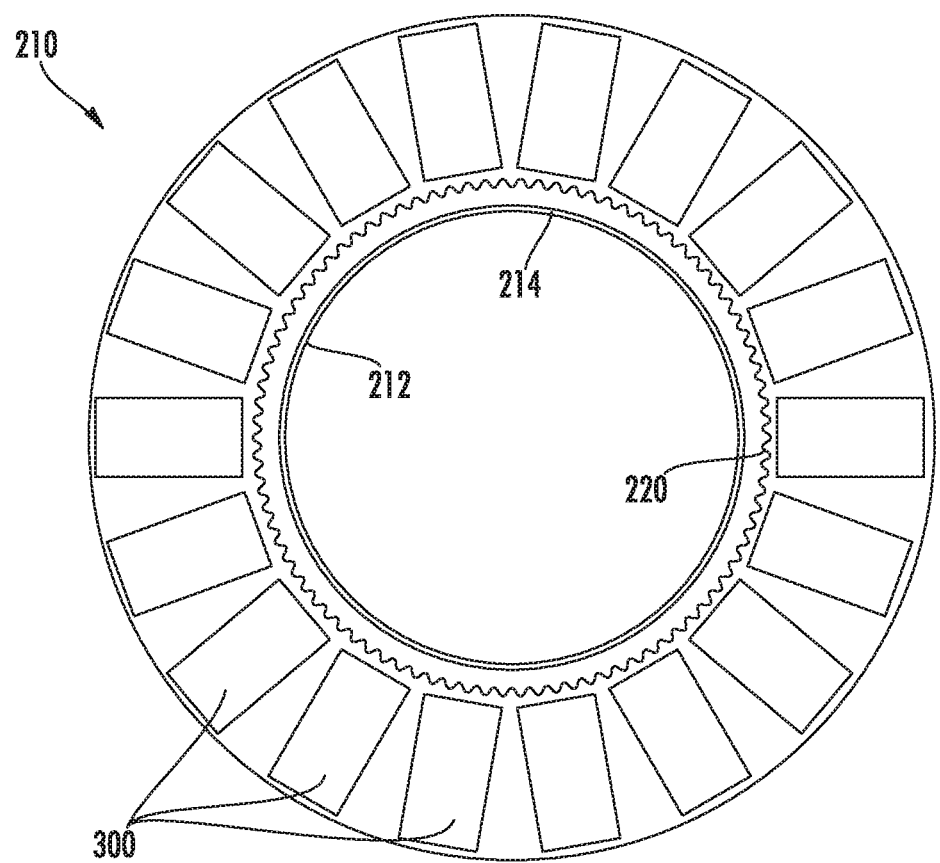

FIG. 7 is an isolated top view of an example embodiment of a platter with a plurality of storage bins arrayed thereabout.

Figure 8:
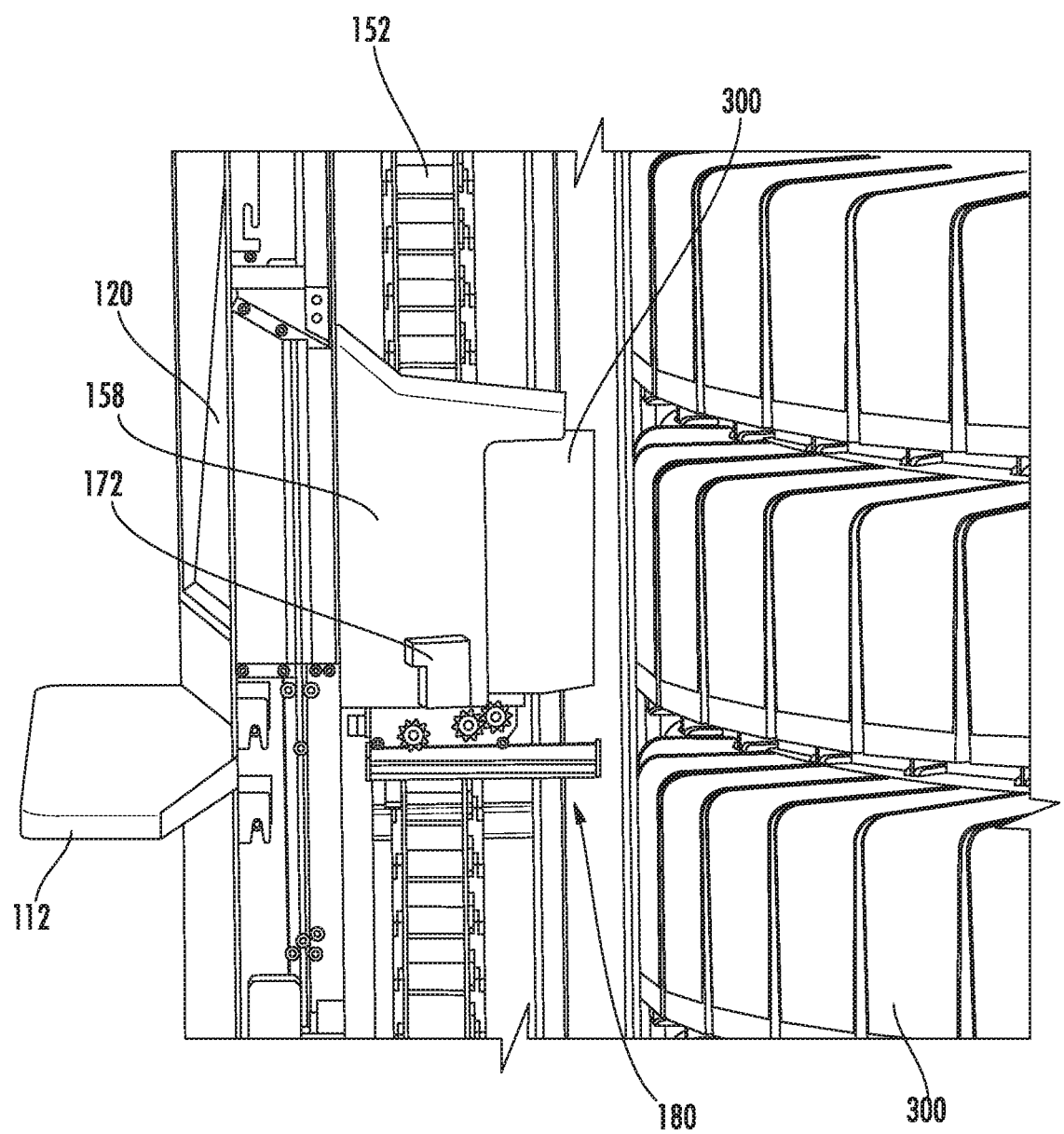

FIG. 8 is a sectional view of an example embodiment of a secure storage and retrieval system, showing internal components of the user terminal.

Figure 9A:
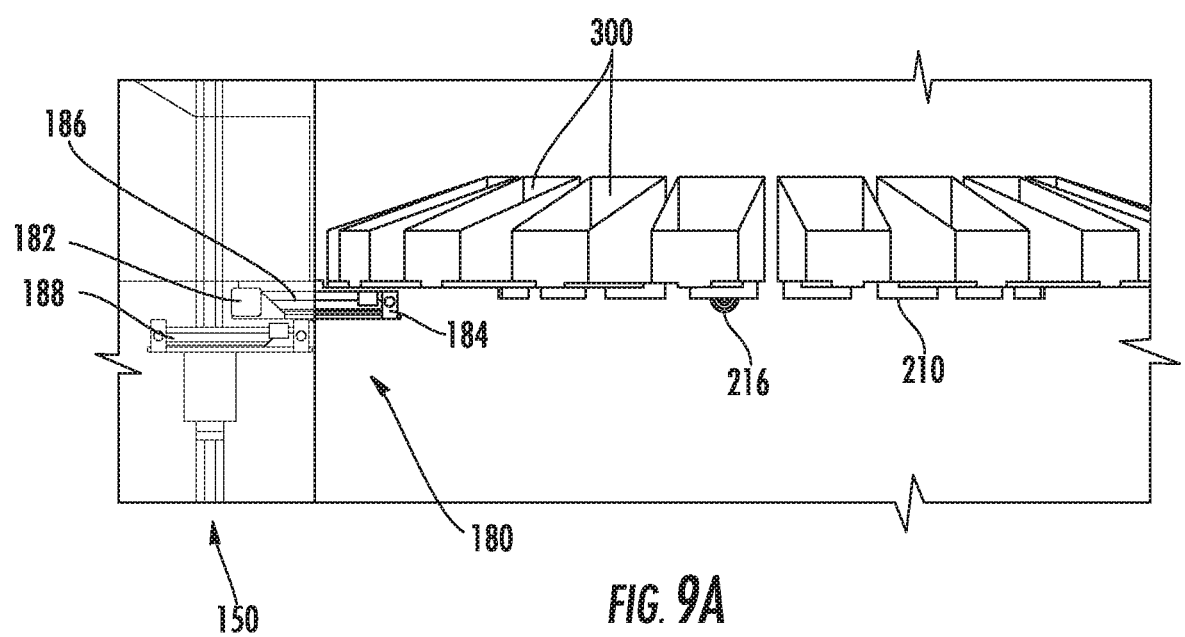
Figure 9B:
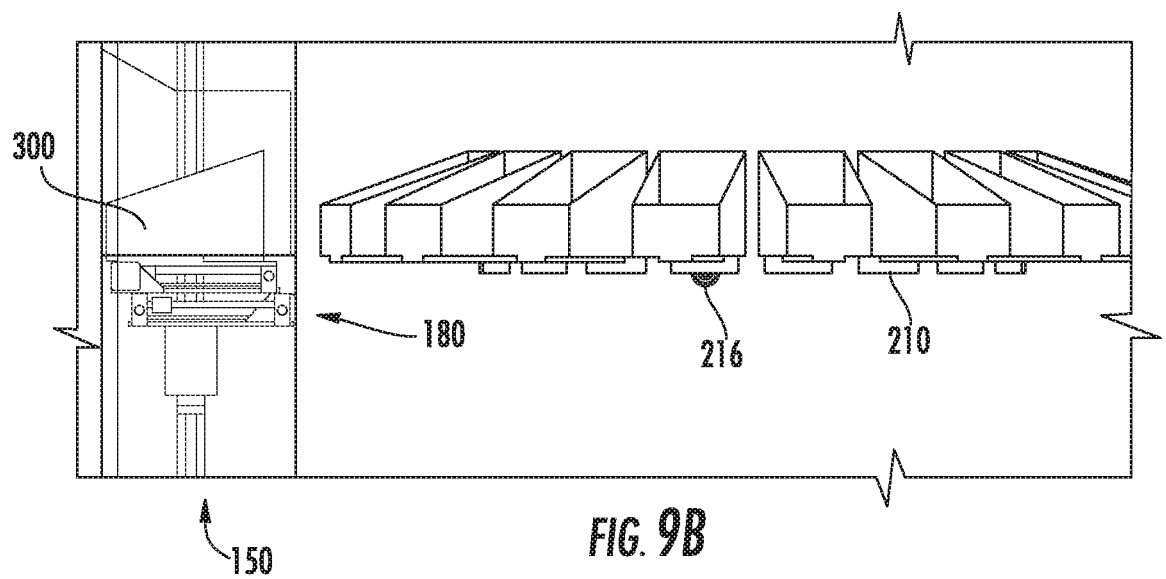

FIGS. 9A and 9B are isolated side views of an example embodiment of a secure storage and retrieval system.

FIG. 10 is an internal perspective view of the platters of an example embodiment of a secure storage and retrieval system.

Figure 11:
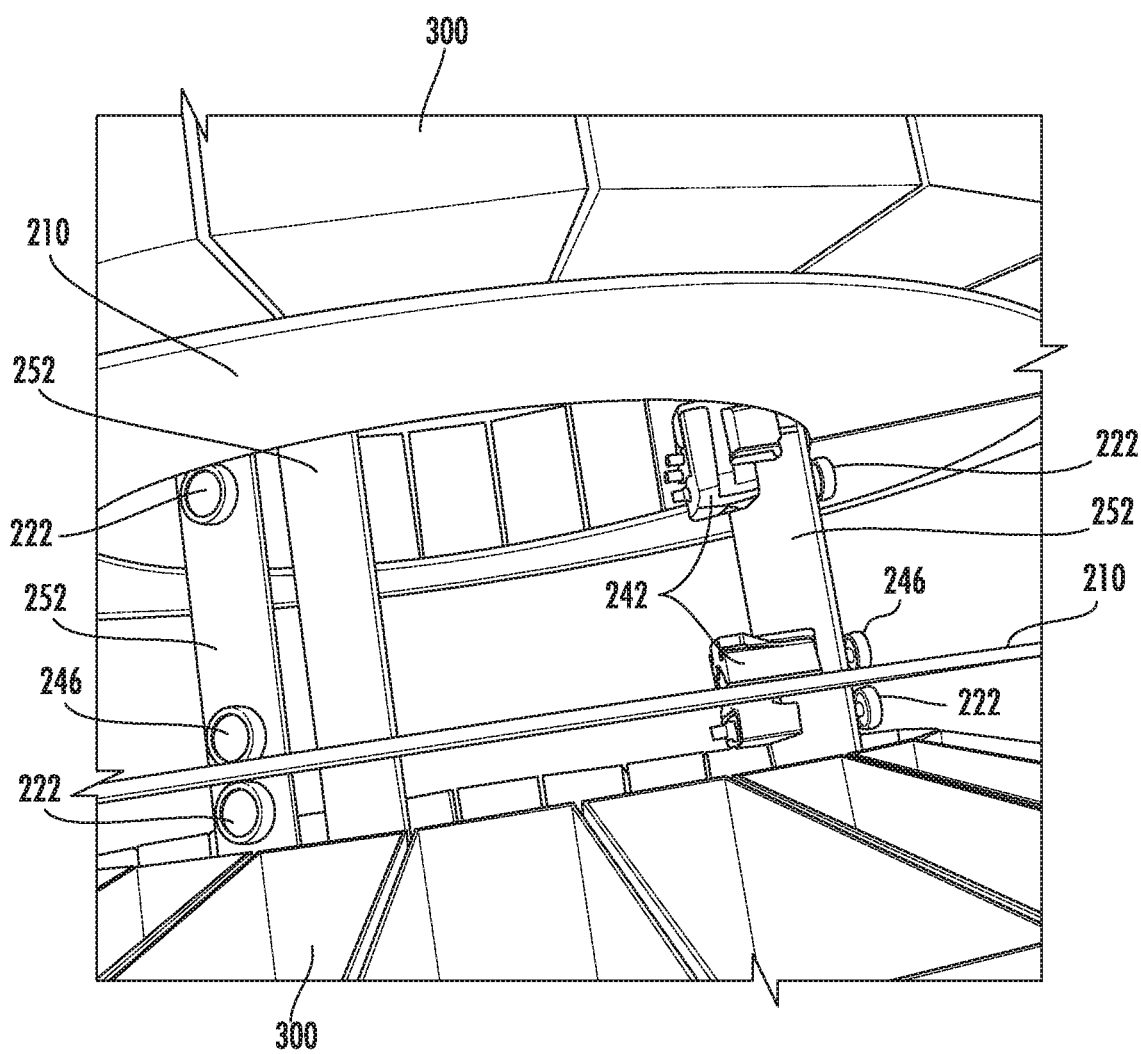

FIG. 11 is an internal view of a further example embodiment of a secure storage and retrieval system.

Figure 12:
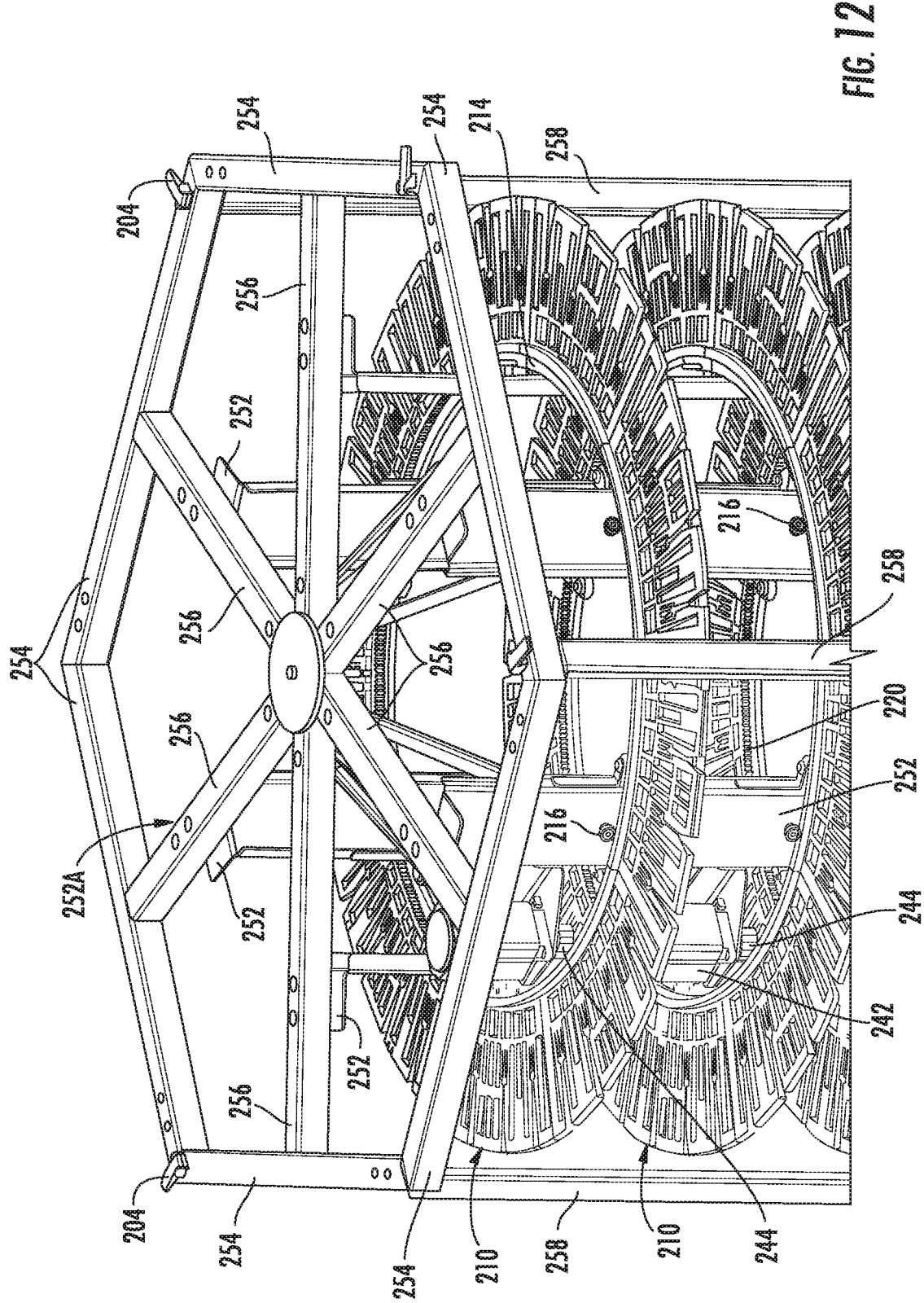

FIG. 12 is a perspective internal view of an example embodiment of a secure storage and retrieval system.

Figure 13:
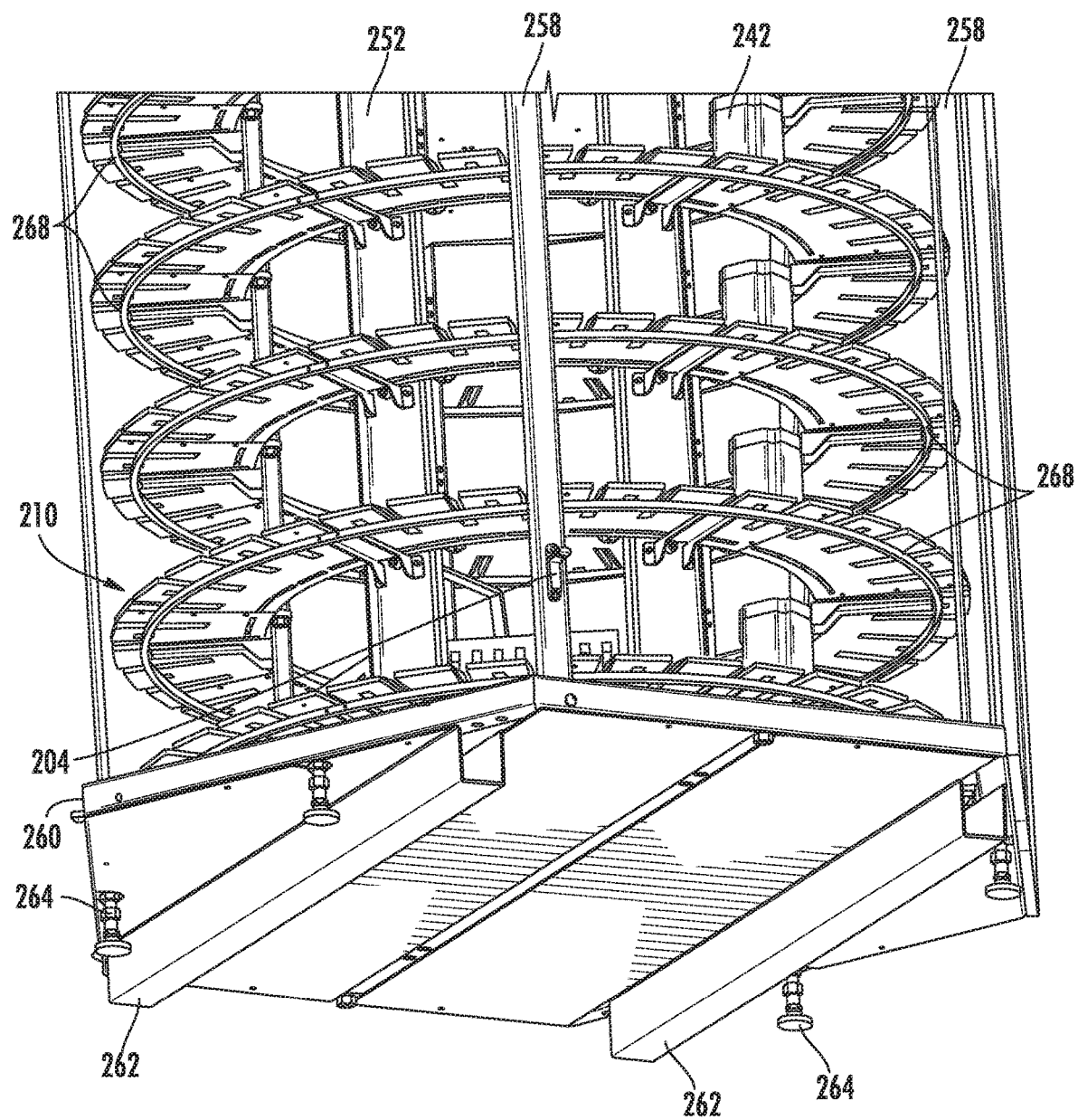

FIG. 13 is a perspective internal view of an example embodiment of a secure storage and retrieval system.

Figure 14:
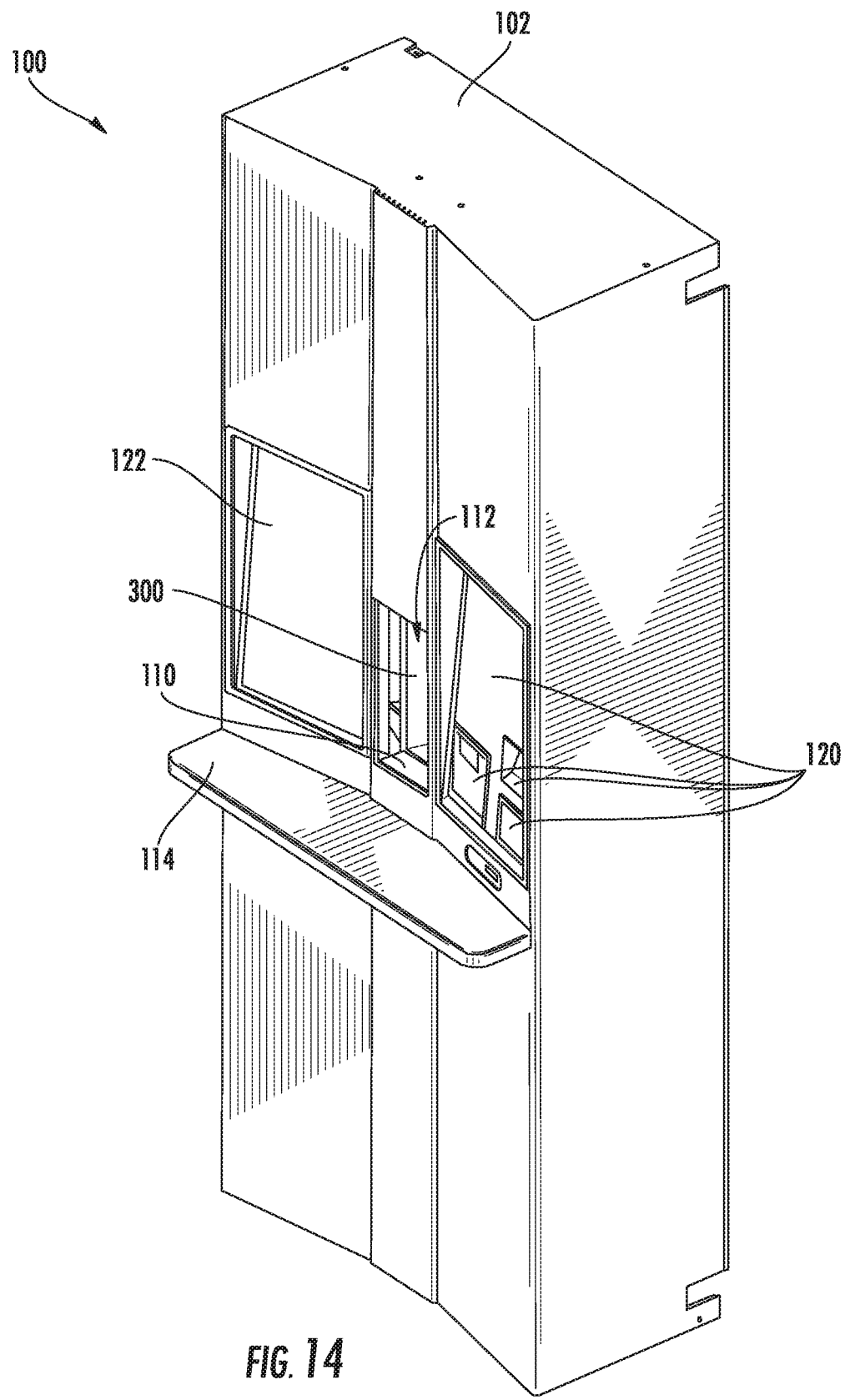
Figure 15:
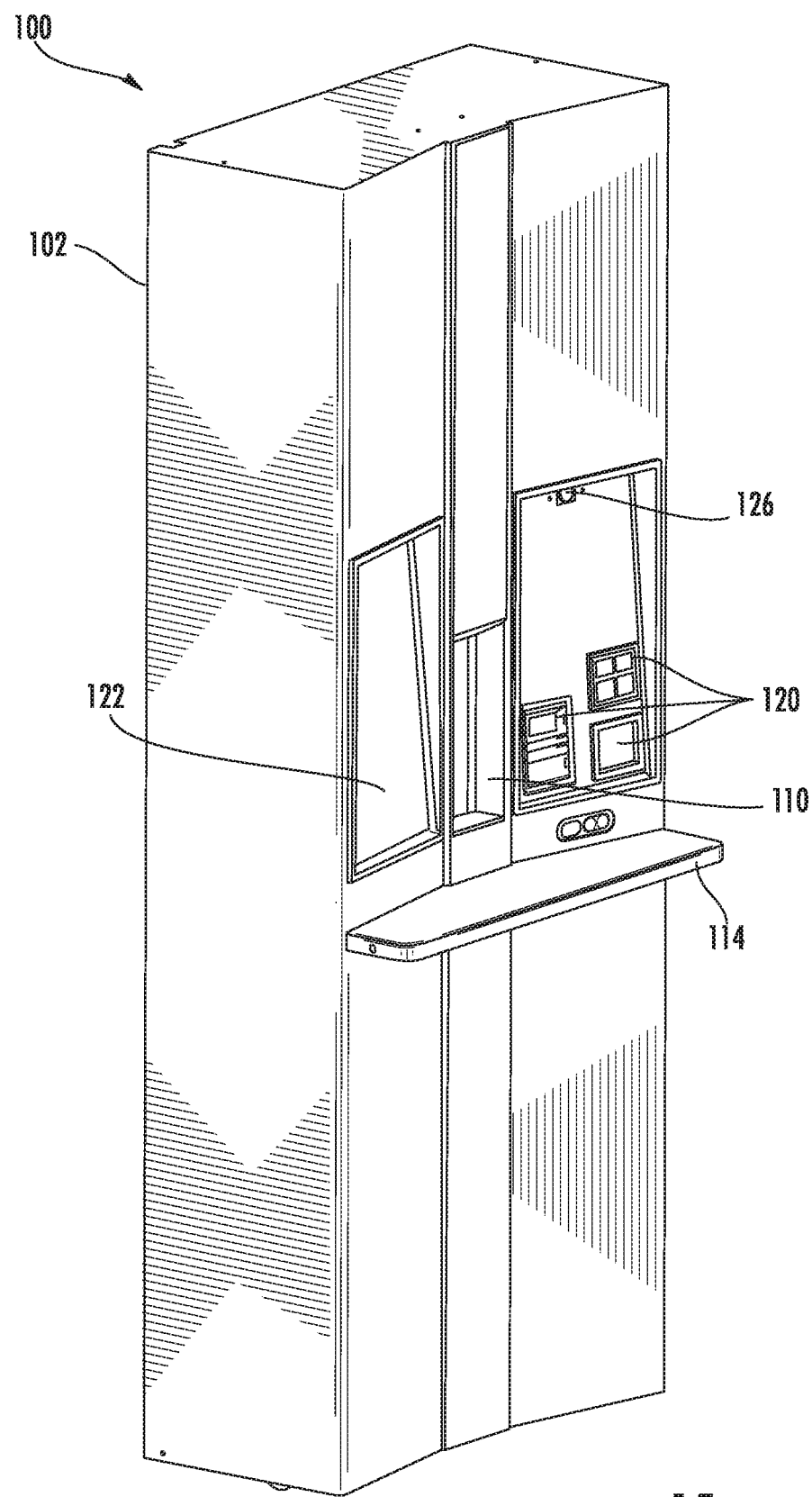
Figure 16:
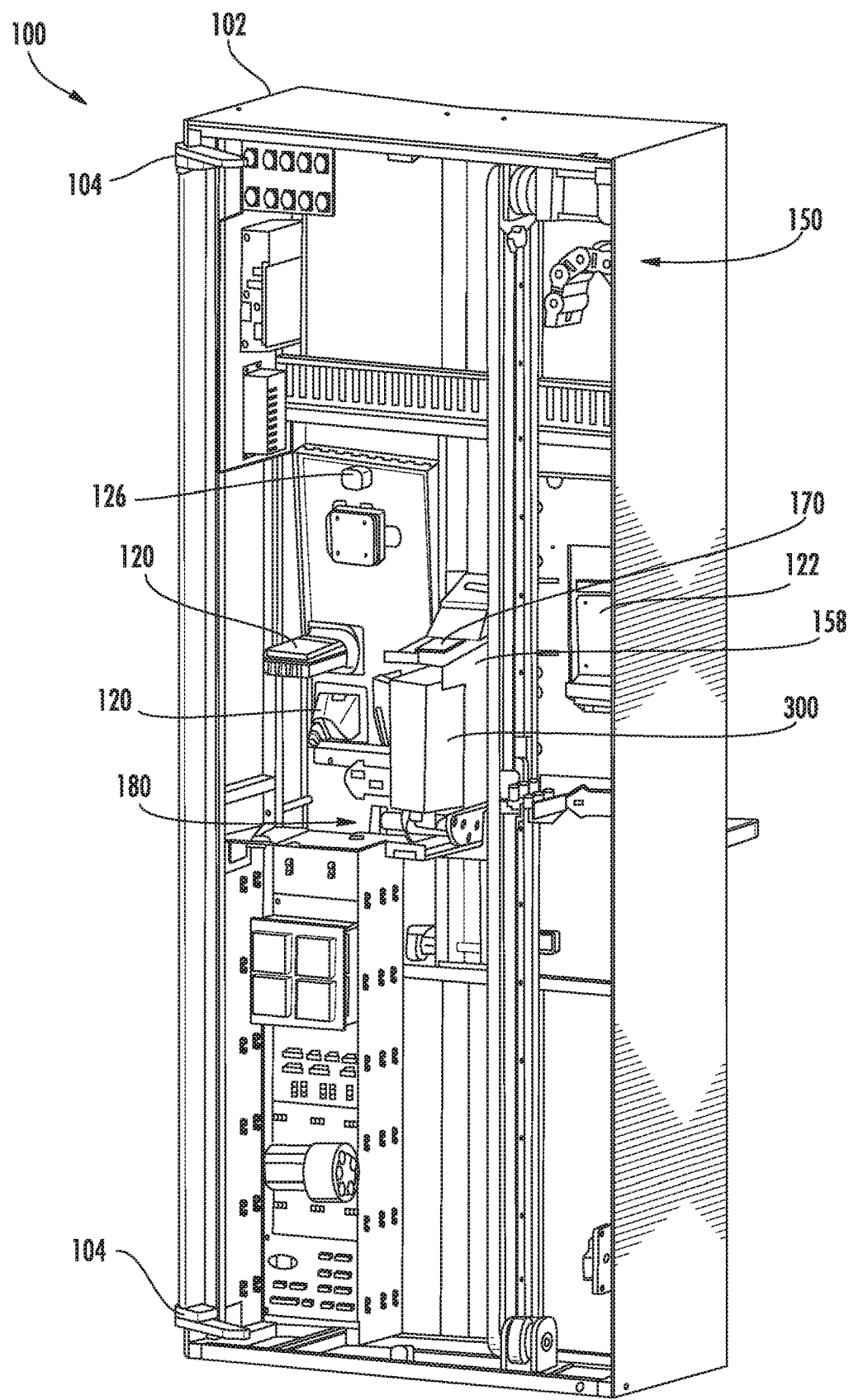

FIGS. 14-16 are isolated, perspective views of a user terminal of an example embodiment of a secure storage and retrieval system.

Figure 17:
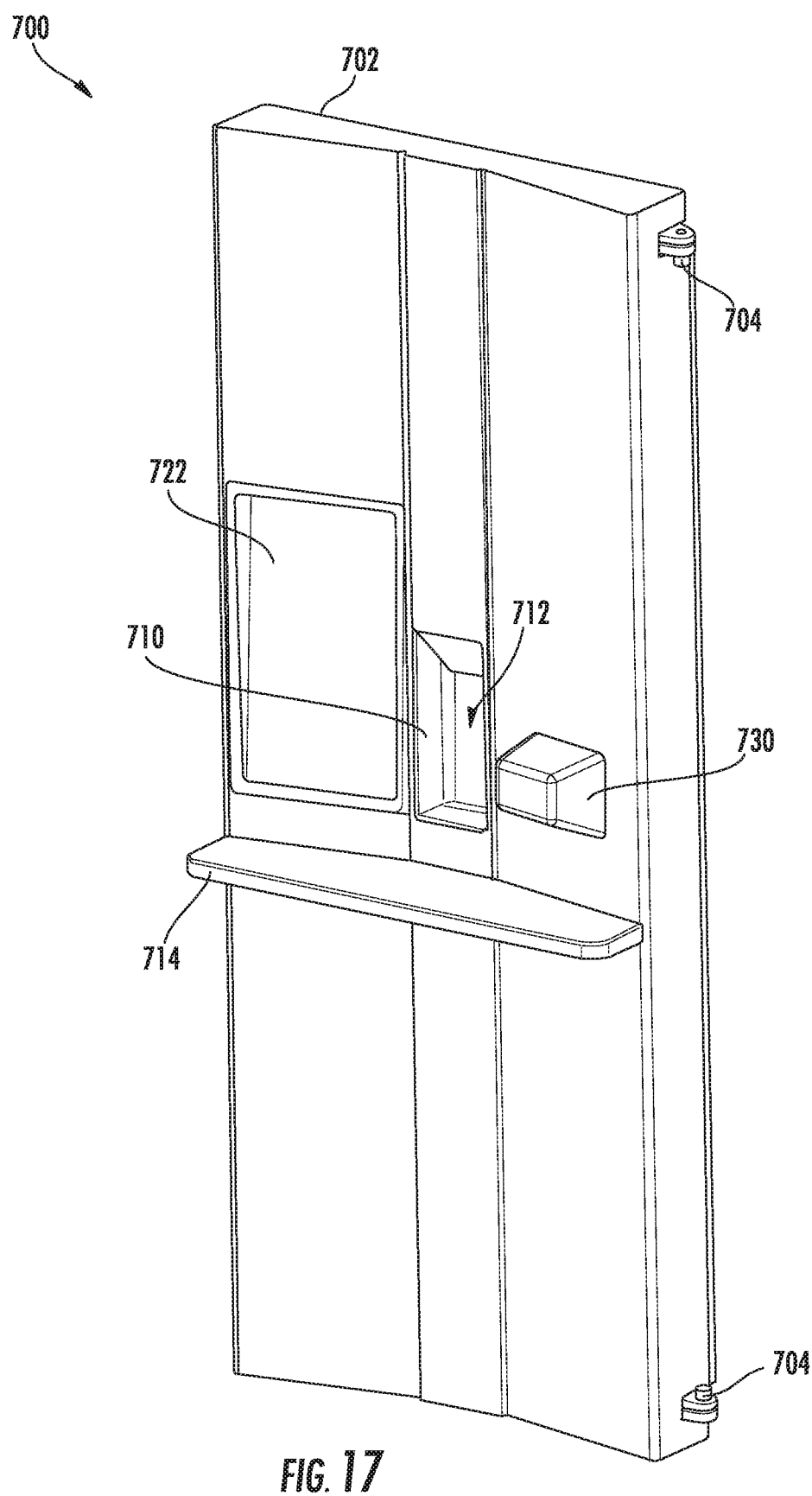
Figure 18:
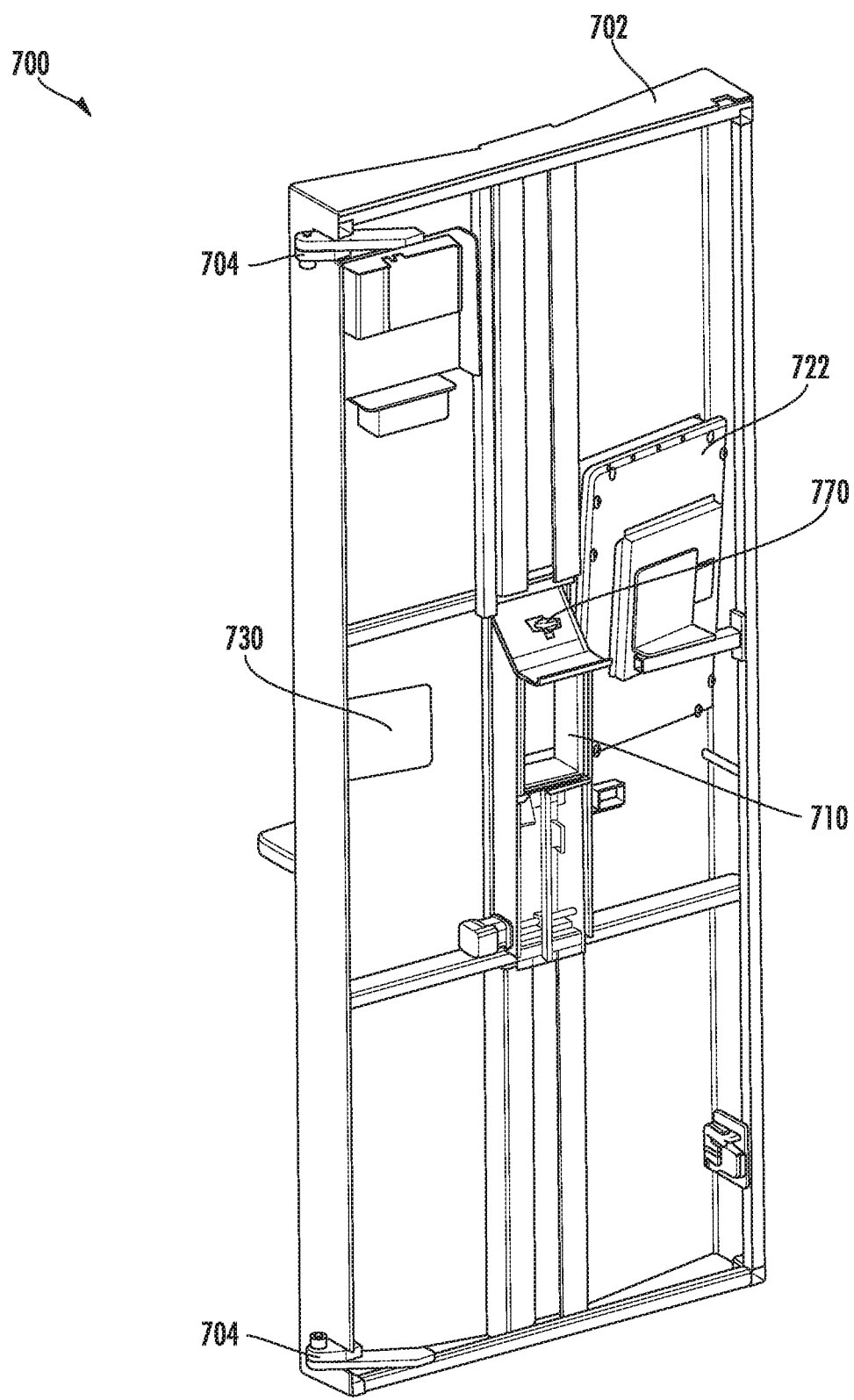

FIGS. 17 and 18 are isolated, perspective views of an example embodiment of a rapid retrieval and storage (RRS) terminal of a secure storage and retrieval system.

Figure 19:
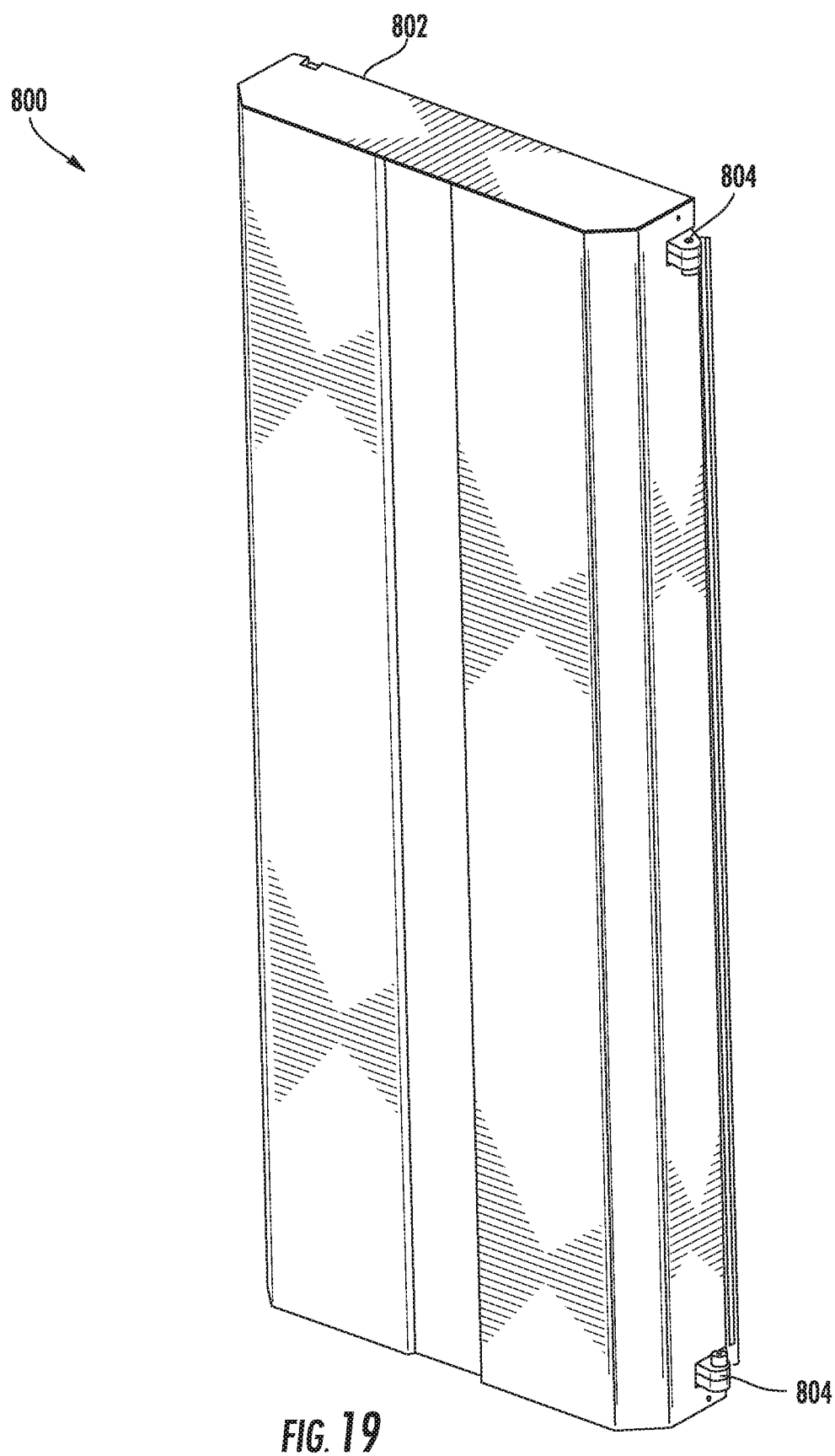
Figure 20:
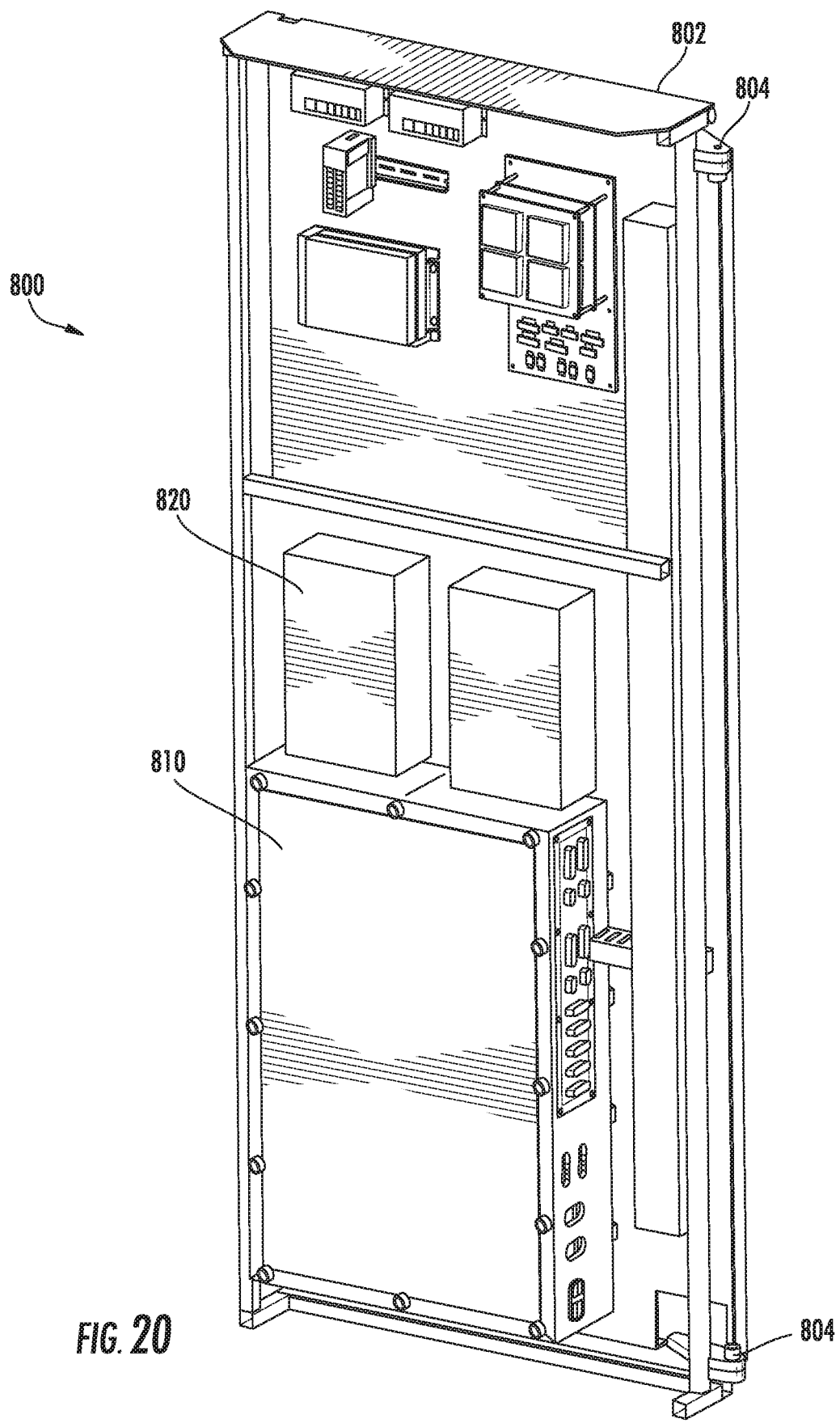

FIGS. 19 and 20 are isolated, perspective views of an example embodiment of a power pod of a secure storage and retrieval system.

Figure 21:
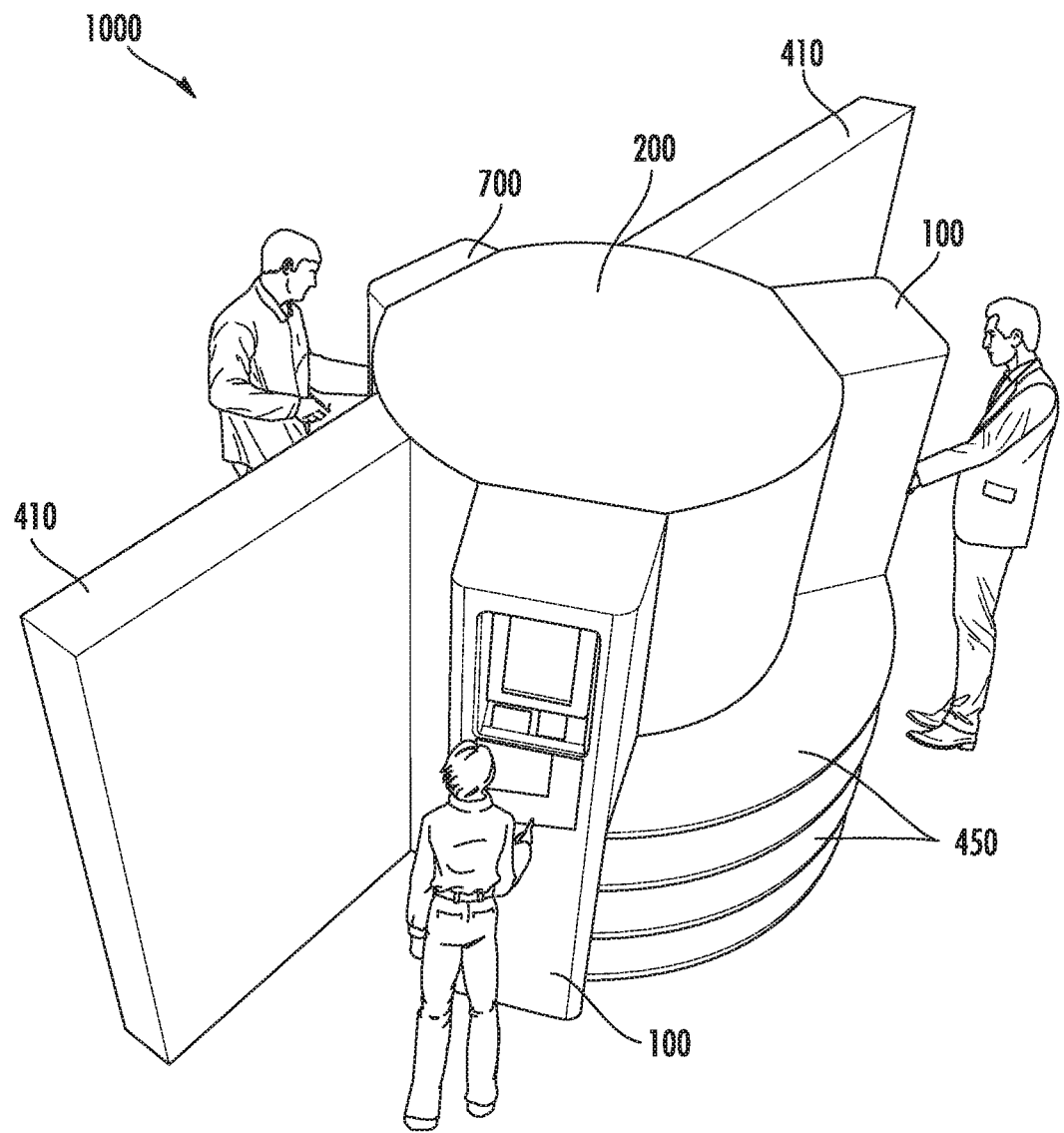

FIG. 21 is a perspective illustration of an example embodiment of a secure storage and retrieval system.

Figure 22:
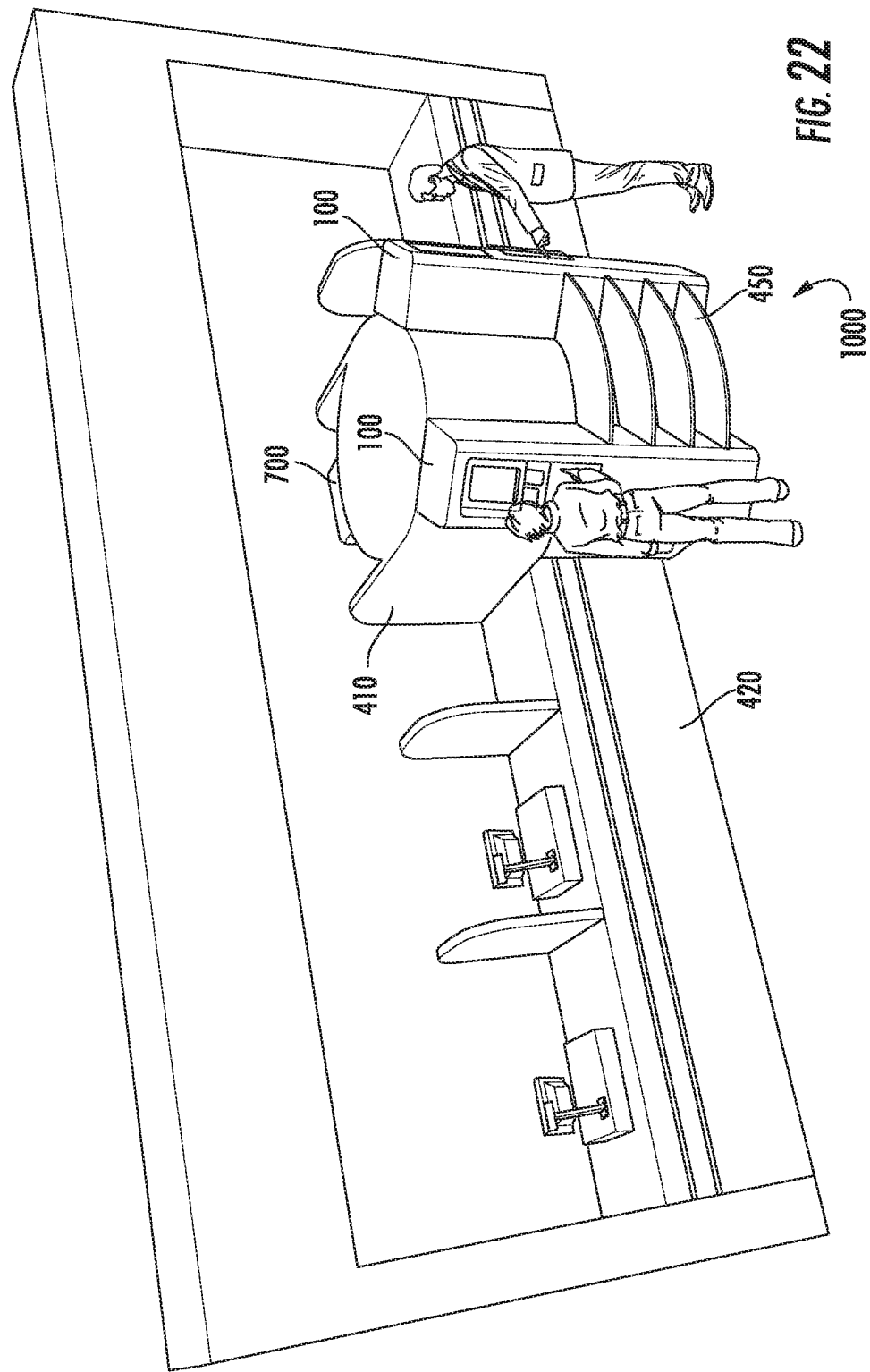

FIG. 22 is a perspective illustration of an example embodiment of a secure storage and retrieval system.

Figure 23:
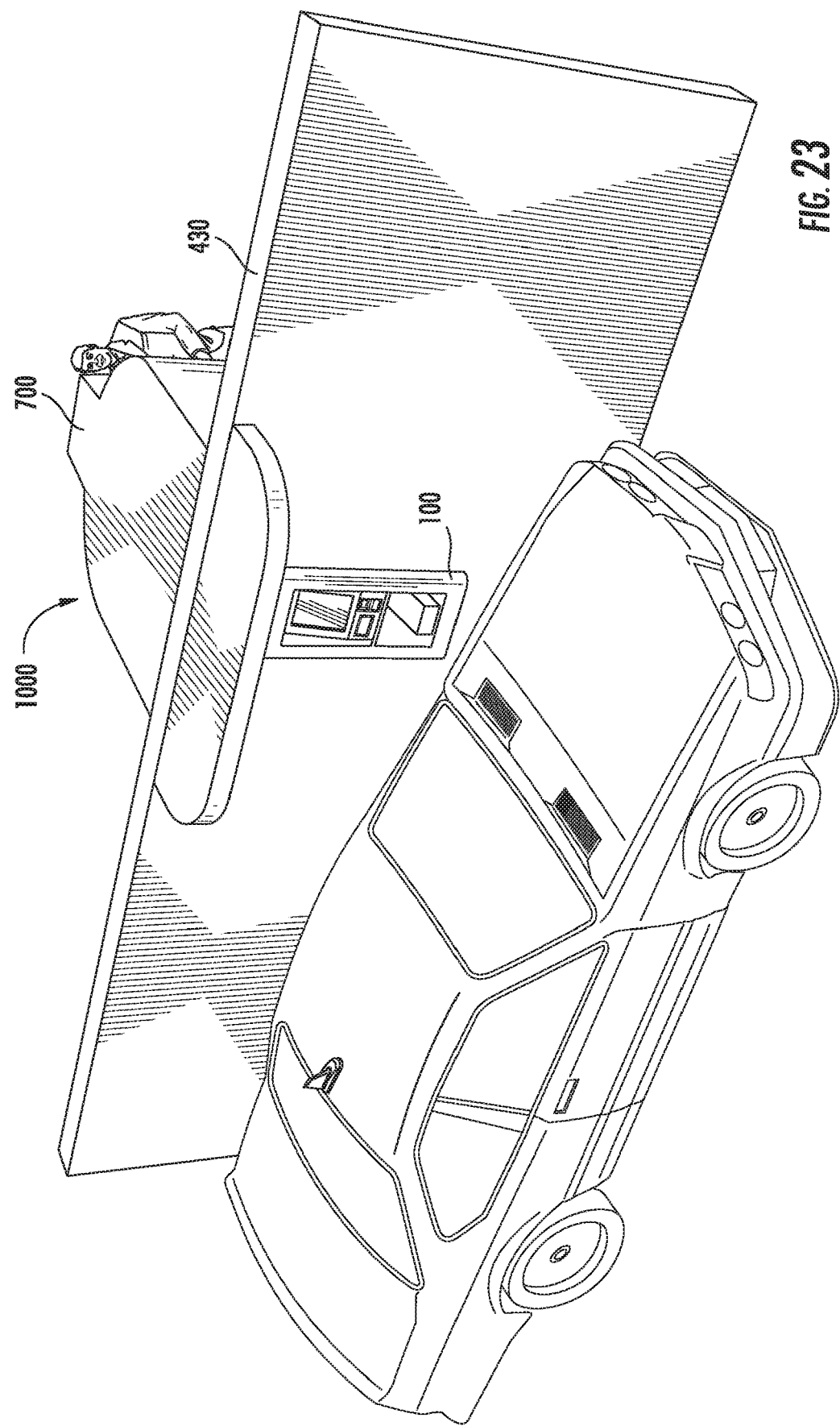

FIG. 23 is a perspective illustration of an example embodiment of a secure storage and retrieval system and environment.

Figure 24:
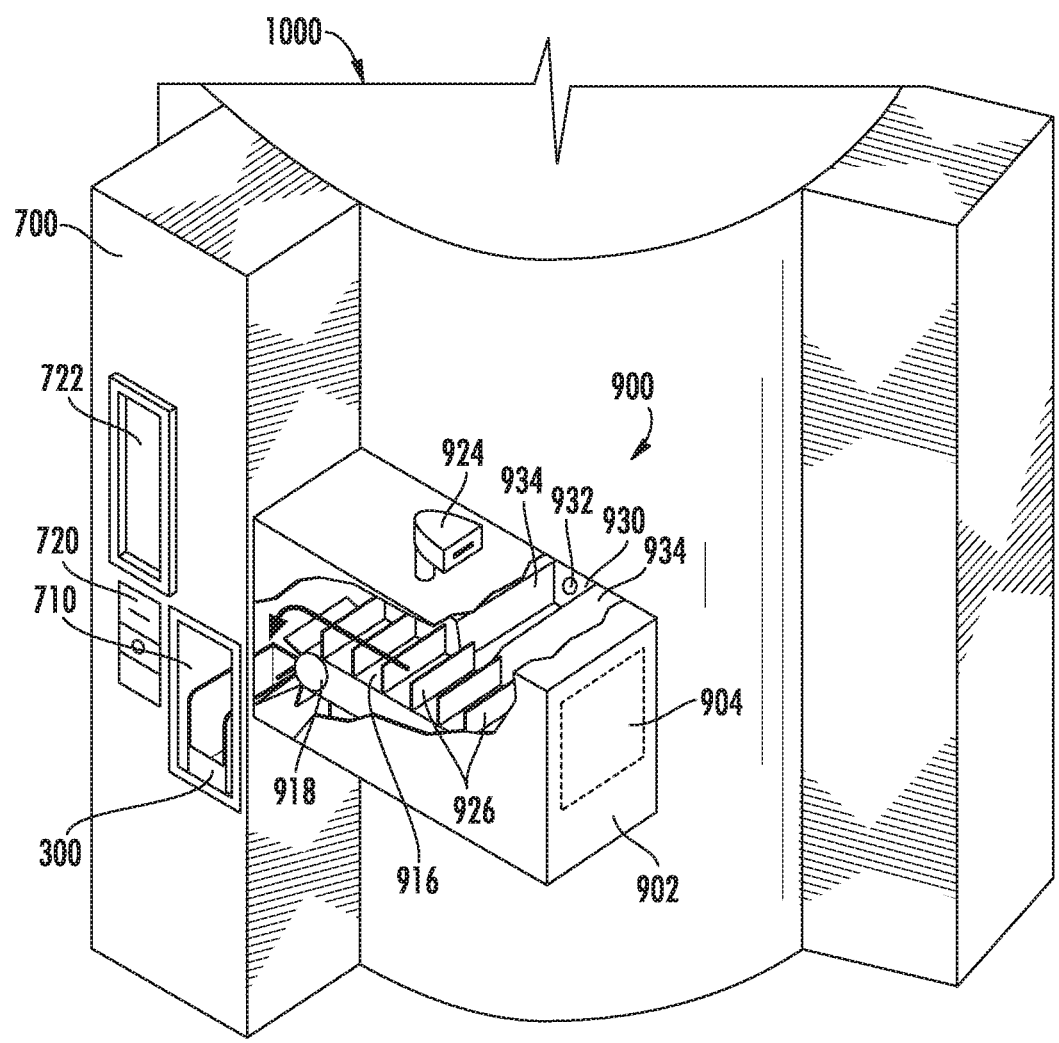

FIG. 24 is a schematic perspective illustration of an example embodiment of a buffer system used for induction of a series of items into any of the secure storage and retrieval systems disclosed herein.

Figure 25:
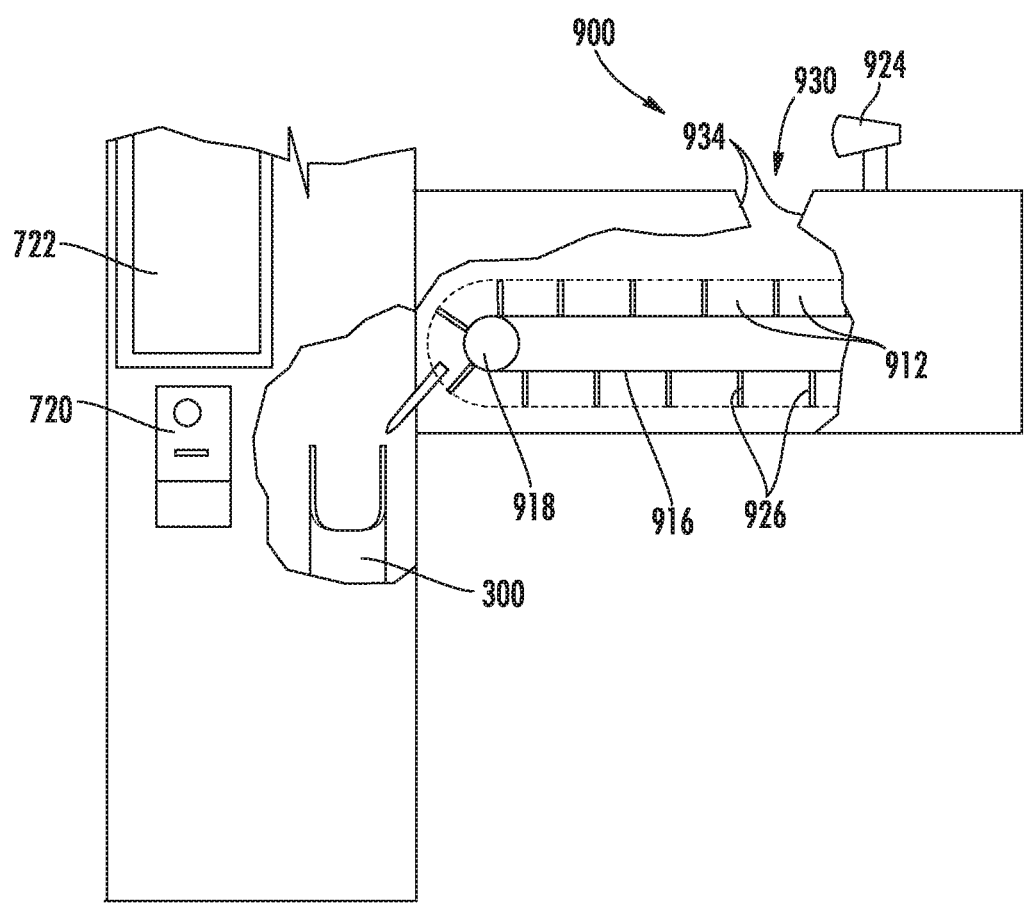

FIG. 25 is a schematic front view of the example embodiment of the buffer system shown in FIG. 34.

Figure 26:
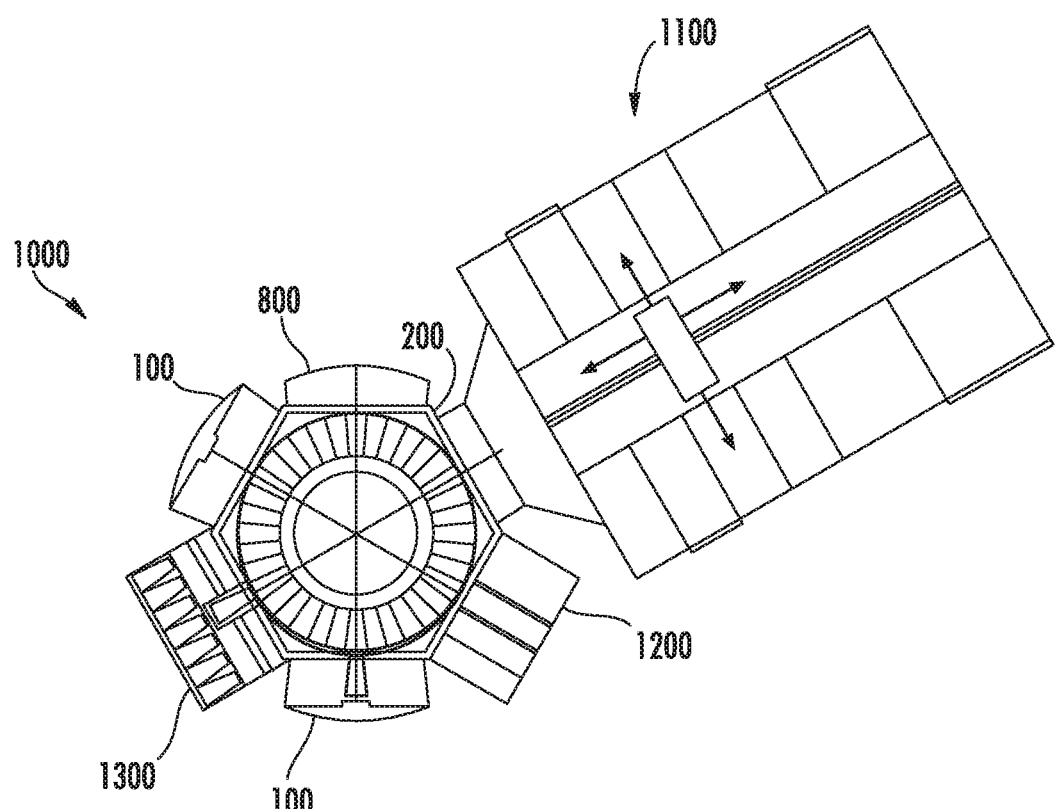

FIG. 26 is a schematic illustration of an example embodiment of a secure storage and retrieval system.

Figure 27:
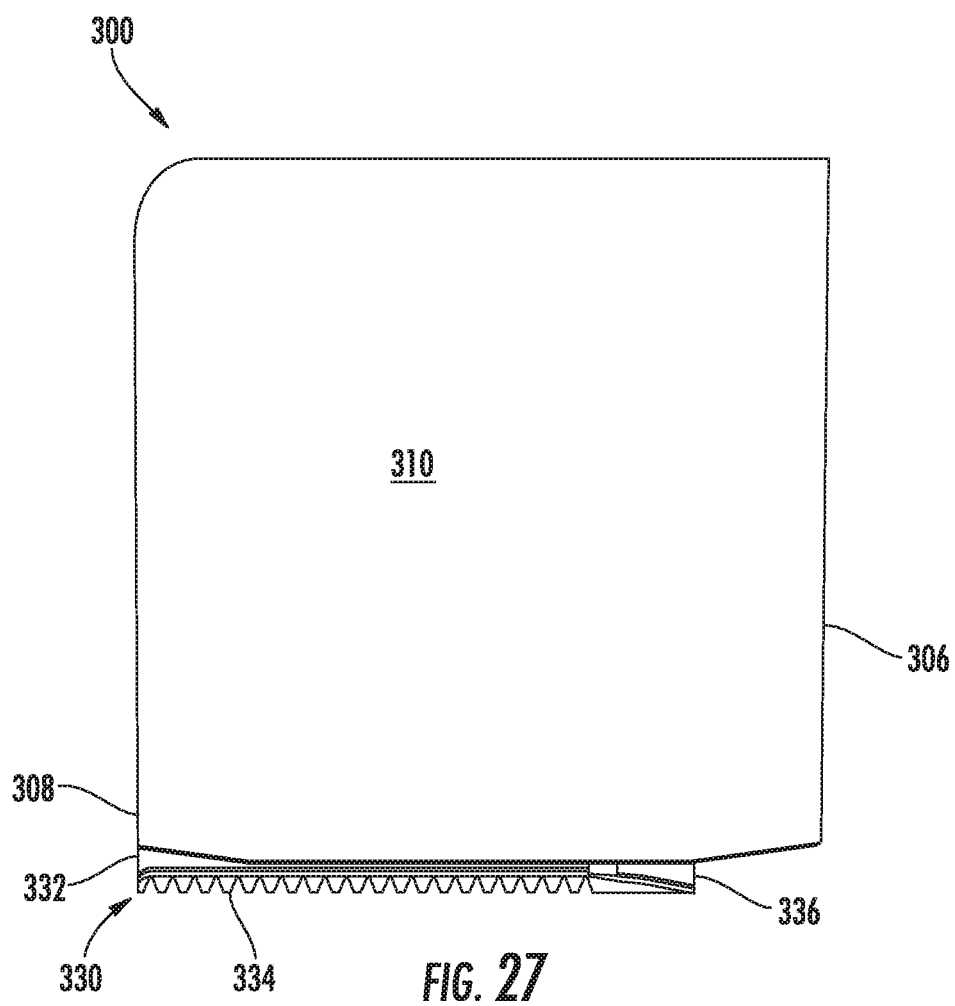
Figure 28:
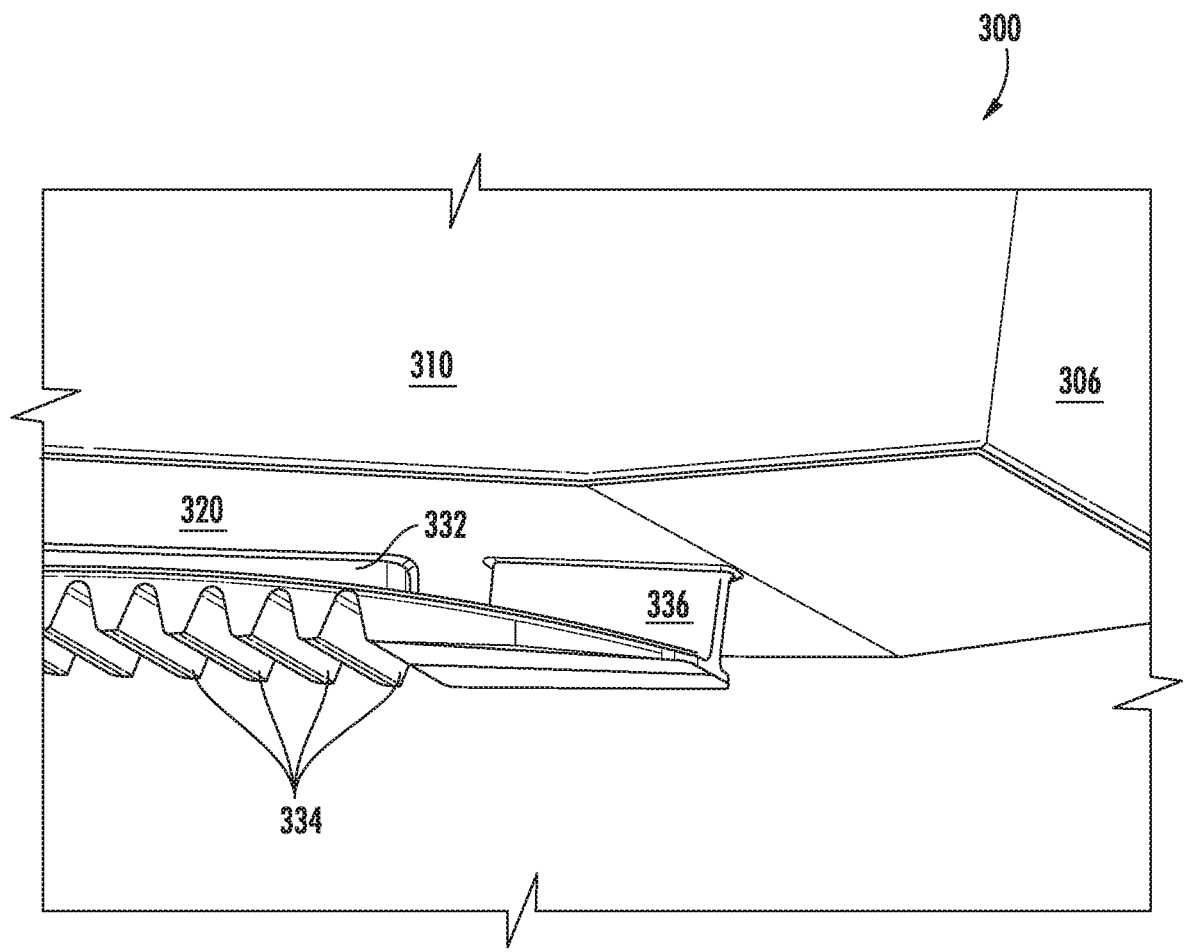

FIGS. 27 and 28 are side and isolated views of an example embodiment of a storage bin for use in a secure storage and retrieval system.

Figure 29:
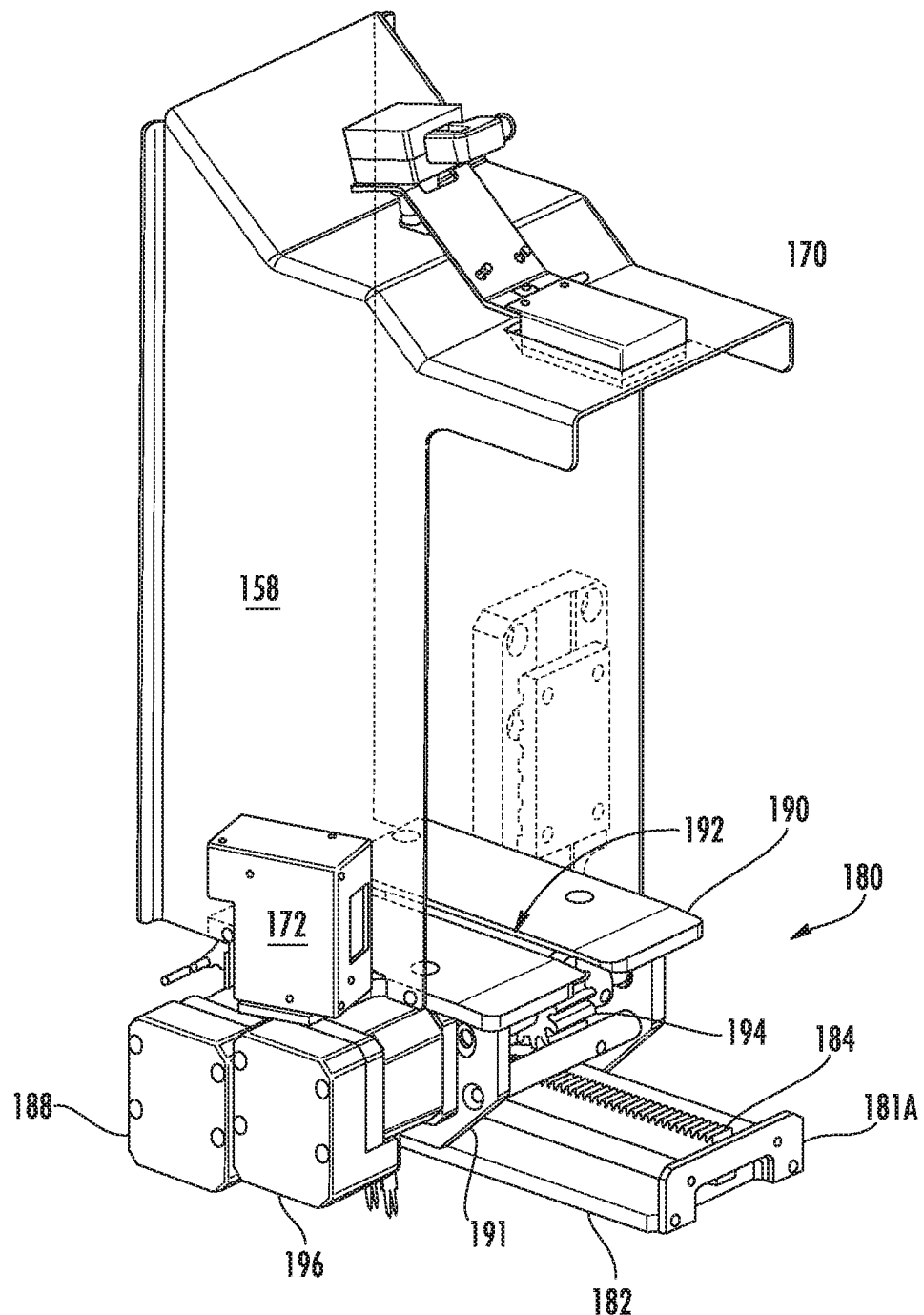
Figure 30:
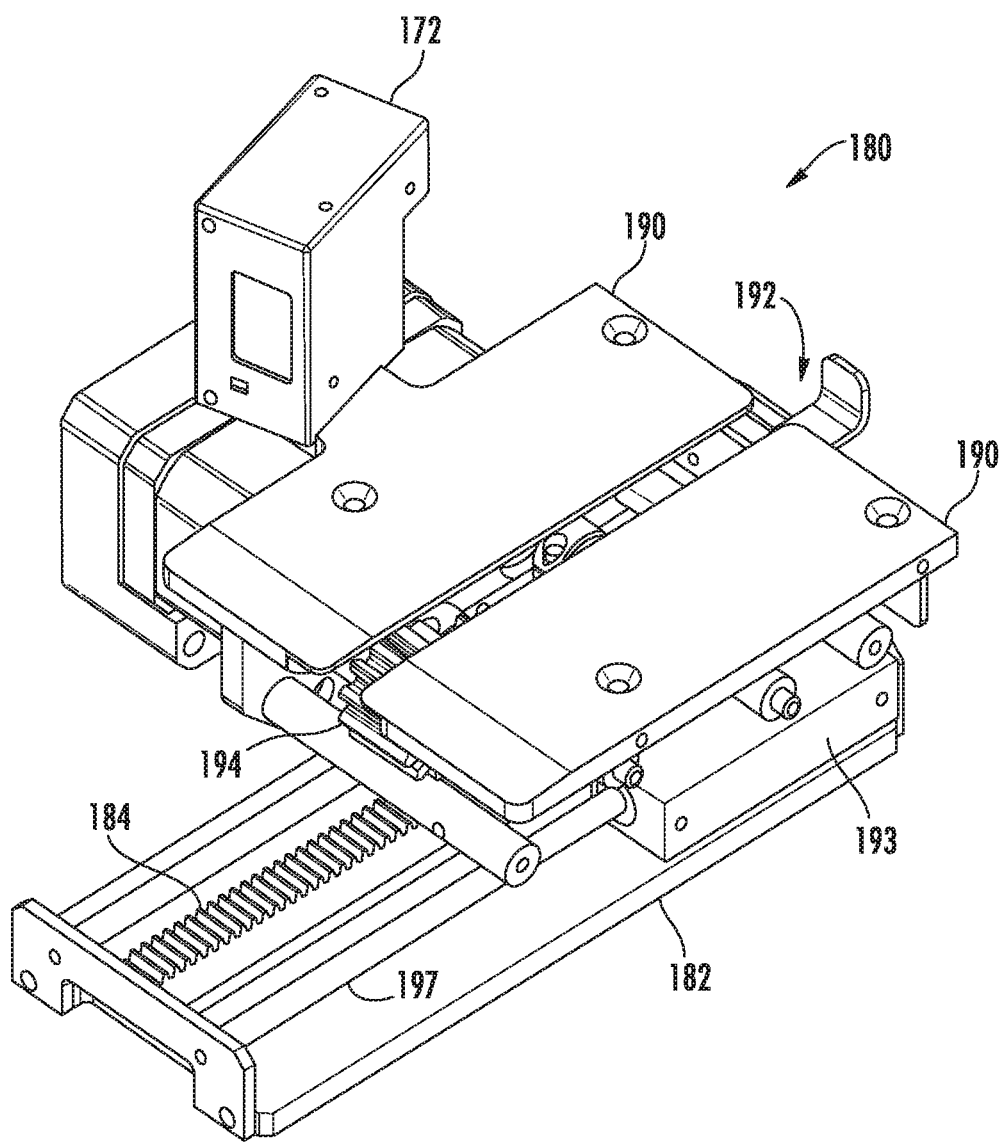
Figure 31:
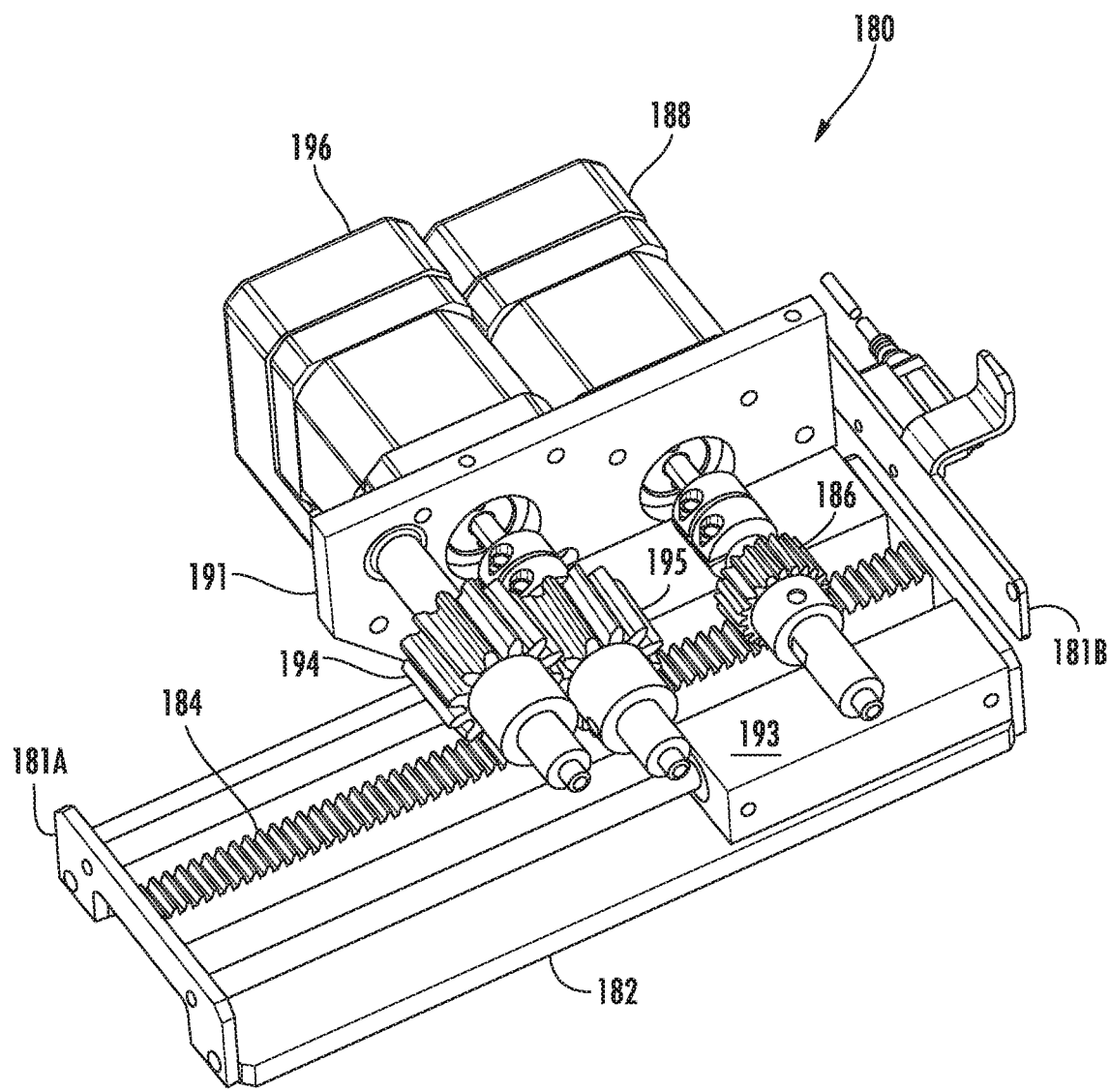

FIGS. 29-31 are respective perspective views of an example embodiment of a trolley system for use in a secure storage and retrieval system.

Figure 32:
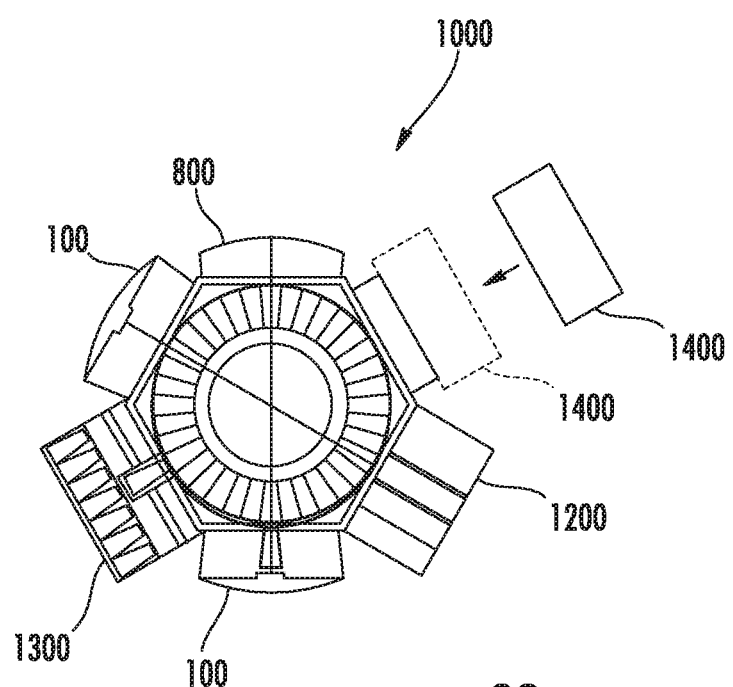

FIG. 32 is a schematic illustration of an example embodiment of a secure storage and retrieval system.

DETAILED DESCRIPTION

The presently disclosed subject matter now will be described more fully hereinafter, in which some, but not all embodiments of the presently disclosed subject matter are described. Indeed, the disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the present disclosure and the claims.

All publications, patent applications, patents and other references cited herein are incorporated by reference in their entireties for the teachings relevant to the sentence and/or paragraph in which the reference is presented.

Following long-standing patent law convention, the terms "a", "an", and "the" refer to "one or more" when used in this application, including the claims. Thus, for example, reference to "an element" includes a plurality of such elements, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the term "substantially," when referring to a value, an activity, or to an amount of a composition, mass, weight, temperature, time, volume, concentration, percentage, etc., is meant to encompass variations of in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed apparatuses and devices.

Referring to FIGS. 1-32, example embodiments of a secure storage and retrieval system, generally designated 1000, are shown. As shown in this embodiment, the system 1000 comprises a central vault 200 that has a generally hexagonally-shaped (e.g., when viewed along the longitudinal axis of the vault 200 and/or from vertically above the vault 200) external enclosure about which one or modules can be operably attached to, and interface with, the vault 200, for example, to allow for the insertion and/or removal of items, whether directly or indirectly, from within the vault 200 by a user, which can be, for example, a retail employee, a customer, and the like, present at the system 1000. While, in the example embodiment shown, the vault 200 comprises a generally hexagonally-shaped external enclosure, the vault 200 may have any suitably shaped external shape, profile, cross-section, etc., including, for example, circular, ovular, elliptical, triangular, square, rectangular, pentagonal, heptagonal, octagonal, nonagonal, decagonal, and the like (e.g., including cross-sectional shapes having more than 10 sides, surfaces, faces, etc.).

In the example embodiments shown, the system 1000 comprises a vault 200, in which a plurality of platters 210 are arranged, each of the platters 210 having a plurality of storage bins 300, which contain one or more items, arranged radially about a respective one of the platters 210. The system 1000 further comprises a plurality of sub-systems that can be removably and securely attached to an outer surface of the vault 200 to, for example, control operation of the system 1000, provide power to the system 1000, remove and/or input items and/or storage bins 300 within the vault 200, and the like. The sub-systems can comprise any of (e.g., a plurality of one or more of) a user terminal 100, a rapid retrieval and storage (RRS) terminal 700, a power pod 800, a buffer input device 900, a storage locker enclosure 1100, a locker pod 1200, a high capacity pod 1300, and/or a secure transfer device 1400.

In the example embodiment shown in FIGS. 1-20, the system 1000 comprises a vault 200, a plurality of (e.g., two) user terminals 100, an RRS terminal 700, and a power pod 800, the user terminals 100, the RRS terminal 700, and the power pod 800 being arranged radially about and mounted (e.g., lockingly) to the vault 200. FIGS. 21-24 show further example embodiments of the system 1000, in which the RRS terminal 700 is physically segregated (e.g., by a barrier and/or in a restricted access area) from the user terminal(s) 100. The embodiment shown in FIG. 25 shows an example embodiment in which the RRS terminal 700 is connected with a buffer input device 900. FIG. 26 shows another example embodiment of the system 1000, in which the system 1000 comprises a vault 200, to which are connected a plurality of (e.g., two) user terminals 100, a power pod 800, a storage locker enclosure 1100, a locker pod 1200, and a high capacity pod 1300. FIGS. 27 and 28 show various aspects of an example embodiment of a storage bin 300 suitable for use in one or all of the example embodiments of the system 1000 disclosed herein. FIGS. 29-31 show various aspects of an example embodiment of a trolley system 180 that transports storage bins 300 (e.g., individually) within a user terminal 100 between a platter 210 within the vault 200 and a door 110 of the user terminal 100, where the contents of the storage bin 300 on the trolley system 180 are accessible by a user physically present at the user terminal 100. FIG. 32 shows another example embodiment of the system 1000, in which the system 1000 comprises a vault 200, to which are connected a plurality of (e.g., two) user terminals 100, a power pod 800, a locker pod 1200, and a high capacity pod 1300, and a secure transfer device 1400, which can be an enclosed cart that transports items within the interior thereof and can securely engage with and/or be mounted to an external surface of the vault 200, a user terminal 100, an RRS terminal 700, a storage locker enclosure 1100, a locker pod 1200, and/or a high capacity pod 1300 to transfer the items from within the secure transfer device 1400 into the vault 200.

While the system 1000 can be operable with one or more (e.g., only a single or a plurality of) user terminals 100, the system 1000 comprises, in a majority of the embodiments shown, a plurality of (e.g., two) user terminals 100 that are arrayed around and connected over a mounting surface of the vault 200, at which one or more hinges 204 are attached to the vault 200 to pivotably connect the sub-systems, such as the user terminals 100, to the vault 200 in a substantially sealing and tamper-proof manner. The user terminals 100 can be installed adjacent each other or spaced apart by, for example, a power pod 800 and/or one or more cover panels 201.

In the example embodiment shown in FIGS. 1-20 and 26-32, the vault 200 comprises an internal frame 250 on which a plurality of platters, generally designated 210 are vertically arranged to accommodate a plurality of items and/or a plurality of storage bins 300 of a height less than a vertical distance between adjacent platters 210. The pitch between adjacent platters 210 can be varied to accommodate taller storage bins 300 at a higher pitch (e.g., greater distance between adjacent platters 210) and shorter storage bins 300 at a smaller pitch (e.g., smaller distance between adjacent platters 210). As shown, each user terminal 100 comprises a retrieval portal comprising a door 110 configured to receive one of the plurality of storage bins 300 such that a user at the user terminal 100 can remove the contents stored therein.

The plurality of platters 210 can be rotatably supported and spaced apart a vertical distance corresponding to a height dimension of one or more storage bins 300 placed thereon. The frame 250 comprises a base 260, to which at least two guide channels 262 are attached on an underside of the base 260 (e.g., on a surface of the base 260 oriented towards the floor). The guide channels 262 can be formed from one or more plates of, for example, a sheet metal material, and attached to a bottom surface of the base 260. The guide channels 262 are spaced apart a predetermined distance to allow for engagement of the vault 200 by, for example, a pallet jack, fork truck, or other suitable moving device for positioning the system 1000 at a designated position within the retail store assembly of the remaining components of the system.

The base 260 as shown has a hexagonal shape, but other shapes are contemplated as well. The base 260 has axially-aligned guide channels 262 (e.g., slots) formed to allow for longitudinal members of a fork truck, pallet jack, etc. to pass between the guide channels 262 to lift and move the frame 250 and/or the entire system 1000. The central region of the frame 250, defined in this example embodiment as being radially between the inner vertical struts 252 and the outer vertical door latch bars 258 and vertically between the upper and lower portions of the frame 250, formed, respectively, by the perimeter supports 254 and the ribs 256, is substantially vacant to accommodate other components of the system 1000 therein when the system 1000 is in an assembled state. As such, in the embodiment shown, the system 1000 operates without a center rotary axle, the bins 300 instead rotating around a static frame 250 within the vault 200 of the system 1000. Stated somewhat differently, the platters 210 are rotatable about a central axis of the frame 250, but the platters 210 are not actually connected to the central axis about which they rotate.

The frame 250 has ribs 256 at the upper and lower vertical surfaces of the frame 250. The ribs 256 extend radially away from a central hub to interconnect a plurality of perimeter supports 254 that, together, form generally hexagonally-shaped upper and lower surfaces of the frame 250. The shape of the upper and lower surfaces of the frame 250 generally correspond to the shape (e.g., the outer contour and/or cross-section) of the vault 200, so an octagonally-shaped vault 200 may have, for example, octagonally-shaped upper and lower portions of the frame 250. These generally hexagonally-shaped upper and lower surfaces of the frame 250 are vertically connected together by a plurality of inner vertical struts 252, which can be arranged about and/or at the outer perimeter of the frame 250 and/or radially at a position spaced apart from the outer perimeter of the frame 250, which are connected by struts to a plurality of longitudinal ribs that extend vertically from a base to at least a height of the upper central portions.

The polygonal (e.g., hexagonal, in the embodiment shown) cross-sectional shape of the vault 200 is advantageous, in that it allows for a plurality of generally circular-shaped platters to be arranged vertically therein, with the sides of the polygon both approximating the contours of the platters within the vault 200 and also providing a suitable number of substantially planar sides to which various sub-systems (e.g., 100, 700, 800, 900, 1100, 1200, 1300, 1400) or cover panels 201 can be provided, thereby fully enclosing the interior of the vault 200 and securing the contents stored therein on the platters 210. The substantially circular shape of the outer perimeter of the platters 210 is advantageous in that this shape allows for a maximum density of storage bins 300 to be arranged thereon while also minimizing the required diameter of the external enclosure of the vault 200 to allow the platters 210 to rotate about a longitudinal axis of the vault 200, which is substantially coaxial to the height direction of the vault 200. The inner-workings of the vault 200 will be discussed further hereinbelow regarding the illustrations thereof in FIGS. 1-20.

As configured with one or more subsystems (e.g., 100, 700, 800, 900, 1100, 1200, 1300, 1400) and/or cover panels 201 attached thereto, the vault 200 comprises a substantially solid and/or enclosed exterior surface about the external perimeter surface thereof. In some embodiments, one or more translucent window sections can be provided in this outer wall (e.g., in a cover panel 201) to allow for viewing the internal structures within the vault 200. In some such embodiments, the window sections can have a same contour as that of the outer wall, such that the shape of the outer wall of the vault 200 is not substantially altered by the window section. In some other such embodiments, the window sections can have a substantially flat viewing area that is either recessed within, at least partially, the outer wall, and/or may protrude from, at least partially, the outer wall of the vault. In some embodiments, such as those where the cover panels 201 have a generally planar profile, the window sections can be coplanar with the external surface of the cover panels 201.

The outer corners and/or vertices where the perimeter supports 254 intersect in the upper and lower portions of the frame 250 are, in the embodiment shown, substantially vertically coaxially aligned (e.g., in the direction parallel to the longitudinal axis of the vault 200). Such vertically aligned corners and/or vertices are connected together by one of a plurality of outer vertical door latch bars 258 attached between vertically aligned corners and/or vertices of the upper and lower portions of the frame 250. In the embodiment shown, the inner vertical struts 252 are radially spaced apart from (e.g., in a radially inward direction) the outer vertical door latch bars 258, defining a platter channel radially therebetween, in which a plurality of platters 210 are vertically arranged and/or supported thereby.

In the embodiment shown, each of the outer vertical door latch bars 258 is offset from a corresponding one of the inner vertical struts 252 in the angular, or circumferential, direction of the vault 200, such that a plane through the longitudinal axis of the vault 200 would not pass through both an inner vertical strut 252 and an outer vertical door latch bars 258. This arrangement is advantageous because it allows for a first portion of the mass and/or weight of each platter 210 to be supported by a corresponding platter support ring 268 that can be supported by either the inner vertical struts 252 and/or the outer vertical door latch bars 258, with a second portion of the mass and/or weight of the platters 210 being supported by the inner vertical struts 252. As such, in the embodiment shown, each platter 210 is supported, at least partially, by a corresponding platter support ring 268. This arrangement is further advantageous in that it permits the points at which the platter support ring 268 is connected to the frame 250 to be staggered in the angular, or circumferential, direction from the points at which the platters 210 are connected (e.g., directly and/or via one or more rollers) to the inner vertical struts 252, thereby providing additional structural rigidity to the platters 210 by staggering the support points in the angular, or circumferential, direction. Furthermore, this angularly staggered region of the inner vertical struts 252 and the outer vertical door latch bars 258 allows for the outer vertical door latch bars 258 to be spaced at angular, circumferential, or radial positions of the frame 250 to define the attachment positions where the subsystems can be attached so as to not interfere with, or otherwise prevent proper operation of, for example, the internal components (e.g., elevator system 150 and trolley system 180) of the user terminals 100 attached about the vault 200.

The platter support ring 268 noted herein is provided at a position radially outward from the radial position where the vertical rollers 216 are connected to the inner vertical struts 252. In the embodiment shown, the platter support ring 268 is connected to, and supported by, six radially positioned brackets that are secured (e.g., bolted) to the inner vertical struts 252. Each platter support ring 268 is, in the example embodiment shown, a substantially continuous and/or uninterrupted ring structure on which a corresponding one of the platters 210 is vertically supported to prevent excessive vertical deflection of the platters 210 at positions thereof that are radially outwardly positioned from the vertical rollers 216. The platters 210 have bearings 234 (e.g., roller bearings or any other suitable type of rotatable element capable of providing relative motion of each platter 210 over a corresponding one of the platter support rings 268) positioned at a same radial position at which the platter support ring 268 is arranged, such that the bearings 234 rest on and rollably engage with the platter support ring 268 to provide vertical support to the platters 210 to prevent undesired vertical deflections thereof. In the embodiment shown, the bearings 234 are spaced circumferentially about the platters 210 to be positioned between every other storage bin 300, however any suitable number and position of bearings 234 may be selected based on the number of storage bins 300 and the maximum weight that can be supported by each storage bin 300. In some embodiments, the platter support ring 268 can be of a segmented construction having individual ring segments that engage with each other (e.g., concentrically passing within, in some cases to lockingly engage with each other) to form the substantially continuous and uninterrupted platter support ring 268. The platter support rings 268 can be connected to (e.g., by radially-oriented arms) the inner vertical struts 252 and/or the outer vertical door latch bars 258. In embodiments where the platter support ring 268 is connected to, and supported by, both the inner vertical struts 252 and the outer vertical door latch bars 258, the angular positions at which the platter support ring 268 is connected to each inner vertical strut 252 can be angularly and/or circumferentially staggered and/or offset from the angular position at which the platter support ring 268 is connected to each outer vertical door latch bars 258. It should be noted that the outer vertical door latch bars 258 can be omitted in some embodiments where, for example, no subsystems are to be attached to the vault 200.

The platters 210 are assembled from a plurality of platter segments (e.g., 210A-D) that are joined together (e.g., by mechanical retention features molded into the platter segments and/or threadable fasteners that fixedly engage with and secure adjacent platter segments together) at respective platter seams, such that the platters can be installed between the vertical rollers 216 without requiring the removal of the vertical rollers 216 from the inner vertical struts 252 for installation of the platters 210 within the vault 200. The platters 210 are rotatably connected to the inner vertical struts 252 of the frame 250 and are vertically supported at each vertical support strut 252 by a corresponding vertical roller 216 on which the platter 210 is supported at an inner radial support channel 214. In some embodiments, each platter 210 is held (e.g., rollably clamped) between pairs substantially vertically aligned vertical rollers 216 in the form of wheels attached to the inner vertical struts 252 of the frame 250. The vertical rollers 216 thereby provide a first support surface by which the platters 210 are connected to, and vertically supported by, the inner vertical struts 252.

In some embodiments, the inner radial support channel 214 may be provided with a high-friction material on one or more side thereof, including, for example, rubber, silicone, and the like. In some other embodiments, either in addition to or in lieu of the high-friction material, a friction-increasing surface treatment may be applied over at least a portion of the inner radial support channel 214; examples of such friction-increasing surface treatments include knurling, slotting (e.g., to create a washboard-like surface), hatching, and the like. In some embodiments, one or more of the vertical rollers 216 can be a driven roller, which is configured to interface with the inner radial support channel 214 of the platter 210 (e.g., in the form of a rack-and-pinion arrangement) in order to substantially eliminate slippage between the platter and the vertical rollers 216 to ensure radial positional fidelity of the platters 210 within the vault 200 and, in some embodiments, allow for the omission of a position detection system, since the angular position of each platter 210 within the vault 200 will be fixed as a function of the number of rotations of the vertical rollers 216 and/or of the drive motor 240. By knowing the number of rotations of the vertical rollers 216 and/or of the drive motor 240, as well as the effective diameter(s) thereof, the angular position of the platter 210 can be calculated continuously on a real-time basis.

The radial position of each of the platters 210 is maintained in a position spaced apart substantially uniformly from the inner vertical struts 252 by a plurality of horizontal rollers 218 that are each respectively mounted to a corresponding one of the inner vertical struts 252. The horizontal rollers 218 engage against an inner edge 212 of one of the platters 210 and are positioned about the inner vertical struts 252 to define a substantially circular contact surface that prevents any eccentricities of the platter 210, whether caused by the shape or movement of the platter 210, as it rotates about the frame 250 that would cause the platter to otherwise make contact with one or more of the inner vertical struts 252 and/or for the platter 210 to become disengaged from the one or more vertical rollers 216.

For each platter, at least one drive motor 242 is rigidly attached to one of the inner vertical struts 252 of the frame 250, such that each at least one drive motor 242 is statically positioned within the vault 200. The platter 210 has a plurality of geared teeth that are oriented to face radially inwards to define an inner radial gear 220. The drive motor 242 comprises a plurality of complementarily-shaped gear teeth in the form of a pinion gear, such that the engagement of the drive motor 242 with the inner radial gear 220 is in the form of a rack-and-pinion interface. Since the drive motors 242 remain stationary during operation, this advantageously precludes any tangling or twisting of wiring (e.g., about a central axis). Each drive motor 242 is capable of rotating a corresponding one of the platters 210 either clockwise or counterclockwise, depending on the direction of rotation of the platter 210 being rotated. The geared interface between each drive motor 242 and the inner radial gear 220 of a corresponding one of each of the platters 210 is therefore capable of providing precise positional control without allowing the platter 210 to slip relative to the drive motor 242. A positional encoder (e.g., a rotary positional encoder) is provided, for example, in the drive motor 242. In some embodiments, the drive motor 242 is a stepper motor that is configured to turn by a predetermined number of steps, or parts thereof, upon receiving a command. In some embodiments, the drive motor 242 turns in whole steps.

In some embodiments, a post (e.g., a vertically-oriented post) is provided on each platter 210 in a position such that, when the post passes through, by, adjacent to, etc. a sensor (e.g., a non-contact sensor), the precise angular position of the platter 210 within the vault 200 can be determined. The position where the post is detected by the sensor can be defined as the home position of the platter 210. The home positions for the elevator systems 150, trolley systems 180, doors 110, 710, and the like are determined by monitoring a current consumption used during the movement thereof. Accordingly, to positionally register these devices in a "home" position, it is advantageous to drive these devices against a stop, monitor for a current spike or increase, such that the device is in the home position when the current spike is detected.

Since each platter 210 has at least one drive motor 242 associated and/or engaged therewith, each of the platters 210 is capable of rotary movement about the frame 250 independent of the movement of any of the other platters 210 within the system 1000. As such, each of the platters 210 is movable about the frame 250 independent of the other platters 210 within the vault 200. In some embodiments, the geared interface between the platters 210 and the corresponding drive motor 242 can be replaced with a substantially flat surface having a high-friction material coated on at least an outer circumference thereof to prevent and/or minimize an amount of slippage between the platter 210 and the drive motor 242. In some embodiments, a plurality of drive motors 242 can be provided, which can be arranged on the same or different inner vertical struts 252 of the frame 250. In such embodiments having a high-friction material interface, the contact surface between the platter 210 and the drive motor 242 can be in a substantially horizontal plane, a substantially vertical plane, an inclined plane, or any other suitable interface surface. In the embodiment shown, seven (7) platters 210 are provided for the system 1000 to form the seven (7) arrays of storage bins 300 described elsewhere herein.

In the example embodiment shown, each platter 210 has a plurality of bin slots 226, advantageously one for each storage bin 300, arranged about an outer perimeter of each platter 210, advantageously in a uniform spacing about the perimeter thereof so that the storage bins 300 are spaced substantially uniformly about the platter 210 in the circumferential direction. The bin slots 226 are circumferentially spaced apart from each other by a dimension larger than a width of the storage bins 300 to ensure that the storage bins 300 are physically separated from each other and held in a fixed position on the platter 210. In some embodiments, bin slot dividers may be provided between one or more adjacent bin slots 226 to physically separate (e.g., as a barrier) adjacent storage bins 300 from each other. In such embodiments, the bin slot dividers may be arranged circumferentially about the platter 210 and terminate between the inner edge 212 of the platter 210 (e.g., radially outward from the surface on which the inner radial gear 220 is formed) to define a gap over which the vertical roller(s) 216 pass through as the platter 210 is rotated about the frame 250 by the drive motor 242. As noted elsewhere herein, one or more of the platters 210 within the vault can be refrigerated/chilled to maintain a lower temperature for the items stored thereon than for the items stored on other platters 210 within the same vault 200.

The bin slots 226 extend radially inwards from the outer perimeter of the platter 210. The storage bins 300 have, on the bottom surface thereof, a track 330 that is connected to, and spaced apart from the bottom 320 of the storage bin 300 by, a connecting rib 332. As such, the bottom 320, the rib 332, and the track 300 form a generally I-shaped cross-sectional profile. The rib 332 is arranged along the length of the storage bin 300 (e.g., in the direction from the back 306 to the front 308) and has a height corresponding to at least a thickness of the platter 210, such that the track 330 extends underneath the platter 210 in the manner of opposing flanges to vertically secure the storage bin 300 to the platter 210 when the rib 332 and, accordingly, the storage bin 300 are engaged within one of the bin slots 226 of the platter 210. In some embodiments, the bin slot 226 may have a thickness (e.g., measured in the vertical direction) that is less than a thickness of the entire platter 210, allowing for the height of the rib 232 to be less than a height of the entire platter 210. Such an arrangement is further advantageous because it is then possible for the track 330 to pass between the retaining flanges 227 of the bin slot 226 and the platter support ring 268, thereby allowing the platter support ring 268 to be positioned further radially outwardly (e.g., at a radial position greater than half of a length of a storage bin 300) underneath the platter 210 and storage bins 300. The bin slots 226 advantageously have a widened portion at the outer perimeter of the platter 210 to account for minor misalignments between the platter 210 and the storage bin 300.

The inner perimeter formed by the inner vertical struts 252 of the frame 250 is surrounded by a plurality of circularly arranged storage bins 300, which are engaged with, and supported by, the platters 210. In this example embodiment, the storage bins 300 have an inner edge (e.g., a back edge 306, which is nearest the inner support struts 252) that is taller than an outer circumferential edge (e.g., a front edge 308), with the sides 310 extending therebetween and forming an opening above the front edge 308 to allow objects to be placed in and/or retrieved from the storage bins 300. In some embodiments, the sides 310 can taper between the back edge 306 and the front edge 308, such that the front edge 308 is wider than the back edge 306. In some embodiments, the storage bins 300 have a substantially open top surface. In some other embodiments, the storage bins 300 have a partially or entirely closed top surface. As shown, there are seven (7) radially arranged arrays of storage bins 300 in a vertically stacked arrangement. Each of the radially arranged arrays of storage bins 300 is attached to, and supported by, one of the platters 210 supported by the frame 250.

The storage bins 300 and platter segments can be formed from any suitable material, including, for example, plastic, composite, and/or metallic materials. The storage bins 300 and platter segments can be formed using any suitable manufacturing technique, including casting, milling, stamping, injection molding, additive manufacturing, and the like. In some examples, the storage bins 300 and platter segments may be injection molded from a plastic material. In other embodiments, storage bins 300 and platter segments may comprise a plastic, composite, metallic, and/or ferromagnetic material. In some embodiments, each storage bin 300 has a unique identifier (e.g., a barcode, QR code, NFC chip, RFID chip, etc.) formed or attached thereon. This unique identifier is associated with only that particular storage bin 300. In some such embodiments, this unique identifier is scanned (e.g., by imaging device 172) each and/or every time that an item is transported to the opening 112, 712 of a user terminal 100 or an RRS terminal 700, thereby positively identifying the storage bin 300 as or prior to the items being removed from, or deposited in, the storage bins 300.

In some embodiments, at least one assembly tab is provided on at least one edge of the platter sections for assembly with adjacent platter sections. Ribs and other stiffening members can be formed in the top and/or bottom surfaces of the platter segments to provide enhanced structural rigidity. A plurality of holes 232 are formed through the thickness of the platters 210 to reduce a mass thereof without compromising structural rigidity of the platters 210 beyond a design threshold, thereby allowing for the use of smaller motors due to the reduced moments of inertia and/or rotation in such platters 210 having holes 232 formed therein.

In some embodiments, as shown at least in FIGS. 10 and 29-31, the storage bins 300 can be retained and/or locked in place on the platter 210 by a locking feature (e.g., bump 336 formed in at a radially internal end of the rib 332). The bin slots 226 comprise, at a radially inner portion thereof, a bin tab 228 that comprises a pair of opposing retaining members that engage about the bump 336, which can be in the form of a post, protuberance, or other feature that can be removably retained within the bin tab 228. The bin tab 228 comprises opposing pincers that are spaced apart and capable of elastic deformation to allow the bump 336 to move between the bin tab 228, while still providing a retention force to prevent the storage bin 300 from being dislodged from the platter 210 during, for example, transit or normal operation of the system 1000. Thus, a force may be imparted (e.g., by the trolley system 180 of a user terminal 100) to the storage bin 300 that is of a sufficient magnitude to overcome the force necessary to elastically spread apart the pincers of the bin tab 228 to allow for the bump 336 of a storage bin 300 to be engaged in, or removed from, the bin tab 228, depending on whether the storage bin 300 is being placed on, or removed from, the platter 210 by the system 1000. In the embodiment shown, the bump 336 has substantially a same perimeter shape as an inner perimeter shape of the bin tabs 228.

A surface is provided on the front surface of the bin, on which an optically-scannable code can be affixed. In some embodiments, a wireless transmitter can be embedded within this surface, or within any other suitable portion of the bin. This code and/or wireless transmitter can allow for enhanced inventory analysis of the vault if any data integrity issues arise that causes the locations of one or more bins within the vault to become corrupted and/or unknown (e.g., due to a loss of power). Because the contents of each bin can be stored remotely from the vault (e.g., in a cloud storage system), during an inventory analysis the platters can be rotated, the identity of each of the bins can be detected and recorded (e.g., by scanning the code or wireless transmitter) by one or more suitable scanners located within the vault, and the contents of each of the bins (as well as the intended recipient for the contents of each bin) can be determined by the system by cross-referencing the identity of each bin with the data for the contents of each bin that can be stored remotely. Accordingly, the contents of the vault can be inventoried without requiring removal of the contents of the vault, thereby dramatically increasing operational recovery time of the system upon a system error.

During insertion of the storage bin 300 from the platter, the platter 210 is rotated to a position such that the rib 332 of the storage bin 300 is aligned (e.g., radially) with the bin slot 226. The trolley system 180 then extends in the radial direction towards the platter.

Due to the presence of the multiple user terminals 100, multiple platters 210, and multiple storage bins 300 arranged on or about each of the multiple platters 210, the system 1000 disclosed herein is capable of redundant operation. For example, if a drive motor 242 fails, the storage bins 300 stored on the other platters 210 remain accessible for retrieval by the user terminals 100. Similarly, if an elevator system 150 of one of a plurality of user terminals 100 fails, the other user terminal(s) 100 remain operational. This redundancy reduces downtime for the system 1000.

FIG. 7 shows a top plan view of an example embodiment of a plurality of storage bins 300 arranged on a platter 210. Each of the plurality of storage bins 300 are arranged at regular intervals radially about the center of the platter 210, each storage bin 300 being offset by an angle (e.g., 8) from an adjacent storage bin 300. In the embodiment shown, the storage bins 300 have a substantially rectangular footprint (e.g., as defined by bottom 320). In some embodiments, the storage bins 320 can have a profile that tapers in the radially inward direction, such that the back (e.g., 306) is narrower than the front (e.g., 308). Smaller (e.g., narrower) storage bins 300 may be used to increase a storage density within the vault 200, when it is anticipated that the items to be stored therein will be of a certain size. Additionally, storage bins 300 on one or more of the platters 210 may have a different size from storage bins 300 stored on a different platter 210. In some embodiments, because the position of each of the storage bins 300 can be monitored by the system 1000 (e.g., by a controller of an inventory tracking system), storage bins 300 on a same platter 210 may have different dimensions from each other (e.g., by assembling platter segments having different spacings between adjacent bin slots 226). Using the positional calibration method, the system 1000 can automatically detect a spacing between adjacent bin slots 226 when platter segments having different pitches between adjacent bin slots 226 are assembled into a same platter or, in some embodiments, when a platter segment or entire platter 210 is replaced with a platter segment or other platter having a different pitch between adjacent bin slots 226. The differently sized storage bins 300 on a same platter 210 may be interspersed amongst each other or, in some embodiments, may be segregated from each other, so that at least a first continuous portion of a first platter 210 has storage bins 300 of a same first size, while at least a second continuous portion of the first platter 210 has storage bins 300 of a same second size, which can be the larger and/or smaller in one or more dimensional directions (e.g., height, length, width, etc.).

Referring to FIGS. 14-16, further aspects of an example embodiment of the user terminal 100 are shown therein. The user terminal 100 has an outer shell 102 that is mounted to an external surface of the vault 200 by hinges 104, such that the user terminal 100 can pivot about the hinge 104 to reveal the interior of the vault 200 during assembly, maintenance, troubleshooting, and the like. During normal operation, the user terminal 100 is secured to the vault 200 and cannot be opened to access the interior of the vault 200. A shelf 114 is provided on an external surface of the outer shell 102 of the user terminal 100. The user terminal 100 comprises one or more user interface devices 120, a display 122, an elevator system, generally designated 150, and an outer housing 102 that is rigidly connected (e.g., by a pivoting hinge) to the vault 200 at one of the mounting surfaces of the vault 200. In some embodiments, the display 122 and some aspects of the user interface devices 120 can be combined into a single display screen or unit with touchscreen functionality. In some embodiments, the user interface devices 120 can comprise a wireless communication device (e.g., Bluetooth®, WiFi, RFID, etc.) that can receive an input from a mobile computing device (e.g., a smartphone or a tablet computer) of a user present at the user terminal 100 for identity authentication purposes. As such, the identity of the user can be verified by, for example, scanning an image on the mobile computing device at a user interface device 120 or by positioning the mobile computing device adjacent a user interface device, allowing the user's identity to be authenticated without the user having to physically contact the system 1000, thereby improving hygiene. In some embodiments, one of the one or more user interface devices 120 comprises a barcode reader or an NFC reader configured to read and/or detect information from a badge associated with, and carried on the person of, an authorized user (e.g., a retail employee). For systems 1000 in which higher degrees of recipient identity authentication is needed (e.g., for those systems 1000 intended for prescription medication storage and retrieval), other types of recipient authentication devices (see, e.g., 126) can be provided at one or more of the user terminals 100, including, for example, manual input keypads or keyboards, optical scanners (e.g., for reading bar codes), fingerprint readers, facial recognition imaging devices, retinal scanners, microphones for voice recognition, and the like.

In some embodiments, at least one of the user terminals 100 may be physically separated in an access-restricted location that is accessible, during normal operation of the system 1000, by only authorized users, such as a licensed pharmacist, licensed pharmacy technician, or other authorized retail personnel. Such a restricted-access terminal can be either a user terminal 100, which may be substantially identical to any of the other user terminals 100 of the system 1000, or a rapid retrieval and storage (RRS) terminal 700, without deviating from the scope of the subject matter disclosed herein. The RRS terminal 700 will be discussed further herein regarding FIGS. 17 and 18.

Each user terminal 100 comprises a vertically mobile elevator system 150 that transports a designated one of the plurality of storage bins 300 from one of a plurality of platters 210 arranged within the vault 200 to a door 110 in the exterior of the user terminal 100, where the contents thereof are accessible to a user whose identity has been sufficiently authenticated by the system 1000 to authorize retrieval of the items (e.g., medications) stored in the designated storage bin 300. The elevator system 150 has an elevator shaft 154 that is rigidly attached within the interior of the user terminal 100 in a substantially static position, such that, other than translatory deflections and vibrations, the position of the elevator shaft 154 within the user terminal 100 is fixed. In the embodiment shown, the elevator shaft 154 is oriented substantially vertically (e.g., substantially co-aligned with the gravity vector) within a cavity formed through the height of the user terminal 100. In some other embodiments, the shaft may be inclined with respect to the vertical direction. A trolley system 180 is attached to the elevator shaft 154, such that the vertical position of the trolley system 180 changes as it moves along the length of the elevator shaft 154. The elevator system 150 and the trolley system 180 are capable of accessing any of the platters 210 within the vault 200.

A plurality of storage bins 300 are located on each platter 210. An elevator system 150 is provided within each user terminal 100. The elevator system is located adjacent to, and radially outward from, the platters 210 and each of the plurality of storage bins 300, respectively, as the platter(s) 210 rotate about the frame 250. The elevator system 150 comprises a trolley system 180 that is vertically movable within an interior of the user terminal 100 along an elevator shaft by an elevator motor 152. In the example embodiment shown, the track 330 comprises a geared interface comprising a plurality of teeth 334 and the secondary bin pinion gear 194 comprises a driven rotatable pinion gear having a plurality of teeth that are complimentarily shaped to the teeth 334 of the track 330.

The trolley system 180 comprises a base 182 that is attached to the elevator shaft 154. The base 182 is vertically mobile along the length of the elevator shaft 154, but is otherwise positionally fixed to, and moves in a direction coaxial to the length of, the elevator shaft 154. As such, the base does not move, relative to the elevator shaft 154 in the directions defined by the plane defined by, for example, one of the platters 210, the base 260, one of the platter support rings 268, and the like, this plane being substantially orthogonally oriented relative to the length direction of the elevator shaft 154. The trolley system 180 is moved along the length of the elevator shaft 154 by an elevator motor 152 which drives, based on commands from a controller of the system 1000, the trolley system 180 therealong. An extension platform 190 is displaceably attached to the base 182 and is extendable, relative to the base 182, in the radial direction of the platter 210 between a transport position, in which the extension 190 is entirely spaced radially apart from the platters 210 and/or storage bins 300 stored thereon, and a deployed position, in which the extension 190 is moved towards the platter 210 in the radial direction of the platter 210 to either deposit a storage bin 300 onto a platter 210 or to engage with and retrieve a storage bin 300 from a platter 210.

The trolley system 180 comprises, attached on opposite ends of the base 182 in the direction of movement of the extension platform 190, stop plates 181A, 181B that limit a distance by which the extension platform 190 can move relative to the base 182. A track 184 is connected on a surface of the base 182 adjacent the extension platform 190. A drive motor 188 is rigidly connected to the extension platform 190 and has a drive pinion 186 having teeth that engage with (e.g., mesh with) complementary teeth formed in the track 184. An alignment feature 197 is attached to, or at least associated with, the base 182 and extends in a direction substantially parallel to the direction in which the extension platform 190 moves, relative to the base between the retracted position and the deployed position, along the track 184. In the embodiment shown, the alignment feature 197 has two rods that are arranged substantially in parallel to each other in the radial direction of the platters 210. An extension base plate 193 comprises holes through which the alignment feature 197 passes to ensure that the extension platform 190 remains properly aligned (e.g., in the radial direction of the platters 210 and/or along the track 184. As the drive pinion 186 is rotated by the drive motor 188, the extension platform 190 moves in the direction of rotation of the drive pinion 186 relative to the track 184 between the stop plates 181A, 181B.

The extension platform 190 comprises a slot 192 through an upper surface thereof. In the embodiment shown, the slot 192 passes along substantially the entire length of the extension platform 190 (e.g., in the radial direction of the platters 210), thereby essentially bifurcating the extension platform 190. The outer stop plate 181B comprises a tab that is aligned with the slot 192 to stop a movement of a storage bin 300 along the slot 192. A bin motor 196 is connected to the extension platform 190 and extends through a side thereof to drive a rotary motion of the primary bin pinion gear 195, which comprises a plurality of gear teeth that engage with (e.g., mesh with) gear teeth on a secondary bin pinion gear 194, which is rotatably attached on a shaft between sides of the extension platform 190 in the form of an idler gear. The bin motor 196 drives a rotary movement of the primary bin pinion gear 195 in either a clockwise or counterclockwise direction, which causes a corresponding rotary motion of the secondary bin pinion gear 194. In the embodiment shown, neither the primary bin pinion gear 195 or the secondary bin pinion gear 194 are in contact with the track 184. The secondary bin pinion gear is positioned underneath the slot 192 at a radially inward position on the extension platform. As such, when the extension platform 190 is moved to the extended position, the secondary bin pinion gear 194 is adjacent to, in contact with, and/or in a position to engage (e.g., mesh) with the teeth 334 of the track 330 of the storage bin 300 positioned adjacent (e.g., radially inwardly from) the extension platform 190.

Once a transaction has been completed (e.g., when a designated period of time has elapsed, the user is no longer detected at the user terminal 100, and/or the user terminates the session), the trolley system 180 then moves to a designated height corresponding to the platter 210 onto which the storage bin 300 is to be deposited. The extension 190, as well as the storage bin 300 retained thereon, is then moved, relative to the base 182, from the transport position to the deployed position and the pinion gear is rotated in a direction such that the storage bin 300 is driven off of the extension 190 and onto the designated platter 210. The location (e.g., the location of the platter 210 and the bin slot 226 on the platter 210) at which the storage bin 300 is deposited is recorded by the system 1000 (e.g., at a controller and/or in a database) for inventory control and tracking purposes. In some embodiments, all items that are stored within the vault 200 are scanned electronically by the system 1000 (e.g., via a barcode scanner or other suitable scanning device, for example, as described elsewhere herein) such that the location of each item can be precisely tracked within the vault 200 during operation of the system 1000.

To retrieve a storage bin 300 from a designated position within the vault 200, the extension platform 190 is moved into the deployed position, the drive motor 188 is energized to rotate the drive pinion 186 along the track and move the extension platform 190 into the deployed position, the bin motor 196 is energized to turn the primary bin pinion gear 195, the secondary bin pinion gear 194 engages with the teeth 334 of the track 330 and spins in a corresponding direction to draw the storage bin 300 onto and/or over the extension platform 190, such that the rib 332 passes along the length of the slot 192, with the bottom 320 of the storage bin 300 being on an opposite side of the extension platform 190 from the track 330 of the storage bin 300, thereby captively securing the storage bin 300 to the extension platform 190. While the secondary bin pinion gear 194 spins, the storage bin 300 is drawn over the extension platform 190.

In some embodiments, the bin motor 196 is energized for a specified window of time during the transfer of the storage bin 300 onto the extension platform 190. In some other embodiments, a position sensor is provided adjacent the tab of the outer stop plate 181B to detect when the storage bin 300 is sufficiently engaged with the extension platform 190 and/or entirely disengaged from the platter 210 from which the storage bin 300 was removed, at which point a signal is transmitted (e.g., from a controller, based on a signal from the position sensor) to de-energize the bin motor 196. In some other embodiments, the current (i) consumed by the bin motor 196 can be monitored (e.g., by a current sensor) and the bin motor 196 can be de-energized upon the occurrence of a current spike, corresponding to the storage bin 300 being driven in contact with the tab of the outer stop plate 181B and being incapable of being driven further in that direction. In such embodiments, the output from the current sensor can be filtered and/or processed requiring the current measured to be above a threshold, whether instantaneously or for a predetermined amount of time.

When the secondary bin pinion gear 194 is engaged with and moving the storage bin 300 onto the extension platform 190, the extension platform 190 can be moved along the base 182 to the transport position, such that the storage bin 300 on the extension platform 190 can be moved along the elevator shaft 154 to be accessible through the door 110 at the user terminal 100. In some embodiments, the extension platform 190 does not move (e.g., remains stationary) while the storage bin 300 is being moved onto or off of the extension platform 190 (e.g., while the secondary bin pinion gear 194 is in motion and/or while the bin motor 196 is energized). In some embodiments, the extension platform 190 moves along the base 182 (e.g., to the transport position or the deployed position) at a same time as the storage bin 300 is drawn onto the extension platform 190 by the rotation of the secondary bin pinion gear 194.

The process to deposit a storage bin 300 onto a platter 210 at a designated location is generally the reverse of that described hereinabove. Specifically, trolley system 180 moves along the elevator shaft 154 to a height at which a designated platter 210 is located within the vault 200. When at the designated height, the drive motor 188 is energized to rotate the drive pinion 186 along the track and move the extension platform 190 into the deployed position, the bin motor 196 is energized to turn the primary bin pinion gear 195, the secondary bin pinion gear 194 engages with the teeth 334 of the track 330 and spins in a corresponding direction to eject (e.g., move in a radial inward direction of the platter 210) the storage bin 300 onto and/or over the platter 210, such that the rib 332 passes along the length of the bin slot 226 of the platter 210, with the bottom 320 of the storage bin 300 being on an opposite side of the platter 210 from the track 330 of the storage bin 300, thereby captively securing the storage bin 300 to the platter 210. While the secondary bin pinion gear 194 spins, the storage bin 300 is ejected from the extension platform 190. As the storage bin 300 is transferred radially into the platter 210, the bump 336 of the storage bin 300 passes through the bin tabs 228 at the radially inner end of the bin slot 226.

In some embodiments, the bin motor 196 is energized for a specified window of time during the transfer of the storage bin 300 onto the platter 210. In some other embodiments, a position sensor is provided adjacent the bin tabs 228 of the platter 210 to detect when the storage bin 300 is sufficiently engaged with the platter 210 and/or entirely disengaged from the extension platform 190 from which the storage bin 300 was removed, at which point a signal is transmitted (e.g., from a controller, based on a signal from the position sensor) to de-energize the bin motor 196. In some other embodiments, the current (i) consumed by the bin motor 196 can be monitored (e.g., by a current sensor) and the bin motor 196 can be de-energized upon the occurrence of a current spike, corresponding to the bump 336 of the storage bin 300 being driven in contact with the bin tabs 228 and/or the radially inner surface of the bin slot 226, such that the storage bin 300 is incapable of being driven further in that direction. In such embodiments, the output from the current sensor can be filtered and/or processed requiring the current measured to be above a threshold, whether instantaneously or for a predetermined amount of time.

When the secondary bin pinion gear 194 is engaged with and moving the storage bin 300 off of the extension platform 190, the extension platform 190 can be moved along the base 182 to the deployed position, such that the storage bin 300 on the extension platform 190 can be transferred onto the platter 210 while the extension platform 190 extends towards the platter 210. In some embodiments, the extension platform 190 does not move (e.g., remains stationary) while the storage bin 300 is being moved onto or off of the extension platform 190 (e.g., while the secondary bin pinion gear 194 is in motion and/or while the bin motor 196 is energized). In some embodiments, the extension platform 190 moves along the base 182 (e.g., to the transport position or the deployed position) at a same time as the storage bin 300 is ejected from the extension platform 190 by the rotation of the secondary bin pinion gear 194.

In the embodiment shown in FIGS. 15-19, the user terminal 100 is configured such that the elevator system 150 and the display 122, as well as any user interface devices 120 and other assorted controllers and computing equipment, are arranged laterally beside each other, thereby obviating the need for a further actuator mechanism to transfer the storage bin 300 from the elevator system 150 to the door 110. In such embodiments, the storage bin 300 being accessed by the user at the user terminal 300 does not extend beyond the boundaries of the movement path of the trolley system 180 vertically along the elevator shaft 154 within the user terminal 100. As such, the depth of the user terminal 100 and the overall footprint of the system 1000 can be further reduced.

In some embodiments, a shroud 158 may be provided over at least a portion of the vertically mobile components of the elevator system 150, moving vertically along with the trolley system 180 as the trolley system 180 moves to vertically transport storage bins 300 between the platters 210 and the door 110 of the user terminal 100. This shroud 158 may be of a sufficiently robust design and be dimensioned so as to prevent unauthorized access to items stored in other storage bins 300 adjacent to the door 110 that might otherwise be possible by, for example, a user manually reaching through the door 110 beyond the designated storage bin 300 to illicitly retrieve other items within manual reach of the user within the vault 200. As such, the shroud 158 may have a size, allowing for manufacturing and installation tolerances, that is substantially the same size as the radially inner wall of the storage bins 300. Thus, since the storage bin 300 is positively engaged with the guide feature(s) and the secondary bin pinion gear 194 of the extension platform 190 to prevent a positional disturbance of the storage bin 300, such a shroud 158 would be configured to prevent unauthorized access to other storage bins 300 within the vault 200 by those who are retrieving another item from a designated storage bin 300.

When a user is identified, the location of the storage bin associated with the user's order is determined and the trolley system 180 is moved along the elevator shaft 154 to be at substantially the same height as the platter 210 on which the storage bin 300 containing the items designated for retrieval by the user at the user terminal 100 is located. Before, while, or after the trolley system 180 moves vertically along the elevator shaft 154 to attain the same height as the designated platter 210, the platter 210 on which the designated storage bin 300 is located is rotated such that the designated storage bin 300 is substantially centered on, and aligned with, the extension platform 190 of the trolley system 180. The extension platform 190 is then extended, relative to the base 182, from the transport position to the deployed position. The designated storage bin 300 is then engaged (e.g., by the teeth 334 of the track 330) by the secondary bin pinion gear 194 of the extension platform 190. When actuated, the secondary bin pinion gear 194 of the extension platform 190 moves the designated storage bin 300 from the platter 210 onto the extension platform 190, which can have guidance and alignment features (e.g., 197) formed in or attached thereto. The extension platform 190 then moves from the deployed position to the transport position and the trolley system 180, with the storage bin 300 positioned thereon and/or attached thereto, moves along the length of the elevator shaft 154 to be vertically aligned with the door 110 of the user terminal 100. Once the storage bin 300 is aligned with the door 110, the door is opened so that the contents within the designated storage bin 300 are accessible by the user at the user terminal 100 through the door 110. Since the storage bin is positively retained (e.g., within slot 192 formed on an upper surface of the extension platform 190, about which the track 330 of the storage bin 300 is engaged) on the extension platform 190 when the door 110 of the user terminal 100 is opened, the storage bin 300 is prevented from being removed through the door 110. In some embodiments, the door 110 may be smaller in one or more dimensions than the outer dimensions of the storage bin 300.

A method of dynamically aligning, in an automated manner, the trolley system 180 of one or more of (e.g., each of) the user terminals 100, to the platter 210 in the horizontal direction (e.g., in the direction tangent to the outer perimeter of the platter 210 adjacent the elevator system 150) and vertical directions using an imaging device 172 (e.g., a camera) is provided. There may be variation in the relative locations of the trolley system 180 and the platter 210 due to, for example, manufacturing tolerances. These tolerances are what the method is provided to provide a suitable positional correction. In some embodiments, there are marks on the platter support ring 268, platter 210, and/or storage bin 300 that are of a precise dimension, such that they can be used for distance calibration and positional accuracy between the trolley system 180 and the storage bin 300 and/or the platter 210. In some embodiments, the location of the imaging device 172 to the slot formed in the trolley system 180 and/or in the platter 210 is precise in the horizontal direction by approximately 0.5 millimeters (mm). In some embodiments, the location of the mounting bolt by which the platter support ring 268 is connected to the frame 250 (e.g., on the platter side) is precise in the horizontal direction by approximately 0.5 mm. In some embodiments, guide bumps may be formed on the platters 210 to ensure the position of the storage bin 300 relative to the platter 210 in the circumferential direction does not vary by more than approximately 0.5 mm when seated.

Positional encoders may be provided on the frame 250 and/or one or more of (e.g., all of) the platters 210 to determine a rotary position of the platter 210 within the system 1000. While the positional encoders can be any substantially positionally fixed fiducial marking and can be detected by any suitable mechanism, including, for example, static images detected by one or more imaging devices, magnets detected by one or more magnetic sensors, and the like, in the example embodiment shown, a plurality of (e.g., two) alignment slots 236 are formed in a repeatable pattern (e.g., having one set of slots 236 for or associated with each storage bin 300) about the outer perimeter of the platters 210 in a position that is visible to the imaging device 172 within or associated with, for example, the user terminal 100 and/or the RRS terminal 700.

The method may be initiated at any storage bin location on any platter 210. The platter 210 being positionally calibrated is stopped and the imaging device 172 captures an image having a known pixel density value, measured in pixels per inch (PPI), and calculates a number of pixels between the fiducials (e.g., alignment slots 236) in the captured image. In some embodiments, the image number of pixels between the fiducials may be too large or too small, in which case the platter 210 is rotated by some distance corresponding to a ratio of the measured number of pixels and the correct number of pixels, and a second image is captured. This second image is analyzed to determine the number of pixels between the fiducials. If the correct number of pixels is detected, the calibration method terminates. If the incorrect number of pixels is detected, the process is repeated by iteratively rotating the platter relative to the imaging device 172 until the correct number of pixels is measured, then the calibration method is terminated.

In some embodiments, the mounting bolt, which connects the platter support ring 268 to the bracket that connects the platter support ring 268 to the inner vertical strut 252, in the image is identified and the horizontal distance (e.g., in the X-Y plane that is coplanar to the plane defined by the platter 210) is calculated from a fixed reference in the image. These values are then entered into an offset table for the trolley system 180 at that location (e.g., including the user terminal 100 location, platter 210, and storage bin 300). The horizontal (e.g., X-Y) position of the storage bin 300 relative to the mounting bolt is also determined and/or calculated. These positional values are then added to the distance calculated from the fixed reference in the image to obtain the final offset values. In some embodiments, the angular and vertical distances from the imaging device will be referenced to the mounting bolt. In some embodiments, a vertical post on the trolley system 180 may be used for the fixed reference. It is anticipated that such a positional calibration method may be repeated for all of the storage bin locations will within the vault 200 during manufacture of the system 1000. This calibration method may be performed again after transport and installation of the system 1000 to a final installation location. In some embodiments, the calibration method may also be performed as part of a service call or a certification routine. If, during normal operation, a jam is detected at a particular storage bin location, in which the trolley system 180 cannot properly engage with and/or deposit a designated storage bin 300 on or to a platter 210, this calibration method can be performed automatically, for example, after a fixed number of attempts to engage the storage bin 300 or to deposit the storage bin 300 onto the platter 210.

In some embodiments, the system 1000 is able to determine, monitor, and/or account for backlash between geared interfaces (e.g., between the drive motor 242 and the inner radial gear 200). Due to manufacturing tolerances during assembly, the amount of backlash between geared interfaces may differ between nominally identical systems 1000. In order to detect and account for the backlash unique to each system, each platter 210 is rotated in a first circumferential direction and then stopped. Next, the platter 210 is rotated in a second circumferential direction, opposite the first circumferential direction. While the platter 210 is being monitored in the first and second directions, the torque of the drive motor 242 is monitored and analyzed, with the time between the peaks in the monitored torque values being proportional to the amount of backlash at a particular geared interface. Because of manufacturing tolerances, it is necessary to perform this analysis at each of the geared interfaces within the system 100 (e.g., for each platter 210). With the amount of backlash of each geared interface known, the particular backlash value for the interface between each drive motor 242 and each platter 210 can be programmed into the motion profile of each respective drive motor 242 to improve positional accuracy during normal operation (e.g., between instances of calibration).

As noted elsewhere herein, at least one of the user terminals 100 (e.g., including RRS terminal 700), which can be referred to herein as a "controlled access terminal," can be physically separated from the other user terminals 100, for example, behind a counter, wall, or other physical partition or barrier. Because of the limited-access nature of such a controlled access terminal (e.g., a user terminal 100 or an RRS terminal 700), it is contemplated that different authentication devices could be provided at the controlled access terminal than is utilized at the other user terminal(s) 100. For example, a controlled access terminal may be equipped with a facial scanning device, such as may require prior mapping of a user's facial contours that might otherwise be too time-consuming for typical users (e.g., customers, patients, caregivers, etc.) at the user terminal 100 to successfully register or enroll in, but which might also enable quicker and more secure identity authentication of an authorized user (e.g., pre-registered personnel) by the system 1000. Other examples of such advanced authentication techniques can include, by way of example and not limitation, retinal scanning, voice recognition, gait analysis, and the like. The use of such rapid authentication biometric features would advantageously reduce the amount of time required by retail personnel, who have limited amounts of time to fulfill a given number of orders (e.g., for prescription medications), to operate the system 1000.

Additionally, the system 1000 may be configured to remain logged in while an authorized user are located at the system 1000, but to automatically logout when the system 1000 is no longer capable of authenticating the pharmacy employee via facial recognition. As such, it is envisioned that when the pharmacy employee looks away from the system 1000 for a prolonged period of time (e.g., more than 5, 10, 15, or 30 seconds) or physically moves away from the system 1000, the system 1000 will logout the pharmacy employee automatically, so as to prevent unauthorized access to the system 1000 using the credentials of such an authorized user by unauthorized users. Similarly, a presence sensor can be provided to automatically detect when an authorized user is present at the system 1000 and automatically logout of the session whenever the presence sensor can no longer detect the authorized user at the system 1000. Such a presence sensor should have a refresh time of a short enough duration that it is not possible for an authorized user to move away from the system 1000 and a new user (e.g., an unauthorized user) to move into position at the controlled access terminal to continue the session illicitly. In one embodiment, the presence sensor could be a pressure-sensing mat adjacent the controlled access terminal, on which an authorized user must stand while using the system 1000, such that the authorized user will be logged out when they are no longer physically standing in front of the system 1000.

An example embodiment of an RRS terminal 700 is shown in FIG. 17. The RRS terminal 700 has an outer shell 702 that is mounted to an external surface of the vault 200 by hinges 704, such that the RRS terminal 700 can pivot about the hinge 704 to reveal the interior of the vault 200 during assembly, maintenance, troubleshooting, and the like. During normal operation, the RRS terminal 700 is secured to the vault 200 and cannot be opened to access the interior of the vault 200. A shelf 714 is provided on an external surface of the outer shell 702 of the RRS terminal 700. The RRS terminal 700 comprises a display 722, which in some embodiments is a touchscreen configured to accept user inputs via touching the surface of the display 722. In some embodiments, physical buttons may be arranged around the display 722 to manipulate information and/or input data into the system 1000 at the RRS terminal 700.

The RRS terminal 700 has, protruding from the external surface of the outer shell 702, a user interface device 730, which can be, for example, a wireless communication device (e.g., Bluetooth®, WiFi, RFID, etc.) that can receive an input from a mobile computing device (e.g., a smartphone or a tablet computer) of an authorized user present at the RRS terminal 700. In some such embodiments, the wireless communication device is a near-field communication (NFC) receiver and/or transceiver that can authenticate an authorized user using, for example, a suitable card. The use of NFC technology is merely an example and any suitable near-field communication and/or detection protocol could be implemented. In some embodiments, the user interface device 700 can be one or more of manual input keypads or keyboards, optical scanners (e.g., for reading bar codes), fingerprint readers, facial recognition imaging devices, retinal scanners, microphones for voice recognition, and the like. In some embodiments, it is advantageous for the user interface device 730 to comprise a plurality of user interface devices, at least one of which is a bar code reader, line scanner, QR code (e.g., a barcode having information encoded in two dimensions) scanner, or the like, such that items can be scanned in using a bar code reader, line scanner, or QR code scanner.

The RRS terminal 700 comprises a door 710 which is automatically closed unless an authorized user is authenticated at the RRS terminal and the session has not been terminated, ended, etc. The door 710 can be actuated in any suitable manner, but in the embodiment shown, the door 710 is actuated in the vertical direction by a linkage connected to the bottom edge of the door 710, which may be opaque, translucent, transparent, and made of any suitably durable material. The outer shell 702 has an opening formed therein that the door 710 is configured to block when in the closed position. When the door 710 is in the closed position, the opening 712 is closed and the interior of the vault 200 cannot be accessed through the RRS terminal 700. When the door 710 is in the open position, the opening is not obstructed, blocked, etc. and items within the vault 200 adjacent the RRS terminal 700 can be accessed through the opening. An inventory control device 770 is provided adjacent to (e.g., above) the door 710 in a position such that the movement of one or more items through the opening 712 when the door 710 is in the open position can be detected and the platter 210 can be rotatably advanced such that another vacant storage bin 300 on the platter 210 can be presented to the authorized user through the opening 712 for the authorized user to a further item (or items) into this storage bin 300. In some embodiments, the item(s) are scanned at the user interface device(s) 120 (e.g., a barcode on the item(s) is scanned by a barcode scanner) prior to being loaded in the storage bin 300 through the opening 712. As such, the storage bins 300 do not need to be removed from the RRS platter 210 in order for items to be loaded into a storage bin 300 through the opening 712 at the RRS terminal 700 when the door 710 is in the open position. In some embodiments, the item(s) will be scanned by the authorized user (e.g., at the user interface device(s) 730 and the item(s) will then be deposited directly into the storage bin 300 accessible through the opening 712.

This process of scanning items, loading them into a storage bin 300, and advancing the platter 210 is repeated until all of the items to be loaded by the authorized user at that time are loaded or until there are no vacant storage bins 300 on the platter 210 adjacent to the door 710 of the RRS terminal 700. In order to increase throughput at the RRS terminal 700 by minimizing the number of components that must be moved or manipulated between when items can be loaded into subsequently presented storage bins 300, the RRS terminal 700 does not have an elevator system (e.g., 150). By eliminating the motion of the elevator system 150 and the trolley system 180, only the RRS platter 210 and the door 710 are cycled (e.g., rotated and/or opened/closed, respectively) between when items are deposited into the vault 200. In some embodiments, the cycle time will improve by about a factor of three or more. As such, items can only be loaded onto a single platter 210 within the vault 200 via the RRS terminal 700. This single platter 210 is the platter 210 installed within the vault at a same, or substantially similar, height as the opening 712 such that the contents of storage bins 300 positioned thereon are accessible through the opening 712. This particular platter can be referred to herein as the "RRS platter."

In some embodiments, the capacity of the RRS platter 210 can be augmented artificially. The following examples can be combined in any combination. In some embodiments, the system 1000 may have a set of instructions that specify that all of the storage bins 300 on the RRS platter 210 are to be kept empty, with no storage bins 300 with items stored therein being deposited on the RRS platter 210. As such, an authorized user at the RRS terminal will have an entire platter 210 of empty storage bins 300 into which items can be loaded sequentially within the vault 200, thereby minimizing downtime and increasing throughput of items being loaded into the vault 200 at the RRS terminal 700.

In some embodiments, the elevator systems 150 of the other user terminals 100 can be used to remove storage bins 300 from the RRS platter after they have been filled and to deposit these storage bins onto another platter 210 within the vault 200, with the vacant slot on the RRS platter 210 being filled with an empty storage bin 300 from another platter 210. This allows for the storage bins 300 of the RRS platter 210 to be removed and replaced with empty storage bins 300, thereby artificially augmenting the capacity of storage bins 300 on the RRS platter. In some embodiments, it may be possible for this process to be repeated until all of the storage bins 300 on every platter 210 in the vault 200 is filled. In some embodiments, it may not be possible to relocate storage bins 300 as rapidly as they are loaded at the RRS terminal 700, in which case the RRS platter 210 will eventually reach capacity even if other storage bins 300 within the vault 200 are empty. In some embodiments, each the other user terminals 100 must be idle in order to relocate storage bins 300 from the RRS platter 210. In some embodiments, the storage bins 300 are removed from the RRS platter 210 by a first user terminal 100 and empty storage bins are inserted on the RRS platter 210 by a second user terminal. It can be advantageous for not all of the platters 210 within the vault 200 to have storage bins 300 installed therein to allow for improved manipulation of storage bins 300 within the vault 200, as a user terminal 100 cannot, in some embodiments, remove a storage bin 300 and simultaneously deposit a storage bin from a same bin slot 226 on a same platter 210. In some embodiments where the RRS terminal becomes full, the system 1000 is configured to relocate, using the other user terminals 100 as described elsewhere herein, the occupied storage bins 300 from the RRS platter and, when a sufficient number of occupied storage bins 300 on the RRS platter 210 have been replaced with empty storage bins 300, send a notification (e.g., a push notification or SMS to the authorized user's portable mobile device, emit a sound, send an email, etc.) to the authorized user that the RRS platter is sufficiently vacant to resume loading items within the vault 200.

In some embodiments, the system 1000 is configured to alert a user at the RRS terminal 700 of any storage bins 300 whose contents have not been retrieved for longer than a prescribed time period, so that a notification can be generated and presented to an operator (e.g., a pharmacist or pharmacy technician at the RRS terminal 700) so that the contents thereof can be removed and placed back into inventory or destroyed. In some such embodiments, the storage bins 300 having such expired or returned items designated to be removed from the vault 200 can be loaded onto the RRS platter 210 in a predetermined (e.g., sequential) pattern, such that the authorized user can remove the expired or returned items from these designated storage bins 300 through the opening 712 prior to loading further items into the storage bins 300 on the RRS platter 210 via the opening 712. The inventory control device 770 is thus capable of detecting items both being removed and inserted into the vault 200 via the opening 712. In some embodiments, expired or returned items can be removed from a storage bin 300 and a different item (e.g., for a different customer) can be loaded into the same storage bin 300, such that items are removed from the vault 200 and inducted into the vault 200 in an alternating pattern, therefore necessitating the RRS platter 210 to move only after an expired or returned item has been removed from a storage bin 300 and replaced with a new item for a different customer.

In some such embodiments, the system 1000 may be configured to charge customers a restocking or destruction fee for failure to retrieve the item(s) within a given delivery period of time. In some embodiments, the system 1000 can be configured to have one or more of the platters 210 physically separated within the vault 200 from the other platters 210 such that a temperature of the designated platter 210 can be maintained (e.g., refrigerated) without requiring temperature control of all of the platters 210 within the vault 200. In some embodiments, an inventory control device 170 (e.g., an imaging device or a proximity device) is provided at each user terminal 100 to determine whether the item(s) have been removed from the storage bin 300 using image recognition software, such as by comparing the image recorded by the inventory control device 170 against an image of an empty storage bin 300. In some embodiments, a space optimization algorithm can be implemented so that vacant storage bins 300 are stored consecutively on a same platter 210 at a same level at which the door 710 of the RRS terminal 700 is located. Furthermore, in some embodiments, when an elevator system 150 of even a single user terminal 100 is not being utilized, the system 1000 can be configured to move storage bins 300 to a more optimal location within the system according to the space optimization algorithm.

The power pod, generally designated 800, is shown in FIGS. 19 and 20. The power pod 800 has an outer shell 802 that is mounted to an external surface of the vault 200 by hinges 804, such that the power pod 800 can pivot about the hinge 804 to reveal the interior of the vault 200 during assembly, maintenance, troubleshooting, and the like. During normal operation, the power pod 800 is secured to the vault 200 and cannot be opened to access the interior of the vault 200. One or more shelves (e.g., 450) can be provided on an external surface of the outer shell 802 of the power pod 800 for the display of items that may be of interest to users at the system 1000. The power pod comprises a controller 810, which can be redundant (e.g., in a same or different physical housing within the power pod 800) and allow continued operation of the system 1000 upon failure of a single controller 810. The power pod 800 further comprises an auxiliary power source 820, in the form of an uninterruptible power supply (or source), which is able to provide power to the system 1000 in the event of a power outage. In some embodiments, the auxiliary power sources 820 are sized to allow continued operation of the system 1000 for a predetermined length of time. In some such embodiments, this predetermined length of time may be the amount of time necessary to provide an organized shutdown or to go into a standby mode, thereby obviating the need for recalibration of the system 1000 upon the power being returned to the system 1000. The auxiliary power sources 820 can be any suitable number and can comprise any suitable power storage medium, including, for example, batteries and/or supercapacitors.

As can be seen in FIGS. 21 and 22, in which further example embodiments of the system 1000 are shown, in which the outer perimeter of the vault 200 has a generally arcuate and/or circular shape, at least portions of the outer circumference of the vault 200 can be provided with one or more shelves 450, which can be used to support items placed thereon. Such shelves 450 may also be included on one or more of the cover panels 201, having any suitable profile and length of extension away from the outer surface of the cover panel 201 to which such shelves 450 may be attached. Such shelves 450 may also be included on one or more power pod 800, having any suitable profile and length of extension away from the outer surface of the power pod 800 to which such shelves 450 may be attached. In some embodiments, such as where the system 1000 is installed within a retail space, such shelves 450 can be used to display products that the retailer may wish to give added visibility in the vicinity of the store near the system 1000. In some embodiments, advertising can be positioned above, on, and/or adjacent to the shelves 450. In Some embodiments, the shelves 450 can be replaced such that some, all, or substantially all of an exterior of a cover panel 210 has an advertisement located thereon.

In some embodiments, targeted messages can be presented by the system 1000, as disclosed in co-pending U.S. patent application Ser. No. 15/850,657, filed Dec. 21, 2017, and International Pat. App. No. PCT/US2017/067874, filed Dec. 21, 2017, the disclosures of which are incorporated herein in their entirety.

For example, where the system 1000 is being utilized for the storage and retrieval of prescription medications, other over-the-counter (OTC) medications may be arranged on or about one or more of the shelves. Similarly, during seasonal periods where cold and flu viral infections are prevalent, an array of palliative care items (e.g., facial tissue, nasal spray, humidifiers, and the like) for such infections may be displayed on such shelves 450. These shelves 450 can extend entirely around the vault 450 (e.g., interlocking with shelves 450 of an adjacent cover panel 201 to form a continuous shelving surface) between adjacent user terminals 100, as shown in FIGS. 21 and 22. In some embodiments, the shelves 450 extend over only a partial circumferential distance between adjacent user terminals 100. In some embodiments, in which only a single user terminal 100 is connected to the vault 200, such shelves 450 can extend circumferentially around a portion of the outer wall of the vault 200, or around an entire perimeter of the vault 200 from one side of the single user terminal 100 to another side of the same user terminal 100.

FIGS. 24 and 25 show an example embodiment of a buffer input device, generally designated 900, for rapidly depositing items for storage and retrieval in the vault 200 (e.g., via user terminal 100 or the RRS terminal 700) of any of the embodiments of the systems 1000 disclosed herein, without the user depositing such items having to wait for each storage bin 300 to be retrieved from a position within the vault 200, made accessible at the user terminal (e.g., the user terminal 100 or the RRS terminal 700), deposited in the vault 200 at a designated location (e.g., one of the platters 210), and then another storage bin 300 be retrieved, for a next deposit of an item within the vault 200. According to this embodiment, a plurality of intermediate storage areas 912 are provided within the buffer system 900, each of the plurality of intermediate storage areas 912 being sequentially accessible by the user at the controlled access terminal (e.g., RRS terminal 700) for depositing one or more items therein before an adjacent intermediate storage area 912 is made accessible. In this embodiment, the buffer system 900 has a substantially solid housing 902 (which can be entirely translucent, opaque, or a combination thereof) enclosing the buffer system 900.

The housing 902 has an opening, generally designated 930, formed through a surface thereof. A single opening 930 in the housing 902 is shown, yet a plurality of openings 930 can be provided. While other embodiments will be understood based on the scope of the disclosure herein, in the example embodiment shown the buffer system 900 comprises a belt 916 rotatably connected between and around two rotatable spindles 918. The housing 902 has a plurality of paddles 926 attached to an outer surface thereof, the space between the paddles 926 defining the dimensions of the intermediate storage areas 912, and the inner surface of the belt 916 having a surface configured to minimize slippage with respect to the two rotatable spindles 918. In some embodiments, each of the inner surface of the belt 916 and the outer surface of the spindles 918 can have a friction-enhancing coating (e.g., rubber, silicone, etc.). In some other embodiments, the belt 916 and the spindles 918 can engage with each other with a geared interface, with each of the belt 916 and the spindles 918 having a plurality of teeth that engage (e.g., mesh) with each other to prevent slippage between the belt 916 and either of the spindles 918 as the belt 916 is rotatably driven about the spindles 918. In some embodiments, the belt 916 has a width that is wide enough such that a gap between the walls of the housing 902 and the belt 916 will not cause malfunctions or damage to the items being transported on the belt 916 within the housing 902. The housing 902 of the buffer system 900 may have a same or a different external contour (e.g., planar, curved, arcuate, etc.) from the outer contour of the vault 200 and/or a user terminal 100.

One or more scanners 924 (e.g., optical, RFID, NFC, Bluetooth®, etc.) can be mounted (e.g., fixedly or removably) to the housing 902 at a position adjacent to the opening 930 formed in the housing 902, through which items are deposited to enter into one of the intermediate storage areas 912 of the buffer system 900 disclosed herein. In some embodiments, a sensor 932 can be provided to detect when an item passes through the opening 930, such that the belt 916 can be advanced about the spindles 918 by a predetermined number (e.g., one) of positions such that the next intermediate storage area 912 is then located underneath the opening 930 in the housing 902. In some embodiments, the sensor 932 is provided adjacent to, or within, the opening 930. In some embodiments, the sensor 932 is a line scanner, laser scanner, or the like that can detect when the signal transmitted therefrom is interrupted by an item passing through the opening 930. In some embodiments, the sensor 932 is integrated into a scanner 924. In some embodiments, the functionality of the sensor 932 can be integrated within the one or more scanners 924 to reduce an overall number of devices of the buffer system 900. In some embodiments, an actuatable flap 934 may be provided to close off (e.g., cover) the opening 930 in the housing 902, such that items cannot accidentally be placed into an intermediate storage area 912. In some embodiments, the flap 934 can be locked unless/until it is actuated (e.g., after unlocking) once an item has been detected and successfully scanned by the scanner 924. As such, if the system 1000 is unable to detect the item, or any pertinent information about the item (e.g., recipient name and/or address information, payment status, authentication/verification of the item, historical tracking data for the item, etc.), the flap 934 may remain in the closed position so that an insufficiently identified item cannot pass through the opening 930 into the housing 902 of the buffer system 900.

The belt 916 may be rotatable in either direction, but in the embodiment shown the belt 916 is rotatable about the spindles 918 in a counterclockwise direction, as shown in FIGS. 24 and 25. The system 1000 and the buffer system 900 are interconnected for communication of items and/or information therebetween. As such, since the system 1000 knows when a storage bin 300 is properly located within the designated receiving position for the buffer system 900, the system 1000 may request an item in a next of the intermediate storage areas 912 be deposited into the awaiting storage bin 300. Upon receipt of this signal, the belt 916 is rotated to advance by a distance equivalent to a length of an intermediate storage area 912 (e.g., a distance between adjacent paddles 926 on the belt 916). During this movement of the belt 916, a lead paddle 926 of the next intermediate storage area 912 moves such that the item held therein can be transferred (e.g., by gravity) into the awaiting storage bin 300 and an empty intermediate storage area 912 becomes aligned with the opening 930 in the housing 902.

Any number of paddles 926 may be provided along the belt 916, which can have any suitable length to create any desired number of effective intermediate storage areas 912. As such, because the buffer system 900 can advantageously have items detected, registered, and deposited therein at a much more rapid rate than is possible for a retrieval/depositing of a single storage bin 300 within the vault 200 (e.g., at a user terminal 100), a user at a controlled access terminal equipped with such a buffer system 900 can rapidly input a number of items to fill all of the intermediate storage areas 912 and the buffer system 900 can input the items into storage bins 300 for the vault 200 at the user terminal 100 without requiring the user to wait at the system 1000, as would otherwise be necessary without the buffer system 900, such that the user only needs to return to induct further items once all of, or at least a majority of, the items within the buffer system 900 have been deposited in the vault 200 to deposit a further plurality of items within the buffer system 900, thereby increasing operational efficiency of users tasked with stocking the system 1000.

In some embodiments, the buffer system 900 may be configured to reverse the rotation of the belt 916; this can be advantageous where a user returns to the buffer system 900 but a small number of items have not yet been processed (e.g., transferred into the vault 200). As such, rather than waiting or leaving/returning after only a short time, the user may reverse (e.g., manually or automatically) the rotation of the belt 916 such that a vacant intermediate storage area 912 adjacent to the last occupied intermediate storage area 912 is located underneath the opening 930. At this point, the user can continue depositing items in each of the intermediate storage areas 912 until each of the intermediate storage areas 912 between the depositing position (e.g., adjacent to the storage bin 300 at the user terminal 100) and the input position (e.g., underneath the opening 930) are occupied, thereby freeing the user to resume other activities whilst the items are automatically transferred sequentially into adjacent storage bins 300 for storage within the vault 200. This prevents the user from having to wait, or otherwise operate at a reduced rate, while items already in the queue are processed according to the operational speed of the system 1000 until all of the previously-deposited items in the first batch of items are stored within the vault 200.

In some other embodiments, the buffer system 900 may be attached to the vault 200 and/or integrated within the system 1000 without being attached to an otherwise user-accessible user terminal 100. As such, the buffer system 900 may be configured as a separate and discrete input into the vault 200 that is separate from any other user terminals 100 or RRS terminal(s) 700, so that all user terminals 100 and RRS terminals 700 can remain operable for item retrieval (and/or depositing, as appropriate based on the permissions of a given user) while items are deposited within the vault 200 by the buffer system 900. In some such embodiments, the storage bin 300 transported for filling at the buffer system 900 may not be directly accessible by a user present at the buffer system 900. Similarly, there may be different, reduced, or omitted user inputs and displays at the buffer system 900 from those described relative to the user terminals 100 elsewhere herein.

In some embodiments, a user display (e.g., a light, a plurality of lights, a display screen, etc.) can be provided on the buffer system 900 to indicate the status of the buffer system 900 (e.g., the number of items in queue, an error status, an estimated time of completion, etc.). In some embodiments, a user input device (e.g., a button, a keyboard, etc.) may be provided for use with the buffer system 900 (e.g., to advance the belt 916 manually, to stop/start operation of the buffer system 900, etc.). In some embodiments, the user display and user input device may be incorporated into a single device, such as, for example, a control panel, a touchscreen, a tablet computer, and the like. In some embodiments, an auditory device (e.g., a speaker) can be provided on the buffer system 900, on the system 1000, or even remotely connected (e.g., wirelessly, via Bluetooth®) to alert a user that the buffer system 900 has completed processing all of the items and the queue (and all of the intermediate storage areas 912) is empty and ready to accept new items for transfer and storage within the vault 200. In some embodiments, the buffer system 900 may have a controller to achieve the functions described hereinabove. In some embodiments, the controller of the buffer system 900 is the same as, or integrated with, the controller of the system 1000. The controller may be connected to a wireless transceiver capable of wirelessly communication with a personal electronic device (PED, e.g., a smartphone, tablet computer, or other wearable device, including a smart watch) associated with a user authorized to access the buffer system 900. When the buffer system 900 is ready to accept new items, the controller may transmit a notification to the PED of the user to alert the user as to the status of the buffer system 900. In some embodiments, such alerts can also include error messages, messages indicating an estimated and/or updated estimated time of completion, and the like. Such alerts may also be disabled by a user based on a user's individual preferences.

In some embodiments, the housing 902 may have more than one opening 930, each of which can be retractable (e.g., automatically or manually), through which a plurality of intermediate storage areas 912 may be accessible without requiring a movement of the intermediate storage areas 912 within the housing 902. In some embodiments, such a buffer system 900 may be provided in a position such that, rather than items being held within the intermediate storage areas 912 being deposited into a storage bin 300 within the user terminal 100 of the RRS terminal 700, items deposited into the intermediate storage areas 912 may be deposited into a common receptacle (e.g., a container large enough that it would not require frequent emptying, depending on the size and volume of items being deposited therein). This would be very advantageous in, for example, a pharmacy installation where users may have expired or otherwise unneeded medications, prescribed or over-the-counter (OTC), which the customer needs to dispose of safely. In such embodiments, a sensor 932 may be used to detect when one or more items are deposited through the opening 930 in the housing 902 without the need for any further verification of the contents of the items being deposited or the persons making such deposits. In some such embodiments, the housing 902 may have a retractable flap 934 that is either automatically or manually opened.

In some other embodiments, the buffer system 900 can have a series of containers that are connected together (e.g., by a belt 916) and are configured to transport items deposited therein to a storage bin 300 to be stored in the vault 200. In some such embodiments, the containers can be configured to tip over in a controlled manner such that the contents thereof would be emptied into an awaiting storage bin 300. Similarly, the containers could have a releasable bottom panel that would allow, when the container is aligned with the storage bin 300, the items stored in the container to drop vertically out of the container and into the awaiting storage bin 300.

In some embodiments, the buffer system 900 may be spaced apart from the location of the storage bin 300, such that a further conveyor (e.g., a slide or a secondary driven belt) would be used to connect the output of the buffer system 900 with the awaiting storage bin 300.

In some embodiments, the input (e.g., at the opening 930) of the buffer system 900 can be operably connected to an automated item-generating system, for example an automated pharmaceutical prescription-fulfilling system that is configured to fill orders for a predetermined number of commonly-prescribed medications and transport these (e.g., on a conveyor belt, a slide, etc.) to the buffer system 900 for fully automated loading of the items within the vault 200. In some other embodiments, such an automated item-generating system can be connected to one of the mounting surfaces of the vault 200 so as to deposit the automatically generated items directly into an empty storage bin 300 within the vault 200.

In some embodiments, due to the configuration of having multiple platters 210 within the vault 200, it is possible for the system 1000 to retrieve a first storage bin 300 associated with a first recipient at a first user terminal 100 simultaneously while also retrieving a second storage bin 300 associated with a second recipient at a second user terminal 100; in some such embodiments it may not be possible for the system 1000 to always make such simultaneous retrievals of storage bins 300 when the storage bins 300 designated for retrieval at the different user terminals 100 are stored on a same platter 210. However, in such embodiments, the system 1000 may rotate the platter 210 in question so the first storage bin 300 is aligned with the elevator platform of the first user terminal 100, transfer the first storage bin 300 onto the elevator platform of the first user terminal 100, then rotate the platter 210 in question such that the second storage bin 300 is aligned with the elevator platform of the second user terminal 100, transfer the second storage bin 300 onto the elevator platform of the second user terminal 100, then rotate the platter 210 such that the nearest vacant slot thereon is aligned with the elevator platform of whichever user terminal 100 signals a completed transaction first; at this point, the system 1000 could return to normal operation. In some such embodiments, the controlled access terminal (e.g., a designated one of the user terminals 100 and/or an RRS terminal 700) may be operated simultaneously while one or more (e.g., all) of the other user terminals 100 are in use by persons authorized to retrieve items from one or more of the storage bins 300 stored within the vault 200. In such instances, because the system 1000 knows which of the platters 210 are currently being accessed as part of the retrieval process at the one or more user terminals 100, the automated item-generating system may assign the items being inducted at the RRS terminal 700 to a storage bin 300 located on a platter 210 that is not currently being utilized. As noted hereinabove, each platter 210 may be accessed for induction or retrieval of items at each user terminal 100 substantially simultaneously, with a delay in response times of the system 1000 ranging from the imperceptibly short to a period of time required to rotate the platter 210 sufficiently so that an empty location on the platter 210 is aligned with a trolley system 180 positioned to place or remove a storage bin 300 onto/from the platter 210.

In some embodiments, the displays 122 at one or more (e.g., each) of the user terminals 100 may be configured to show targeted messages that are customized based on a user profile and/or information about the merchandise being retrieved from the system 1000 by the user and/or caregiver. In some embodiments, one or more of the user terminals 100 may be ADA (American's with Disabilities Act) compliant, such that the system can be used by all, regardless of any physical disabilities. Because the terminals and systems herein can utilize one or more user interface, there can be direct marketing to a customer, such as targeted marketing or messaging that can, for example, be specific or particular to a customer based upon material being processed or picked up. For example, there could be an advertisement for what is on the shelf next to the portal, or even more direct advertisement, reward points, etc. that are directly tied to the specific customer account information.

FIG. 26 shows an example embodiment of a system 1000 with increased storage capacity.

Examples of systems 1000 having one or more such restricted-access terminals are shown in the embodiments of FIGS. 21-23, each of which show how the RRS terminal 700 is physically segregated from access by unauthorized persons by one or more physical barriers, with the physical barrier(s) being arranged such that the vault 200 itself can be used as a portion of the physical barrier.

In FIG. 21, the physical barrier is a plurality of wall segments 410 that extend from the sides of the vault 200; while only wall segments 410 are shown herein, these wall segments 410 can be of any length, can be part of, and/or coincident with, existing physical barriers (e.g., pre-existing walls) at a location where the system 1000 is installed, and, in some instances, can extend from the vault 200 at any angle, including, for example, from between and including 90° and 180°.

FIG. 22 shows an embodiment where the physical barrier comprises a retail sales installation, such as a retail pharmacy counter where prescriptions can be dropped off for fulfillment, fulfilled prescription medications can be picked up, and pharmacist consultations may be carried out. In the embodiment shown, the system 1000 is physically integrated within the retail pharmacy counter, with the added advantage that the system 1000 serves as a further barrier to the pharmacist consultation area for enhanced privacy to those seeking pharmacist consultations.

In the embodiment shown in FIG. 33, a drive-through embodiment is shown, where the system 1000 has only two user terminals 100, which are physically separated from each other by an external wall 430 of a building, in which one of the user terminals 100 is installed so that patients or caregivers are able to retrieve their medications while remaining in a vehicle; the RRS terminal 700 is thus located inside the building and the vault 200 is installed at a position adjacent to the physical barrier.

In any of the embodiments in which the vault 200 is integrated in, or otherwise attached to, a physical barrier, the outer shape of the vault 200 may be modified to be any suitable shape. Each of the embodiments shown herein can be configured for outdoor installations, including having the ability to maintain a designated internal temperature within the vault 200 for embodiments where temperature-sensitive items are stored therein.

When the system 1000 is being loaded (e.g., at the RRS terminal 700), the system 1000 may be configured to determine and assign, based on the dimensions of the item(s) to be stored therein, an appropriately sized storage bin 300.

The system 1000 is further configured, in some embodiments, with one or more internal presence detectors that detect whether a storage bin 300 is occupied or vacant. These can be affixed to the underside of one or more of the platters 210 and/or on the upper surface of the vault 200, such that the contents of the storage bins 300 can be detected passively as the platters 210 rotate about the frame 250. In some other embodiments, the platters 210 may have individual force sensors configured to determine a weight of each of the storage bins 300 and determine occupancy thereof by comparing the measured weight against a reference empty weight of each storage bin 300.

In some embodiments, the system 1000 is configured to, either by leaving at least one position on one or more platters 100 vacant or by utilizing the elevator systems 150 of at least two user terminals 100, "defragment" the storage bins 300 during times that the system 1000 is idle, or at least two user terminals 100 are idle. This "defragmentation" refers to re-organizing the contents of the storage bins 300 within the vault 200, including moving storage bins 300 such that occupied storage bins 300 are grouped together (e.g., on a same platter 210). In some embodiments, occupied storage bins 300 could be moved to be adjacent to the user terminals 100, while vacant storage bins 300 could be moved to be closer to the RRS terminal 700. In some other embodiments, storage bins 300 could be reorganized such that all storage bins 300 on a designated platter 210 are vacant to minimize the likelihood of storage bins 300 on a same platter 210 needing to be accessed by more than one user terminal 100. In some other embodiments, more recently occupied storage bins 300 could be located at a position closer to one of the user terminals 100 (e.g., on a platter 210 that is vertically closer to the user terminal 100), while those storage bins 300 that have been occupied for a longer period of time being stored at a more remote location within the vault 200, as these may be less likely to be accessed.

In some embodiments, the system 1000 is able to retrieve supply chain pedigree data (e.g., tracking information of the items being delivered to the user) throughout the supply chain, including, for example, from the point of origin of the merchandise (e.g., the original manufacturer). It is understood that the Electronic Product Code Information Services (EPCIS) portion of the Drug Supply Chain Security Act (DSCSA) is to be implemented by 2023. Once implemented, all retail pharmacies will comply with the standards set forth therein. In order for a pharmacy to accept a medication for distribution, the pharmacy must be able to verify the integrity of the supply chain for each medication, tracing the provenance of the medication all the way to the original manufacturer. As such, this data provides consumers and/or retailers (e.g., pharmacies) a verified supply chain pedigree at the time of deposit or retrieval of the merchandise into/from the vault 200, depending on where this verification process is requested in the process or workflow. Additionally, this verification data can be interpreted from its core base machine language (e.g., an XML language) and converted to a graphical timeline that can be understood by a layperson.

In some embodiments, the system 1000 is configured to determine and, in some such embodiments, display a certification regarding the authenticity and tracking of each of the items stored within the vault 200. In instances where the vault 200 is used for the storage of prescription medications, this information can include all pertinent supply chain data, including all steps between the medication leaving the manufacturer and its arrival (and detection/scanning) at the system 1000. In some embodiments, this certified authentication information can be displayed to a user at the display 122 at a user terminal 100 upon and/or during retrieval of the item from within the vault 200. In some such embodiments, the items themselves may be uniquely serialized to enable this end-to-end supply chain tracking. The certified authentication information can be accessed remotely by the system 1000 (e.g., through the Internet). The systems and methods herein can therefore access and use any data, such as data from the serialization process for medications or other items, and particularly including data such as the EPCIS data. These features can be automated with the systems and methods such as disclosed herein and are advantageous for processing, storage and dispensing or distribution of items, such as medications particularly.

In some embodiments, the system 1000 is configured for communication and/or payment between the retailer and the customer prior to the arrival of the customer at the store and at the user terminal 100 of the system 1000. This feature allows for secure (e.g., encrypted, as necessary) communication to the end consumer when the item(s) ordered is ready for retrieval at one (e.g., any) of the user terminals 100. This feature further allows for payment arrangements to be made between the retailer and the user, including allowing users to pre-pay or, in the instance of a retail pharmacy installation, input insurance information or allow for a request to be made to discuss the prescription with a licensed pharmacist.

The system 1000 is configured at the user terminal(s) 100 to accept payment (e.g., by one of the user interface devices 120, which can comprise a card swipe terminal) for the item(s) stored within the vault 200, preferably prior to the storage bin 300 being presented to the user at the user terminal 100 for retrieval of the item(s) stored therein. Payment can be made with either a pre-paid account, credit or debit card, cash, cryptocurrency, and the like. Any insurance contributions may be pre-arranged and will be automatically factored into the transaction. The user terminal 100 comprises a secured door 110, which controls access to the storage bin 300 on the trolley system 180. This secured door 110 remains closed and/or locked until identification, payment, and/or any security checks have been verified by the user, either remotely on a user device or using one or more of the user interface devices 120 and/or authentication devices 126. If there is a discrepancy, or a reason the customer does not want the item(s), the transaction can be cancelled, and the item(s) returned to the vault 200. In such instances, the system 1000 is configured to send a notification of this refusal event automatically to a retail employee (e.g., a pharmacist) so that the items can be removed from the vault 200 promptly.

In some embodiments, the system 1000 can be configured to accept returned items as well, in effect reversing the operation of the user terminals 100, wherein the item(s) being returned will be deposited in one or more storage bins 300 at one of the generally accessible user terminals 100, with the returned items being removable only by authorized users (e.g., authorized retail employees) at, for example, a restricted-access user terminal 100, or RRS terminal 700. In some embodiments, such returned items can be automatically deposited into a secure receptacle by the system 1000, so that storage bins 300 within the vault 200 are not occupied with defective/returned items instead of those to be delivered to the recipients.

In some embodiments, upon the items being deposited within the vault 200 and/or in the buffer system 900, a notification may be sent (e.g., automatically) to an intended recipient for the items being deposited within the vault 200. This notification can be sent to the intended recipient and/or his/her authorized caregiver via any suitable communication type, including, for example, e-mail, short messaging service (SMS) text messages, a dedicated mobile application for a smartphone, tablet computer, other computer, or wearable device, and the like. This notification can allow for payment arrangements to be made prior to retrieval, for a request to be made for a consultation with a pharmacist, for insurance information to be transmitted, and the like. In some instances, this notification can allow for a remote audio/visual consultation with a licensed pharmacist.

In embodiments where prescription medications are being stored/retrieved from the vault 200, the types and number of identity authentication measures may change dynamically based on the medication classification of the medication being retrieved. For example, a class 2 medication may require more stringent identity standards than would be required for a class 3 medication. Additionally, the system 1000 may be configured to report, as necessary, to any governmental databases when and how much of a controlled substance (e.g., pseudoephedrine) is purchased and by whom (e.g., by scanning a valid government-issued identification card, such as a driver's license).

While the embodiments shown herein are directed towards the storage and retrieval of small items that require secure access control measures for their retrieval, such as prescription medications. In some embodiments, the system 1000 disclosed herein could be used for storage and retrieval of virtually any suitably-sized items, including, for example, low volume retail orders placed on a merchant's Internet retail website for later retrieval by a customer. Furthermore, the system 1000 shown could be reconfigured to use larger storage bins 300 for the storage and retrieval of the items stored therein, either with or without changing a shape and/or space between the internal platters 210 arranged within the vault 200.

In some embodiments disclosed herein, the system 1000 is capable of being remotely accessed and one or more diagnostic programs may be executed during manufacturing, installation, and service of the system 1000.

In some embodiments, it may be permissible for items for multiple people associated with each other (e.g., as a family) during pre-registration to be stored in a same storage bin 300 are retrieved by a single user who is authorized to pick up items for each such person.

In the example embodiment shown in FIG. 26, the system 1000 comprises a vault 200, about which are arranged, mounted to, and/or connected to a plurality of user terminals 100, a power pod 800, a storage locker 1100, a locker pod 1200, and a high capacity pod 1300.

The high capacity pod 1300 comprises a "satellite" storage area that is attached to the vault 200 to increase its capacity or, in some embodiments, to allow for variations in size of the storage bins 300 located therein or the temperature at which the items stored therein are stored. In some embodiments, the storage bins within the high capacity pod 1300 are the same as the storage bins 300 used in the vault 200, allowing for the storage bins 300 to be transferred between the vault 200 and the high capacity pod 1300 relatively easily. In other embodiments, the storage bins 300 or storage areas within the high capacity storage pod 1300 can be of a different shape and/or size from the storage bins 300 in the vault 200, allowing for more items of different sizes and shapes to be stored within the system 1000. The high capacity pod 1300 attaches to the frame 250 of the vault 200 in a manner substantially similar to the attachment of the user terminal 100, the RRS terminal 700, and the power pod 800 to the vault 200. Items stored within the high capacity pod 1300 are transferred into the vault 200 and are accessed through one of the user terminals 100 and the RRS terminals 700. In some embodiments, items within the high capacity pod 1300 can be removed directly from the high capacity pod 1300.

The locker pod 1200 is a storage device that can be configured to handle variably sized items therein. Such items can include, for example, items that will not fit or otherwise cannot be securely stored in the storage bins 300. In some embodiments, all or a portion of the locker pod 1200 can be refrigerated or heated, so as to have a different temperature from the ambient temperature external to the vault 200 and/or within the vault 200 itself. The locker pod 1200 comprises a plurality of cubbies or enclosures of one or more sizes that are loaded and unloaded from an external side of the vault 200, via individually accessible locker doors. As such, items within the locker pod 1200 would be accessible to users external to the vault 200 while other items can be removed from the vault 200 via the user terminal(s) 100 simultaneously.

The storage locker 1100 is connected to the vault 200 at an external surface thereof. The storage locker 1100 is an automated storage and retrieval system (ASRS) and, instead of individual external doors for each of the lockers contained therein, the storage locker 1100 comprises central access points of portal doors for induction and retrieval of items therein. There may be one or a plurality of portal doors through which items can be inducted and/or retrieved. Items stored in the storage locker could, but need not in all embodiments, be routed through the vault 200 to be accessed by a user. As such, items within the storage locker 1100 would be accessible to users external to the vault 200 while other items can be removed from the vault 200 via the user terminal(s) 100 simultaneously. In some embodiments, all or a portion of the storage locker 1100 can be refrigerated or heated, so as to have a different temperature from the ambient temperature external to the vault 200 and/or within the vault 200 itself.

In the example embodiment shown in FIG. 31, the system comprises an access port on the vault to which a secure cart 1400 can be removably coupled. The secure cart 1400 allows items to be securely transported from an access control area (e.g., a pharmacy) to be loaded within the vault 200. In some embodiments, an identification number is assigned to the secure cart 1400 to establish the child-parent relationship between the items within the secure cart 1400 and the secure cart 1400 itself. This identification number is unique and will be recognized by the system 1000 and all information associated with the contents of the secure cart 1400 will be transferred to the system 1000 such that, if any of the items indicated as being present in the secure cart 1400 is missing, the appropriate security measures can be taken. In some embodiments, the items within the secure cart 1400 will be scanned both when being loaded into the secure cart 1400 and scanned again upon being transferred into the vault 200. This same process can be used when expired or returned items are to be removed from the vault 200 and loaded into the secure cart 1400, such that the items are scanned when removed from the vault 200 and scanned again when loaded into the secure cart 1400.

While the subject matter has been described herein with reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The methods and systems disclosed herein can be combined in any combination and/or sub-combination, adding elements from other systems and/or sub-systems or steps from other methods and/or sub-methods, as the case may be, and/or omitting elements from other systems and/or sub-systems or steps from other methods and/or sub-methods without limitation. Nothing disclosed herein shall be interpreted as limiting in any way the combinations in which the features, structures, steps, etc. may be organized, described, and/or claimed in this or any related applications.

The invention claimed is:

1. A secure storage and retrieval system comprising:
    a vault comprising:
        a frame that is devoid of a central axle and has a cross-sectional profile in a shape of a polygon;
        one or more platters mounted about the frame to be independently rotatable about the frame;
        a plurality of storage bins arranged radially about each of the one or more platters; and
        a plurality of mounting surfaces arranged about a perimeter of the vault, a number of the plurality of mounting surfaces being equivalent to a number of sides of the polygon; and
    at least one user terminal connected to the vault at one of the mounting surfaces of the vault, the at least one user terminal comprising an elevator system configured to vertically move the plurality of storage bins between any of the one or more platters and an opening formed through an outer shell of the user terminal.

2. The secure storage and retrieval system of claim 1, wherein the at least one user terminal comprises at least one user interface device for determining an identity of a user authorized to retrieve one or more items stored in one of the storage bins within the vault.

3. The secure storage and retrieval system of claim 1, wherein the one or more platters comprises a plurality of platters.

4. The secure storage and retrieval system of claim 3, comprising a rapid retrieval and storage (RRS) terminal attached to the vault at one of the mounting surfaces of the vault, the RRS terminal comprising:
    an outer shell;
    an opening formed through the outer shell to allow items to pass through the opening into and/or out of the vault; and
    a door that is movably arranged within the opening between an open position and a closed position;
    wherein the opening is at a height of one of the platters, designated as an RRS platter.

5. The secure storage and retrieval system of claim 4, wherein:
    the RRS terminal comprises an inventory control device configured to detect and/or verify one or more items passing through the opening of the RRS terminal; and
    the system is configured to advance the RRS platter, such that a second empty storage bin on the RRS platter is accessible through the opening of the RRS terminal, after an item has been deposited into a first empty storage bin on the RRS platter.

6. The secure storage and retrieval system of claim 5, wherein:
    the at least one user terminal comprises a plurality of user terminals that support simultaneous user induction and retrieval of items within the vault; and
    the plurality of user terminals are configured to replace occupied storage bins on the RRS platter with empty storage bins from another of the platters as empty storage bins are filled by a user at the RRS terminal.

7. The secure storage and retrieval system of claim 4, wherein the system is configured to optimize an arrangement of storage bins within the vault, prior to items being loaded onto the RRS platter at the RRS terminal, by removing occupied storage bins from the RRS platter and arranging empty storage bins about the RRS terminal in a consecutive manner.

8. The secure storage and retrieval system of claim 4, wherein the RRS terminal comprises one or more user interface devices configured to authenticate an identity of a user at the RRS and/or to scan an item to obtain information about the item before an item is loaded into one of the storage bins at the RRS terminal and/or after an item is removed from one of the storage bins at the RRS terminal.

9. The secure storage and retrieval system of claim 3, comprising, for each platter, a drive motor configured to engage with one of the platters to rotate the one of the platters about the frame, wherein the system is configured to measure an amount of backlash between each drive motor and a corresponding one of the platters with which each drive motor rotatably engages, the amount of backlash being determined by, for each platter, rotating the platter in a first direction, stopping the platter, rotating the platter in a second direction, measuring a time between torque spikes detected by the drive motor, and adjusting a motion profile of the drive motor to account for the amount of backlash measured.

10. The secure storage and retrieval system of claim 3, wherein a first of the platters is located in a refrigerated region of the vault so that items stored on the first platter are maintained at a lower temperature than items stored on other platters within the vault.

11. The secure storage and retrieval system of claim 3, wherein:
    each platter comprises a plurality of bin slots formed around the outer circumference thereof, the bin slots comprising a bin tab comprising opposing elastically deformable pincers;
    each storage bin comprises a rib connected to a bottom surface of the storage bin, a track connected to the rib in a position spaced apart from the bottom surface of the storage bin, and a bump arranged at, or adjacent to, an end of the rib; and the bump has a shape that can be removably retained within a region of the bin tab to prevent the bin slots from being dislodged from the bin slots other than by the storage bins being removed by a trolley system of the at least one user terminal.

12. The secure storage and retrieval system of claim 1, comprising one or more of:

a secure cart configured to securely transport and load a plurality of items from a restricted access area to the vault;

a locker pod attached to the vault, the locker pod comprising a plurality of lockers that are directly accessible by a user from a position outside of the vault;

a high capacity pod attached to the vault and configured to receive storage bins from the vault for storage in the high capacity pod and/or to transfer storage bins to the vault to be accessible at one of the user terminals;

a power pod attached to the vault and configured to provide redundant power to the system; and an automated storage and retrieval system (ASRS) attached to the vault and comprising a plurality of storage areas internal to the ASRS that are accessible only via a portal external to and separate from the vault.

13. The secure storage and retrieval system of claim 1, wherein the at least one user terminal comprises an imaging device configured to measure a distance between two fiducial markings on the one or more platters to align the one or more platters with at least one user terminal.

14. The secure storage and retrieval system of claim 1, comprising an automated item-generating system operably connected to the vault at a mounting surface of the vault, the automated item-generating system being configured to transfer items to the vault for fully automated loading of the items within the vault.

15. The secure storage and retrieval system of claim 1, wherein the user terminal comprises a touchscreen configured to receive input from a user at the user terminal.

16. The secure storage and retrieval system of claim 1, wherein the user terminal comprises a touchscreen to sync and receive input from a personal electronic device (PED) of the user at the user terminal.

17. The secure storage and retrieval system of claim 1, wherein the system is configured to optimize positions of the storage bins within the vault to minimize a processing time for storage and retrieval of one or more items within the vault.

18. The secure storage and retrieval system of claim 1, wherein the at least one user terminal is configured to display a targeted message to a recipient present at one of the at least one user terminals after authenticating an identity of the recipient.

19. The secure storage and retrieval system of claim 1, wherein the system is configured to retrieve supply chain pedigree data and display the supply chain pedigree data to a recipient at one of the at least one user terminals.

20. The secure storage and retrieval system of claim 1, wherein the system is configured to transmit information remotely to diagnose and troubleshoot malfunctions detected by the system.

21. A method for storing and distributing at least one item within a secure storage and retrieval system, the method comprising:

providing a vault comprising a frame without a central axle, one or more platters mounted about the frame to be independently rotatable about the frame, a plurality of storage bins arranged radially about each of the one or more platters, and a plurality of mounting surfaces arranged about a perimeter of the vault;

connecting one or more user terminals to the vault at one or the plurality of mounting surfaces of the vault;

identifying a designated storage bin of a plurality of storage bins on a designated platter of the one or more platters within the vault, the designated storage bin containing one or more items associated with a user at the one of the one or more user terminals;

removing the designated storage bin from the designated platter and transporting the designated storage bin adjacent to an opening formed through an outer shell of the user terminal;

moving a door positioned within an opening of the user terminal, such that the one or more items within the designated storage bin are accessible to the user through the opening;

closing the door after a predetermined amount of time and/or after detecting that the one or more items were removed from the designated storage bin by the user;

transporting the designated storage bin adjacent to one of the one or more platters within the vault; and depositing the designated storage bin onto the one of the one or more of platters within the vault.

22. The method of claim 21, wherein the one or more platters comprises a plurality of platters.

23. The method of claim 22, comprising attaching a rapid retrieval and storage (RRS) terminal to the vault at one of the mounting surfaces of the vault, the RRS terminal comprising:

an outer shell;

an opening formed through the outer shell to allow items to pass through the opening into and/or out of the vault; and a door that is movably arranged within the opening between an open position and a closed position;

wherein the opening is at a height of one of the platters, designated as an RRS platter.

24. The method of claim 23, comprising:

detecting, using an inventory control device of the RRS terminal, one or more items passing through the opening of the RRS terminal; and advancing, after an item has been deposited into a first empty storage bin on the RRS platter, the RRS platter, such that a second empty storage bin on the RRS platter is accessible through the opening of the RRS terminal.

25. The method of claim 24, wherein the at least one user terminal comprises a plurality of user terminals that support simultaneous user induction and retrieval of items within the vault, the method comprising replacing, using the plurality of user terminals, occupied storage bins on the RRS platter with empty storage bins from another of the platters as empty storage bins are filled by a user at the RRS terminal.

26. The method of claim 23, comprising optimizing an arrangement of storage bins within the vault, prior to items being loaded onto the RRS platter at the RRS terminal, by removing occupied storage bins from the RRS platter and arranging empty storage bins about the RRS terminal in a consecutive manner.

27. The method of claim 23, comprising:

authenticating, using one or more user interface devices of the RRS terminal, an identity of a user at the RRS; and/or scanning an item to obtain information about the item before an item is loaded into one of the storage bins at the RRS terminal and/or after an item is removed from one of the storage bins at the RRS terminal.

28. The method of claim 22, comprising, for each of the platters, a drive motor that engages with one of the platters to rotate the one of the platters about the frame.

29. The method of claim 28, comprising measuring an amount of backlash between each drive motor and a corresponding one of the platters with which each drive motor rotatably engages, the amount of backlash being determined by, for each platter, rotating the platter in a first direction, stopping the platter, rotating the platter in a second direction, measuring a time between torque spikes detected by the drive motor, and adjusting a motion profile of the drive motor to account for the amount of backlash measured.

30. The method of claim 22, wherein:
each platter comprises a plurality of bin slots formed around the outer circumference thereof, the bin slots comprising a bin tab comprising opposing elastically deformable pincers;
each storage bin comprises a rib connected to a bottom surface of the storage bin, a track connected to the rib in a position spaced apart from the bottom surface of the storage bin, and a bump arranged at, or adjacent to, an end of the rib; and
the bump has a shape that can be removably retained within a region of the bin tab to prevent the bin slots from being dislodged from the bin slots other than by the storage bins being removed by a trolley system of the at least one user terminal.

31. The method of claim 21, comprising one or more of:
providing a secure cart configured to securely transport and load a plurality of items from a restricted access area to the vault;
a locker pod attached to the vault, the locker pod comprising a plurality of lockers that are directly accessible by a user from a position outside of the vault;
attaching a high capacity storage pod to the vault to receive storage bins from the vault for storage in the high capacity pod and/or to transfer storage bins to the vault to be accessible at one of the user terminals;
attaching a power pod to the vault to provide redundant power to the system; and
attaching an automated storage and retrieval system (ASRS) to the vault, the ASRS comprising a plurality of storage areas internal to the ASRS that are accessible only via a portal external to and separate from the vault.

32. The method of claim 21, wherein the at least one user terminal comprises an imaging device configured to measure a distance between two fiducial markings on the one or more platters to align the one or more platters with at least one user terminal.

33. The method of claim 21, comprising operably connecting an automated item-dispensing system to the vault at a mounting surface of the vault to transfer items to the vault for fully automated loading of the items within the vault.

34. The method of claim 21, wherein the user terminal comprises a touchscreen to sync and receive input from a personal electronic device (PED) of the user at the user terminal.

35. The method of claim 21, comprising optimizing positions of the storage bins within the vault to minimize a processing time for storage and retrieval of one or more items within the vault.

36. The method of claim 21, comprising displaying, on a display of the at least one user terminal, a targeted message to a recipient present at one of the at least one user terminals after authenticating an identity of the recipient.

37. The method of claim 21, comprising retrieving supply chain pedigree data and displaying the supply chain pedigree data to a recipient at one of the at least one user terminals.

38. The method of claim 21, comprising providing a buffer system with a plurality of intermediate storage areas to hold and sequentially deposit one or more items into storage bins for storage within the vault.

39. The method of claim 38, wherein the buffer system comprises a belt rotatably movable about at least two spindles, the belt having a plurality of paddles arranged thereon extending away from an outer surface thereof, and the plurality of intermediate storage areas being defined by a space between adjacent paddles in a direction of the length of the belt.

40. The method of claim 39, comprising operably connecting an automated item-dispensing system to the buffer system to transfer items to the buffer system for fully automated loading of the items within the vault.

41. The method of claim 21, comprising:
rotating the designated platter on which the designated storage bin is located so that the designated storage bin is aligned with a trolley system of the user terminal; and
extending an extension platform of the trolley system such that the designated storage bin can be transferred onto the extension platform.

42. The method of claim 21, comprising detecting and subsequently transmitting information remotely to diagnose and troubleshoot malfunctions.

* * * * *